US012685998B2

(12) United States Patent
Burrow et al.

(10) Patent No.: US 12,685,998 B2
(45) Date of Patent: Jul. 21, 2026

(54) PROCESS FOR PRODUCING COMPOSITE MATERIAL

(71) Applicant: Anaphite Limited, Bristol (GB)

(72) Inventors: Samuel Burrow, Bristol (GB); Alexander Hewitt, Bristol (GB); Elena Mogort-Valls, Bristol (GB)

(73) Assignee: Anaphite Limited, Bristol (GB)

( * ) Notice: Subject to any disclaimer, the term of this patent is extended or adjusted under 35 U.S.C. 154(b) by 0 days.

(21) Appl. No.: 18/398,751

(22) Filed: Dec. 28, 2023

(65) Prior Publication Data

US 2024/0246063 A1        Jul. 25, 2024

Related U.S. Application Data

(63) Continuation of application No. 16/966,144, filed as application No. PCT/GB2019/050266 on Jan. 30, 2019, now Pat. No. 11,896,956.

(30) Foreign Application Priority Data

Jan. 30, 2018        (GB) ...................................... 1801480

(51) Int. Cl.
*B01J 21/06*        (2006.01)
*B01J 21/18*        (2006.01)
(Continued)

(52) U.S. Cl.
CPC ............. *B01J 21/063* (2013.01); *B01J 21/18* (2013.01); *B01J 31/06* (2013.01); *B01J 35/39* (2024.01);
(Continued)

(58) Field of Classification Search
None
See application file for complete search history.

(56) References Cited

U.S. PATENT DOCUMENTS 5,152,835 A        10/1992    Nemeh
5,246,686 A         9/1993    Cuer et al.
(Continued)

FOREIGN PATENT DOCUMENTS

CN        102496700 A        6/2012
CN        102532629 B        7/2012
(Continued)

OTHER PUBLICATIONS

Machine translation of Tang, CN 106492777A (Tang) (Year: 2017).*
(Continued)

*Primary Examiner* — Keling Zhang
(74) *Attorney, Agent, or Firm* — Foley Hoag LLP; David P. Halstead; Alexander J. Chatterley

(57) ABSTRACT

A process is disclosed comprising, providing a source of graphene, providing a particulate material, dispersing a mixture of the source of graphene and the particulate material in a first dispersion fluid to form a dispersion mixture, and providing a source of a base in the first dispersion fluid, thereby causing the source of graphene and particulate material in the dispersion mixture to interact forming a composite. The particulate material is preferably titanium dioxide comprising anatase and/or rutile which provides an effective photocatalytic composite. Also disclosed is apparatus to remove pollutants from fluids using the photocatalytically active material.

13 Claims, 40 Drawing Sheets

(51) Int. Cl.

| | |
|---|---|
| *B01J 31/06* | (2006.01) |
| *B01J 35/39* | (2024.01) |
| *B01J 35/40* | (2024.01) |
| *B01J 35/45* | (2024.01) |
| *B01J 37/00* | (2006.01) |
| *B01J 37/04* | (2006.01) |
| *C01B 32/19* | (2017.01) |
| *C01B 32/194* | (2017.01) |

(52) U.S. Cl.
CPC .............. *B01J 35/40* (2024.01); *B01J 35/45* (2024.01); *B01J 37/0072* (2013.01); *B01J 37/04* (2013.01); *C01B 32/19* (2017.08); *C01B 32/194* (2017.08); *C01P 2002/72* (2013.01); *C01P 2002/82* (2013.01); *C01P 2002/84* (2013.01); *C01P 2002/85* (2013.01)

(56) References Cited

U.S. PATENT DOCUMENTS

| | | | |
|---|---|---|---|
| 11,896,956 | B2 | 2/2024 | Burrow et al. |
| 2014/0316028 | A1 | 10/2014 | Liu et al. |
| 2016/0144348 | A1 | 5/2016 | Son et al. |
| 2018/0269465 | A1 | 9/2018 | Hirai et al. |
| 2018/0277279 | A1 | 9/2018 | Brereton et al. |
| 2019/0341604 | A1 | 11/2019 | Turi et al. |
| 2020/0313182 | A1 | 10/2020 | Durstock et al. |
| 2022/0176348 | A1 | 6/2022 | Burrow et al. |
| 2022/0267607 | A1 | 8/2022 | Burrow et al. |
| 2024/0246063 | A1 | 7/2024 | Burrow et al. |

FOREIGN PATENT DOCUMENTS

| | | | | | |
|---|---|---|---|---|---|
| CN | 102698728 | A | 10/2012 | | |
| CN | 104084186 | A | 10/2014 | | |
| CN | 105263858 | A | 1/2016 | | |
| CN | 106492777 | A | 3/2017 | | |
| CN | 106622202 | A | 5/2017 | | |
| CN | 106732690 | A | 5/2017 | | |
| CN | 107140626 | A | 9/2017 | | |
| CN | 108295812 | A | 7/2018 | | |
| CN | 109879328 | A | 6/2019 | | |
| KR | 10 20110049629 | | 5/2011 | | |
| KR | 20120039799 | A | * 4/2012 | .............. | B01F 23/50 |
| KR | 20130006089 | A | * 1/2013 | ........... | B01J 37/343 |
| WO | WO-2011/141486 | A1 | 11/2011 | | |
| WO | WO-2014/40324 | A1 | 3/2014 | | |
| WO | WO-2021/019098 | A1 | 2/2021 | | |
| WO | WO-2022/253304 | A1 | 12/2022 | | |
| WO | WO-2024/165861 | A1 | 8/2024 | | |

OTHER PUBLICATIONS

Trapalis et al., TiO2/graphene composite photocatalysts for NOx removal: A comparison of surfactant-stabilized graphene and reduced graphene oxide, Applied Catalysis B: Environmental, 2016 (Year: 2016).*

Machine translation of Tark et al., KR 20120039799A (Tark) (Year: 2012).*

Atiemo-Obeng et al., Chapter 8, Handbook of Industrial Mixing: Science and Practice, 2003 (Atiemo-Obeng) (Year: 2003).*

Machine translation of Yong et al., KR 20130006089A (Year: 2013).*

Anandhavelu et al., "Single step synthesis of chitin/chitosan-based graphene oxide—ZnO hybrid composites for better electrical conductivity and optical properties," Electrochimica Acta, 90:194-202 (2013).

Atiemo?Obeng, Victor A., and Richard V. Calabrese. "Rotor-stator mixing devices." Handbook of industrial mixing: Science and practice (2003): 479-505.

Chattopadhyay, D. P., and Milind S. Inamdar. "Aqueous behaviour of chitosan." International Journal of Polymer Science 2010 (2010).

Debnath et al., "Ultrasound assisted adsorptive removal of hazardous dye Safranin O from aqueous solution using crosslinked graphene oxide-chitosan (GOCH) composite and optimization by response surface methodology (RSM) approach," Carbohydrate Polymers, 175:509-517 (2017).

Fan et al., "Fabrication, Mechanical Properties, and Biocompatibility of ; Graphene-Reinforced Chitosan Composites" Biomacromolecules 11: 2345-2351 (2010).

Gong et al., "Synthesis of highly dispersed and versatile anatase TiO2 nanocrystals on graphene sheets with enhanced photocatalytic performance for dye degradation," Journal of Materials Science: Materials in Electronics, 28(24):18883-18890 (2017).

Rostami et al., "Sono-chemical synthesis and characterization of Fe 3 O 4@ mTiO 2-GO nanocarriers for dual-targeted colon drug delivery", *Research on chemical intermediates* 44: 1889-1904 (2018).

Szabo et al., "Photocatalyst separation from aqueous dispersion using graphene oxide/TiO2 nanocomposites," Colloids and Surfaces A: Physicochemical and Engineering Aspects, 433:230-239 (2013).

Wang et al., "In situ polymerization to prepare graphene-toughened monomer cast nylon composites" J. Mater. Sci., 2015, 6291-6301 (Year: 2015).

Yang et al., "Self-assembly between graphene sheets and cationic poly(methyl methacrylate) (PMMA) particles: preparation and characterization of PMMA/graphene composites," J Nanopart Res, 14:717 (2012).

Yenier, Zafer, et al. "Manufacturing and mechanical, thermal and electrical characterization of graphene loaded chitosan composites." *Composites Part B: Engineering* 98 (2016): 281-287.

Zamani et al. "Mesoporous titanium dioxide@ zinc oxide-graphene oxide nanocarriers for colon-specific drug delivery." *Journal of materials science* 53.3 (2018): 1634-1645.

Database WPI Week 201858., "Graphene composite oxide film useful for selectively removing metal ion in water, comprises oxidized graphene, amino-carboxy complexing agent and organic macromolecule flocculating agent," Thomson Scientific, London GB an 2018-59147C (2018).

International Search Report and Written Opinion for International Application No. PCT/EP20/71740 dated Oct. 21, 2021.

International Search Report and Written Opinion for International Application No. PCT/GB24/50342 dated May 15, 2024.

United Kingdom Search Report for Application No. GB1910948.7 dated Feb. 3, 2020.

* cited by examiner

| Curve Name | Centre | Width | Height | % Gaussian | Type | Area |
|---|---|---|---|---|---|---|
| Curve 1 | 1348.21 | 43.0571 | 4738.26 | 16.5313 | Mixed | 303390 |

| Curve Name | Centre | Width | Height | % Gaussian | Type | Area |
|---|---|---|---|---|---|---|
| Curve 1 | 1580.18 | 22.339 | 14324.2 | 26.1766 | Mixed | 460226 |
| Curve 2 | 1616.42 | 29.3161 | 1470.11 | 75.5347 | Mixed | 51214.9 |

| Curve Name | Centre | Width | Height | % Gaussian | Type | Area | |
|---|---|---|---|---|---|---|---|
| Curve 1 | 1349.96 | 40.9277 | 2584.33 | 13.3338 | Mixed | 159004 | |

| Curve Name | Centre | Width | Height | % Gaussian | Type | Area | |
|---|---|---|---|---|---|---|---|
| Curve 1 | 1582.65 | 24.0898 | 5425.51 | 24.1509 | Mixed | 189319 | |
| Curve 2 | 1619.63 | 30.4503 | 841.649 | 47.41 | Mixed | 34105 | |

| Curve Name | Centre | Width | Height | % Gaussian | Type | Area | |
|---|---|---|---|---|---|---|---|
| Curve 1 | 1348.85 | 45.4153 | 9677.43 | 19.0691 | Mixed | 647935 | |

| Curve Name | Centre | Width | Height | % Gaussian | Type | Area | |
|---|---|---|---|---|---|---|---|
| Curve 1 | 1581.1 | 28.8542 | 18809.9 | 28.4477 | Mixed | 774365 | |
| Curve 2 | 1619.05 | 28.1433 | 2841.43 | 92.3818 | Mixed | 88206.9 | |

| Curve Name | Centre | Width | Height | % Gaussian | Type | Area |
|---|---|---|---|---|---|---|
| Curve 1 | 1348.62 | 42.016 | 1285.44 | 30.6186 | Mixed | 76464.3 |

| Curve Name | Centre | Width | Height | % Gaussian | Type | Area |
|---|---|---|---|---|---|---|
| Curve 1 | 1578.47 | 20.6351 | 5067.33 | 26.5443 | Mixed | 150197 |
| Curve 2 | 1613.73 | 34.6082 | 508.08 | 23.8299 | Mixed | 25498.8 |

| Curve Name | Centre | Width | Height | % Gaussian | Type | Area |
|---|---|---|---|---|---|---|
| Curve 1 | 1349.49 | 42.8351 | 1934.54 | 32.9278 | Mixed | 116350 |

| Curve Name | Centre | Width | Height | % Gaussian | Type | Area |
|---|---|---|---|---|---|---|
| Curve 1 | 1580.71 | 22.2424 | 6466.57 | 24.7445 | Mixed | 207910 |
| Curve 2 | 1619.11 | 24.0492 | 685.583 | 72.681 | Mixed | 19831.3 |

| Curve Name | Centre | Width | Height | % Gaussian | Type | Area |
|---|---|---|---|---|---|---|
| Curve 1 | 2698.62 | 58.6047 | 10255.3 | 36.3806 | Mixed | 833357 |

| Curve Name | Centre | Width | Height | % Gaussian | Type | Area |
|---|---|---|---|---|---|---|
| Curve 1 | 2700.95 | 58.7654 | 4303.51 | 24.4585 | Mixed | 365932 |

| Curve Name | Centre | Width | Height | % Gaussian | Type | Area |
|---|---|---|---|---|---|---|
| Curve 1 | 2698.28 | 66.7675 | 12321.4 | 32.2303 | Mixed | 1.15799e+006 |

| Curve Name | Centre | Width | Height | % Gaussian | Type | Area |
|---|---|---|---|---|---|---|
| Curve 1 | 2693.87 | 68.9257 | 16228.1 | 47.7508 | Mixed | 1.48825e+0066 |

| Curve Name | Centre | Width | Height | % Gaussian | Type | Area |
|---|---|---|---|---|---|---|
| Curve 1 | 2696.75 | 63.9717 | 4014.58 | 40.0684 | Mixed | 351308 |

PROCESS FOR PRODUCING COMPOSITE MATERIAL

RELATED APPLICATIONS

This application is a continuation of U.S. patent application Ser. No. 16/966,144, filed Jul. 30, 2020, which is the U.S. National Phase of International Patent Application No. PCT/GB2019/050266, filed Jan. 30, 2019, which claims the benefit of priority to Great Britain Patent Application No. GB 1801480.3, filed Jan. 30, 2018. International Patent Application No. PCT/GB-2019/050266 is incorporated herein by reference in its entirety.

The present invention relates to processes for producing composite materials. In particular, the present invention relates to processes for producing composite materials of graphene and other materials, more particularly graphene and metal oxides and most particularly graphene and titanium dioxide.

Exfoliation of graphite produces graphene with interesting physical, electronic and catalytic properties.

Paton et al., *Nature Materials* 13 pp. 624-630 (2014) describe scalable production of defect-free few-layer graphene by shear exfoliation in liquids.

CN-A-106492777 discloses a graphene oxide/titanate nanotube composite photocatalyst wherein graphene oxide and nano titania nanoparticles are subjected to solvothermal reaction, thus obtaining a graphene oxide/titanate nanotube composite photocatalyst.

CN-A-106337276 discloses a preparation method of a chitosan fabric based on graphene foam modification. The preparation method comprises soaking the chitosan fabric in a graphene oxide solution.

CN-A-105944709 discloses a three-dimensional graphene and nano-meter titania composite photocatalyst and a preparation method thereof. The method comprises providing a nickel foam which is soaked in an aqueous graphene oxide solution to obtain a three-dimensional graphene oxide material which is then soaked in a titanium tetrachloride solution.

CN-A-103285845 discloses a preparation method of a graphene oxide wrapped titania microsphere photocatalyst involving monodisperse titania microspheres undergoing an esterification condensation reaction with graphene oxide.

CN-A-102600823 discloses a preparation method for a graphene/titania composite material, which comprises preparing a precursor solution of graphene oxide and titania, heating and stirring. The graphene oxide can subsequently be reduced by microwave heating, thus avoiding the use of toxic reductants.

There is a demand for high concentrations of graphene to be formed in polymer materials via methods that avoid the evaporation of graphene-polymer mixtures. The evaporation of graphene-polymer mixtures typically leads to aggregation of graphene sheets.

Youn et al, Scientific Reports volume 5, Article number: 9141 (2015) demonstrates the use of a monomer/oligomer which has a low viscosity at higher temperatures, enabling good dispersion of high concentrations of graphene to be reached within the composite. Aggregation is avoided by performing in-situ polymerisation with a solvent-free process.

Typically, graphene loadings are limited to ~2-15% due to diminishing returns on increased loadings. Such diminishing returns are due to poor distribution of graphene in the polymer matrix, typically caused by either: A) high viscosity of the melted composite limiting sufficient dispersion and mixing of graphene sheets within the polymer, or B) aggregation of previously dispersed graphene sheets caused by poor stabilisation of graphene sheets.

One widely used approach is to use a solvent-based system to mix graphene sheets and a dissolved polymer together, followed by a solvent removal step to solidify the polymer and entrap the graphene within the polymer matrix.

It is thought that the process of evaporating the graphene dispersion solvent from the system is a significant factor in aggregation, due to the preference of graphene's interaction with the solvent, and relatively strong pi-stacking interactions between graphene sheets. Such solvents are normally well-matched to the surface energies of graphene. For example, in the case of pristine/non-functionalised graphene, solvents such as THE, DMSO, or others are used, which can dissolve polymers and disperse graphene, allowing them to mix. While the solvent evaporates, the graphene sheets can migrate through the (still solubilised) polymer bulk to form aggregates.

Aggregated graphene is disadvantageous as it reduces the mechanical properties of the composite, as less surface area is available to interact with the polymer, and the breakdown/separation of aggregates under composite strain leads to hysteresis (a well-studied effect in carbon black-filled rubbers).

Graphene can be modified to include functional groups on its edges or surface, which facilitate better interaction with polymer systems to avoid aggregation and permit better mixing. However, such modification can be costly, time-consuming, and can interfere with the pristine nature of graphene sheets, reducing conductivity.

Unfortunately, none of the known methods provide a simple and flexible process for production of a composite material with minimal additional process steps.

Known processes for producing graphene composites utilise surfactants to disperse the graphene. Residual surfactants can have a negative impact on the properties of the final composite. Further, surfactants can be difficult to remove due to the need for long washing steps, which are impractical on a large scale. Complete removal of the surfactant may interfere with the interaction between graphene and the composite material and cause separation of the graphene. Especially with water-based washing systems, this is likely to cause agglomeration of graphene.

There is, therefore, a need for improved processes for production of graphite/graphene composites, especially composites with photocatalytic activity. Especially graphene or partially oxidised graphene composites.

It is an aim of the present invention to address this need.

The present invention accordingly provides, in a first aspect, a process for producing a composite, the process comprising:
   a) providing a source of graphene,
   b) providing a particulate material,
   c) dispersing a mixture of the source of graphene and the particulate material in a first dispersion fluid to form a dispersion mixture, and
   d) providing a source of a base in the first dispersion fluid, thereby causing the source of graphene and particulate material in the dispersion mixture to interact forming a composite.

This process is advantageous because it is relatively simple and flexible and produces a composite that surprisingly appears to be an intimate composite of graphene and the particulate material.

Graphite may be first exfoliated to form graphene prior to mixing with the particulate material. Alternatively, graphite flakes may be mixed with the particulate material and the graphene is formed by exfoliating the mixture. Exfoliation may be performed by methods known in the art, e.g. sonication and homogenisation.

As is known in the art, the exfoliation of graphite will form graphene. The composites formed in the present invention may comprise monolayer or few-layer graphene. Monolayer graphene is an atomically thick, two-dimensional sheet composed of sp2 carbons in a hexagonal structure. Few-layer graphene can be understood to be made up of 2-10 atomic layers of graphene. The term "graphene" in the context of the present invention encompasses monolayer and few-layer graphene. Unless otherwise stated, the term "graphene" in the context of the present invention, refers to pristine graphene i.e. graphene which has not been chemically modified.

The particulate material may be dispersed in the first dispersion fluid by sonication, high shear homogenisation, blending, high pressure homogenisation, mixing, or by capture from a gaseous phase by a liquid.

Alternatively, the particulate material may be formed by reaction of precursors with or in the first dispersion fluid, for example poylmerisation of polymer monomers (MMA+ potassium persulfate=PMMA) or condensation of metal oxide precursors like metal chlorides, metal alkoxides, or metal acetylacetonates.

In a preferred embodiment, the process for producing a composite of the present invention, comprises:
  a) providing graphite flakes,
  b) dispersing the graphite flakes in a first dispersion fluid,
  c) dispersing a particulate material in the first dispersion fluid to form a dispersion mixture,
  e) subjecting the dispersion mixture to energy (e.g. sonication or high shear mixing) to form a dispersion comprising graphene and the particulate material in the dispersion mixture,
  f) providing a base in the dispersion mixture,
  thereby causing the graphene and particulate material in the dispersion mixture to interact forming a composite.

In some alternate embodiments, the above methods may be performed utilising partially oxidised graphite in place of the graphite. Similarly, partially oxidised graphene may be used in place of graphene (i.e. pristine graphene).

In some embodiments of the present invention, the step of providing a base may be performed before exfoliating the graphite or partially oxidised graphite. Additional base may be added following exfoliation. In other embodiments, the base is added following exfoliation of the graphite or partially oxidised graphite.

Following exfoliation, the unexfoliated graphite or partially oxidised graphite particles may be removed from the first dispersion fluid (e.g. by centrifugation).

The process of the present invention may also include dispersing pristine graphene with the particulate material. The pristine graphene may be a commercially available source of graphene (e.g. xGNP by XG Sciences). Thus, in some methods of the invention there is no requirement to exfoliate graphite into graphene. Such a method may comprise the following steps:
  a) providing a first dispersion fluid comprising graphene (i.e. pristine graphene)
  b) providing a particulate material,
  c) dispersing the particulate material in the first dispersion fluid comprising pristine graphene to form a dispersion mixture, and
  d) providing a base in the dispersion mixture, thereby causing the graphene and particulate material in the dispersion mixture to interact forming a composite.

The dispersion of graphene may be provided by exfoliating graphite, thus in a preferred embodiment, the process for producing a composite of the present invention, comprises:
  a) providing graphite flakes,
  b) dispersing the graphite flakes in a first dispersion fluid,
  c) exfoliating the graphite flakes in the first dispersion fluid to form a dispersion comprising graphene
  d) providing a particulate material,
  e) dispersing the particulate material in the dispersion comprising graphene to form a dispersion mixture, and
  f) providing a base in the dispersion mixture,
  thereby causing the graphene and particulate material in the dispersion mixture to interact forming a composite.

Preferably, the processes of the present invention are performed in the absence of a surfactant. Thus, the dispersion fluid and/or dispersion mixture and/or the final composite may not comprise a surfactant. The dispersion fluid and/or dispersion mixture and/or the final composite may be substantially free of a surfactant. The dispersion fluid and/or dispersion mixture and/or the final composite may be entirely free of a surfactant.

The particulate material may be an organic material, for example a polymer, for example one or more of chitosan, polyurethane, aramid (meta- or para-), polycarbonate, PMMA, nylon (PET), PTFE, PVDF, polyaryletherketone, polypropylene carbonate, polyester, polylactic acid, polyurethane, poly(methyl methacrylate), polyvinyl alcohol, polyvinyl acetate and/or polyvinyl ester.

In one embodiment, the particulate material may comprise a polysaccharide, preferably chitosan. Chitosan is a polysaccharide polymer which can be dissolved in 1% acetic acid to form an easily processable solution. Without wishing to be bound by theory, it is believed that addition of base to a mixture of graphene platelets and dissolved chitosan in a dispersion fluid simultaneously de-solubilises the polymer (forming small particles) and promotes the polymer's attachment to graphene. This forms an agglomerate composite material of graphene and chitosan. There is demand for a process which can easily form graphene-polymer composites without the need for low-viscosity polymer precursors or functionalisation of graphene sheets. The present invention provides a method for forming such a composite between non-functionalised (i.e. pristine) graphene sheets (or partially oxidised graphene sheets) and polymer particles.

In another embodiment, the particulate material may be one or more of a polyurethane or poly(methyl methacrylate) (PMMA). PMMA and PU can be polymerised to form a surfactant-free emulsion of small particles in water (see examples 5 and 8) Addition of these emulsions to a dispersion of graphene platelets, and providing a base, forms a material that does not contain any surfactants (which interfere with the electrical properties of graphene), but consists of graphene sheets interdispersed within a loose matrix of polymer particles. This provides a potential alternative method to forming well-mixed graphene-thermoplastic polymer composites without the use of surfactant(s), solvent evaporation, or functionalisation of graphene.

Alternatively, the particulate material comprises an inorganic material (especially semiconductor-type materials) for example, aluminium nitride, aluminium arsenide, silicon, silicon dioxide, silicon carbide, gallium nitride, gallium arsenide, gallium phosphide, indium nitride, indium phosphide, and/or indium arsenide.

Suitably, the particulate material comprises one or more metal (or metalloid) oxides (e.g. one or more of silicon dioxide, aluminium oxide, tin oxide, zinc oxide, iron oxide, zirconium oxide, tungsten trioxide, copper (ii) oxide, copper (i) oxide, cerium oxide, uranium oxide).

The preferred metal oxides are photocatalytic metal oxides, more particularly wherein the photocatalytic metal oxide comprises titanium dioxide, preferably titanium dioxide comprising anatase and/or rutile, even more preferably titanium dioxide comprising a mixture of anatase and rutile. In this specification, "titanium dioxide", "titania" and "titanium oxide" are generally used interchangeably unless the context suggests otherwise.

This is advantageous because the composite thereby has advantageous photocatalytic properties, including a half-life or other time constant for photocatalytic activity surprisingly shorter than anatase alone. Without wishing to be bound, it is currently thought that these improved photocatalytic properties result from the interaction between graphene sheets and titanium dioxide. In particular, the electrical conductivity of graphene sheets, intimately associated with titanium dioxide particles, is currently thought to reduce the probably of electron-hole recombination after titanium dioxide is excited by light of the appropriate wavelength resulting in a more efficient photocatalytic process.

The preferred metal oxides include period 3, 4, 5 and 6 metal oxides. Preferred metal oxides include aluminium oxide, silicon dioxide, barium titanate, iron oxide, nickel oxide, copper oxide, zirconium oxide, tin oxide and tungsten oxide. The metal oxide may be doped with another material (e.g. antimony-doped tin oxide, SbO/SnO).

The particulate materials may comprise pre-formed particulate materials, such as antimony-doped tin oxide. Graphene based composites of such materials have proven to be difficult to make using an in situ process, but are desired for their conductivity.

The particulate materials may have a particle size of 5 nm-4000 nm, suitably 50 nm-1500 nm, more suitably 50 nm-600 nm. Smaller particle sizes are desired, as their higher surface area offers a more intimate contact with graphene sheets. However, larger particle sizes may be easier to produce and stabilise.

The graphite (or partially oxidised graphite) flakes may have a particle size of 1 micron to 5000 microns—a large range of graphite flake sizes are known to function as sources of graphene sheets in the art. Preferably, such flakes will have smaller size (10 micron to 1000 microns), more preferably 100 microns to 500 microns. Without wishing to be bound, it is believed that using a source of smaller graphite flakes increases the yield of graphene flakes.

The graphene flakes in the formed composite will typically have a size of 0.6 microns to 16 microns, preferably 1 to 10 microns, more preferably 1.5 to 5 microns.

It is advantageous if the process further comprises homogenising the dispersion mixture, preferably with a high shear mixer to improve still further the interaction between graphene and the particulate material. This increases the degree of mixing of graphene and the particulate material, thus increasing the homogeneity of the material.

Thus, the process may further comprise homogenising the source of graphene in a graphene dispersion fluid (for example the first dispersion fluid), preferably with a high shear mixer, and/or it may further comprise homogenising the particulate material in a material dispersion fluid, preferably with a high shear mixer.

Other optional or preferred steps include further comprising sonicating the dispersion mixture, sonicating the source of graphene in the graphene dispersion fluid, and/or sonicating the particulate material in the material dispersion fluid.

Generally, the process may further comprise forming the mixture of the source of graphene and the particulate material in an amount of 0.01 to 10000 parts by weight particulate material to 1 part by weight source of graphene (calculated as graphene). More suitably, the graphene and the particulate material may be mixed in a ratio of 0.1 to 1000 parts by weight particulate material to 1 part by weight source of graphene. Preferably, the graphene and particulate material may be mixed in a ratio of 3 to 500 parts by weight particulate material to 1 part by weight source of graphene.

In another embodiment, the process may comprise mixing graphene and the particulate material to form a composite comprising 0.001 to 5 wt. % graphene and 95 to 99.999 wt. % particulate material.

In polymer composites, a range of 0.05 to 20 wt. % graphene may be preferred. In metal oxide or polymer composites used as a dielectric, a 0.05 to 5 wt. % graphene may be preferable.

Suitably, for metal oxides used in applications needing a high surface area, a range of 5 to 50 wt. % graphene may be preferred. Other optimal % loadings may be used to balance the properties of the metal oxide (e.g. electrochemical activity) with those of graphene (conductivity).

The source of base may comprise a source of a Brønsted base and/or a source of a Lewis base. The source of base may be a base, i.e. basic solution.

Thus, the source of base may comprise a source of hydroxide ions, for example, the source of hydroxide ions may comprise an ion exchange resin, a basic ammonia-based salt solution or, preferably, an alkali solution, in particular a solution of sodium hydroxide and/or potassium hydroxide. Other choices of hydroxide ions may be chosen in different cases, to maximise the quality or properties of the end-product. For example, in applications requiring high ionic purity, like Li-ion batteries, a solution of lithium hydroxide may be used. Alternatively, a volatile base such as ammonium carbonate may be used, which is easily removed from the finished composite with mild heating and/or low pressure. The source of hydroxide may preferably be provided at an amount of 0.5 millimoles to 20 millimoles per 10 g of metal oxide, preferably per 10 g titanium dioxide (where titanium dioxide is the particulate material).

The base may also be provided at a weight percentage of 0.1% to 800% of the weight of the particulate material. Preferably, the base is provided at 5%-300% of the weight of the particulate material. Even more preferably, the base is provided at 10%-75% of the weight of the polymer or metal oxide material. The amount of base may be increased to increase the rate of settling and the homogeneity of the final composite.

Alternatively, the source of base may comprise a ketone, preferably acetone. If so, the ketone may be added separately to the dispersion fluid or the first dispersion fluid may comprise acetone. In such a case, the first dispersion fluid may comprise a mixture of acetone and water with a weight ratio of acetone to water of 0.5:1 to 6:1, preferably 1:1 to 5:1, more preferably 2:1 to 4:1 and most preferably about 3:1. Acetone may also be used as a solvent, rather than a base.

Preferred bases include sodium hydroxide, potassium hydroxide, lithium hydroxide, saturated calcium hydroxide solution (in the form of limewater), ammonium sulphide, sodium citrate, ammonium carbonate, sodium pyruvate, and other organic bases.

Suitably, the base is a saturated ammonium carbonate solution. Ammonium carbonate can be removed from the final composite material by mild heating. This enables the production of composites with very high purity. Other volatile or labile bases or basic salts such as ammonium sulphide, ammonium chloride, or other ammonium, amine-based, or nitrogen-containing salts and mixtures thereof may be used when appropriate.

In some embodiments, a base may be added before the exfoliation of the graphite or partially oxidised graphite. Additional base may be added following exfoliation, to further improve the interaction between graphene and the particulate.

Suitably, for the preparation of polymer composites, especially when using polymer dispersions stabilised at pH>7 as the source of polymer, saturated calcium hydroxide solution may be used as the base. Without wishing to be bound by theory, it is believed that the solubility of calcium hydroxide reduces with increasing pH, forming charged particles that help bring the floc product out of solution.

Other components may be added to the dispersion fluid (s). For example, the process may further comprise providing a surfactant in the first dispersion fluid. Preferably however, no surfactant is provided in the first dispersion fluid. In the case of metal oxides it is preferred to avoid the use of surfactants. The absence of a surfactant improves the interactions between graphene and particulate material. Surfactants can also interfere with the beneficial electrical properties of graphene, thus reducing the usefulness of the final composite.

As is known in the art, surfactants are compounds that lower the surface tension (or interfacial tension) between two liquids, between a gas and a liquid, or between a liquid and a solid. Surfactants may act as detergents, wetting agents, emulsifiers, foaming agents, and dispersants. In the context of the present invention, surfactants are considered to be organic compounds that are amphiphilic, meaning they contain both hydrophobic groups (their tails) and hydrophilic groups (their heads). Therefore, a surfactant contains both a water-insoluble (or oil-soluble) component and a water-soluble component.

As discussed herein, the process of the present invention does not require the use of surfactants. The avoidance of the use of surfactants means that no long washing steps are needed to separate the surfactant from the graphene. Such steps are uneconomical and can result in separation of graphene from the composite and/or agglomeration of the graphene, due to its hydrophobicity and strong inter-sheet van der walls interactions.

A number of dispersion fluids may be suitable for the process. Usually the dispersion fluid will be a dispersion liquid. The graphene dispersing fluid/liquid, the particulate material dispersing fluid/liquid and/or the first dispersing fluid/liquid may be the same or different and may comprise one or more liquids selected from DMSO, acetone, water, THF, Chloroform, NMP, DMF, DMA, GBL, DMEU, Dihydrolevoglucosenone, Benzyl Benzoate, NVP, N12P, n-propanol, isopropanol, and/or N8P.

The graphene dispersing fluid/liquid, the particulate material dispersing fluid/liquid and/or the first dispersing fluid/liquid may be the same or different and may comprise one or more liquids selected from DMSO, acetone, water, THF, Chloroform, NMP, DMF, DMA, GBL, DMEU, Benzyl Benzoate, NVP, N12P, n-propanol, isopropanol, and/or N8P.

An advantage of the present invention is its flexibility, especially when the source of graphene comprises in situ generated graphene obtainable by homogenising a dispersion of graphite, optionally in the form of graphite flakes. However, other sources of graphene may be suitable. Thus, the source of graphene may comprise one or more of graphite, graphene, graphene oxide, reduced graphene oxide, partially oxidised graphite, partially oxidised graphene, and functionalised graphite.

Suitably the source of graphene may be pristine graphene, partially oxidised graphene, partially oxidised graphite or graphite. Partially oxidised graphene and pristine graphene can be distinguished from graphene oxide and reduced graphene oxide using Raman spectroscopy, as discussed herein.

Suitably, the composite formed in the process of the present invention will comprise pristine graphene or partially oxidised graphene.

Graphene oxide typically comprises a weight percentage of oxygen of above 15 wt. %. In the scope of the present invention, the term "partially oxidised graphene" can be interpreted as a graphene oxide which only comprises oxygen in an amount of up to 15% of the total weight of the graphene, e.g. 5 to 15 wt. %. Typically, partially oxidised graphene would include oxygen in an amount of up to 10% of the total weight of the graphene. As discussed above, term "pristine graphene" refers to graphene which has not been chemically modified.

As discussed above, the preferred source of graphene comprises in situ produced graphene. Thus, preferably, the source of graphene comprises graphite flakes and the process further comprises providing a graphite dispersion of graphite flakes in a graphene dispersion fluid and homogenising the graphite dispersion, preferably under high shear, thereby forming a dispersion comprising graphene.

Preferably, the particulate material (in particular when the particulate material is titanium dioxide) has a particle size in the range 5 nm to 1 μm, preferably 10 nm to 500 nm, more preferably 15 nm to 250 nm.

A great advantage of the present process is that the composite may be recovered and the dispersion fluid (i.e. the supernatant) recovered and re-used. Thus, the process may further comprise recovering the composite, and optionally recovering the dispersion fluid, preferably for re-use.

Generally, the process may be conducted at around room temperature, but temperature is not thought to be critical. Thus, the process may be conducted at a temperature in the range 0° ° C. to 260° C., preferably 0° C. to 110° C., more preferably 0° C. to 50° C.

The present invention advantageously allows the production of graphene composites in which the graphene has a low level of defects compared to composites made by prior art processes.

The number of graphene defects in a composite can be assessed using Raman spectroscopy in a manner similar to L. G. Cancado et al. 2011, "Quantifying Defects in Graphene via Raman Spectroscopy at Different Excitation Energies", Nano Letters, which is incorporated herein by reference. The ratio of the intensity of the observed D peak Raman intensity, referred to as I(D), to the G peak Raman intensity, referred to as I(G), indicates the amount of defects present on/in the graphene. This is referred to as the I(D)/I(G) ratio. The distance between defects is a measure of the amount of disorder. Given the distance between defects is greater than approximately 4 nm; the lower the I(D)/I(G) ratio, the greater the distance between defects.

The composites formed by the method of the present invention may have an I(D)/I(G) ratio of less than 0.75, less than 0.6 or preferably less than 0.5 at a laser excitation wavelength of 532 nm (2.33 eV). Thus, the composites formed by the method of the present invention may have an I(D)/I(G) ratio of from 0.01 to 0.75, 0.02 to 0.65 or 0.04 to 0.55 at a laser excitation wavelength of 532 nm (2.33 eV). Given the distance between defects is greater than approximately 4 nm and a laser excitation wavelength of 532 nm (2.33 eV); an I(D)/I(G) ratio less than 1 indicates that the defects are greater than 9.5 nm apart.

It is also possible to assess the nature of the graphene defects using Raman spectroscopy. In general, defects in graphene are considered to be anything that breaks the symmetry of the infinite carbon hexagonal lattice. This therefore includes edges, vacancies and changes in carbon-hybridization (e.g. sp2 into sp3). An sp3 defect is due to an additional atom being present out-of-plane of the graphene layer resulting in an sp3 hybridized carbon atom or atoms. A vacancy defect is due to one or more missing atoms of a 2D material layer. An edge defect is due to a graphene sheet not being infinitely large and therefore having an edge.

Partially oxidised graphene and pristine graphene can be distinguished from graphene oxide, functionalised graphene and reduced graphene oxide using Raman spectroscopy, as discussed herein. Graphene oxide and functionalised graphene contain high amounts of sp3 defects. Reduced graphene oxide is formed from the reduction of graphene oxide with reducing agent. Reduced graphene oxide also includes a large amount of vacancy defects, as a result of the removal of oxygen to leave holes in the hexagonal lattice. Thus, graphene oxide and reduced graphene oxide typically have an I(D)/I(G) ratio of above 0.8. Conversely, partially oxidised graphene oxide has fewer oxygen atoms compared to graphene oxide but has not undergone harsh reduction processes like reduced graphene oxide. Thus, more of the hexagonal structure is maintained, meaning fewer sp3 and vacancy defects. The number of defects can be assessed by measuring the I(D)/I(G) ratio as discussed above.

The presence of sp3 defects and vacancy defects can have a detrimental impact on the usefulness of the final composite. Thus, it is desirable for the number of sp3 and/or vacancy defects to be minimised.

The ratio of the intensity of the Raman D peak, referred to as I(D), to the Raman D' peak, referred to as I(D'), signifies the type of defects present in the sample. This is referred to as the I(D)/I(D') ratio. A ratio less than approximately 3.5 at a laser excitation wavelength of 514.5 nm (2.41 eV) indicates contributions from edge defects dominate. A ratio of approximately 7 indicates the presence of vacancy defects and a ratio of approximately 13 or more suggests sp3 defects.

The graphene composites of the present invention may have an I(D)/I(D') ratio of from 0.01 to 7, 0.01 to 4.5, 0.01 to 3.5 or preferably from 0.1 to 3.45 at a laser excitation wavelength of 532 nm (2.33 eV). Thus, the composites of the present invention will preferably have minimal sp3 defects and more preferably minimal vacancy defects.

In a second aspect, the present invention provides, a process for producing a photocatalytically active composite, the process comprising:

a) providing a source of graphene, b) providing titanium dioxide in particulate form, c) dispersing a mixture of the source of graphene and titanium dioxide in a first dispersion fluid to form a dispersion mixture, and d) providing a source of a base in the first dispersion fluid, thereby causing the source of graphene and titanium dioxide in the dispersion mixture to interact forming a photocatalytically active composite.

In a third aspect, the present invention provides, a photocatalytically active composite obtainable by a process according to the first or second aspects.

There is also provided a composite obtainable by the processes defined herein.

Composites obtainable by the process have many potential uses. Thus, composites (especially photocatalytically active composites) may be used in electrodes, e.g. as an anode material in a rechargeable cell (preferably lithium-ion); the use of composites obtainable by the above method as a graphene-semiconductor composite material; the use of photocatalytically active composites as an N-type semiconductor layer, which can be applied from fluid dispersion onto a surface. Such N-type semiconductor layers may be used in Perovskite solar cells, wherein composites produced by this method are used as the electron collection layer. Composites obtainable by the process may find use as a capacitive deionization electrode.

Photocatalytically active composites obtainable by the process have uses in many other areas, including removing aqueous and air-borne pollutants, in coverings, coatings and in paints.

Composites obtainable by the process may find use as a sorbent material to sorb (absorb and/or adsorb) gaseous or liquid pollutants from a flow of fluid for subsequent destruction or separation.

Thus, in a fourth aspect, the present invention provides apparatus to remove pollutants from fluids, the apparatus comprising a fluid inlet, a fluid conduit to supply fluid from the fluid inlet to a photocatalytically active composite according to the first or second aspect and a fluid outlet.

The fluid may comprise, for example, air (to clean ambient air either inside buildings or outside) or water.

Embodiments of the present invention will now be described with reference to the following figures, in which.

Figures 6, 7:
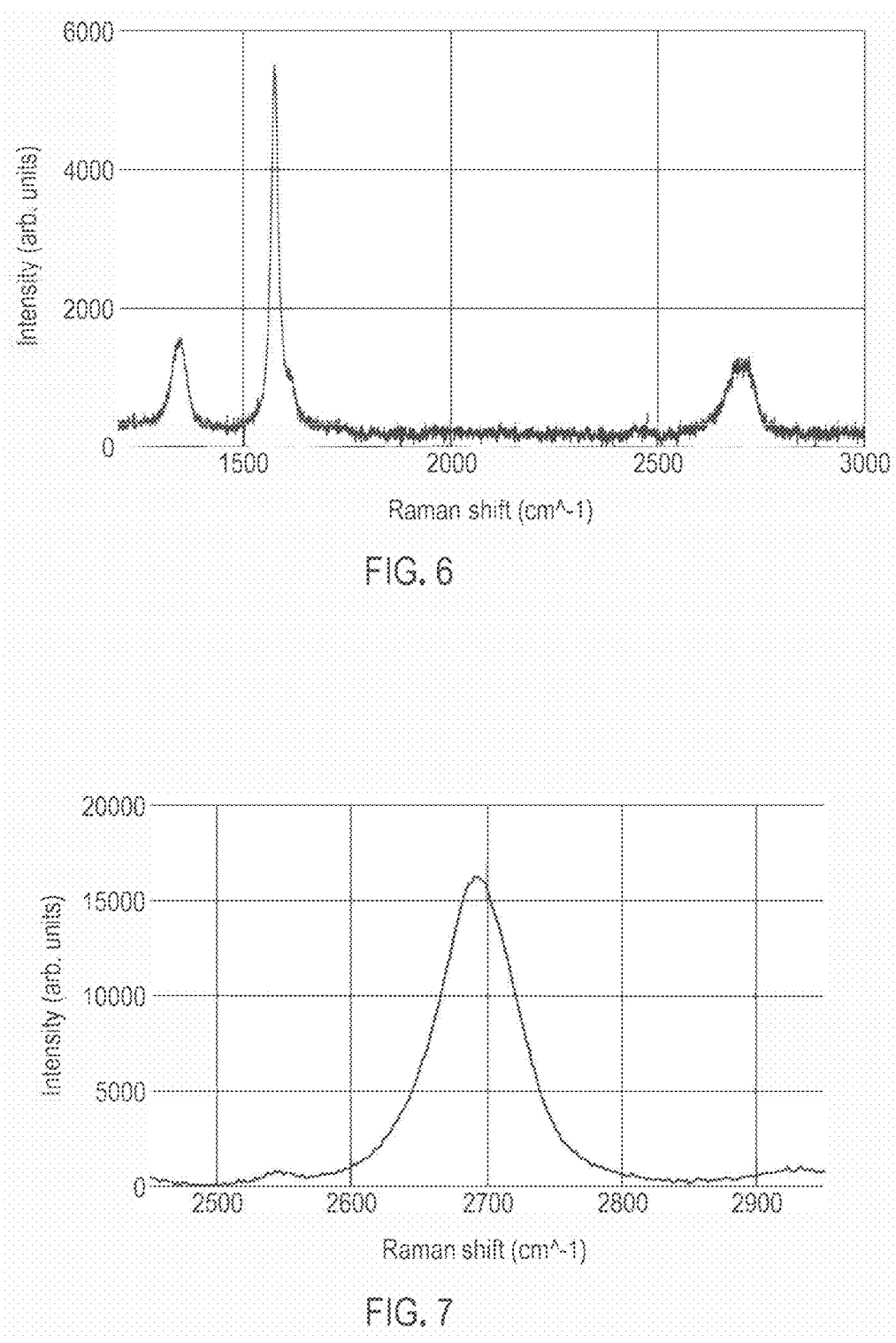

FIG. 6. Extended Raman spectrum of a titanium dioxide-graphene composite of Example 1. The data is the same as for FIG. 4. Spectrum was collected using a Renishaw in Via Raman microscope with laser excitation wavelength=532 nm.

FIG. 7. Raman spectrum of a titanium dioxide-graphene composite produced via the process described in Example 1, highlighting the 2D graphene peak. Spectrum was collected using a Renishaw inVia Raman microscope with laser excitation wavelength=532 nm.

Figures 8, 9:
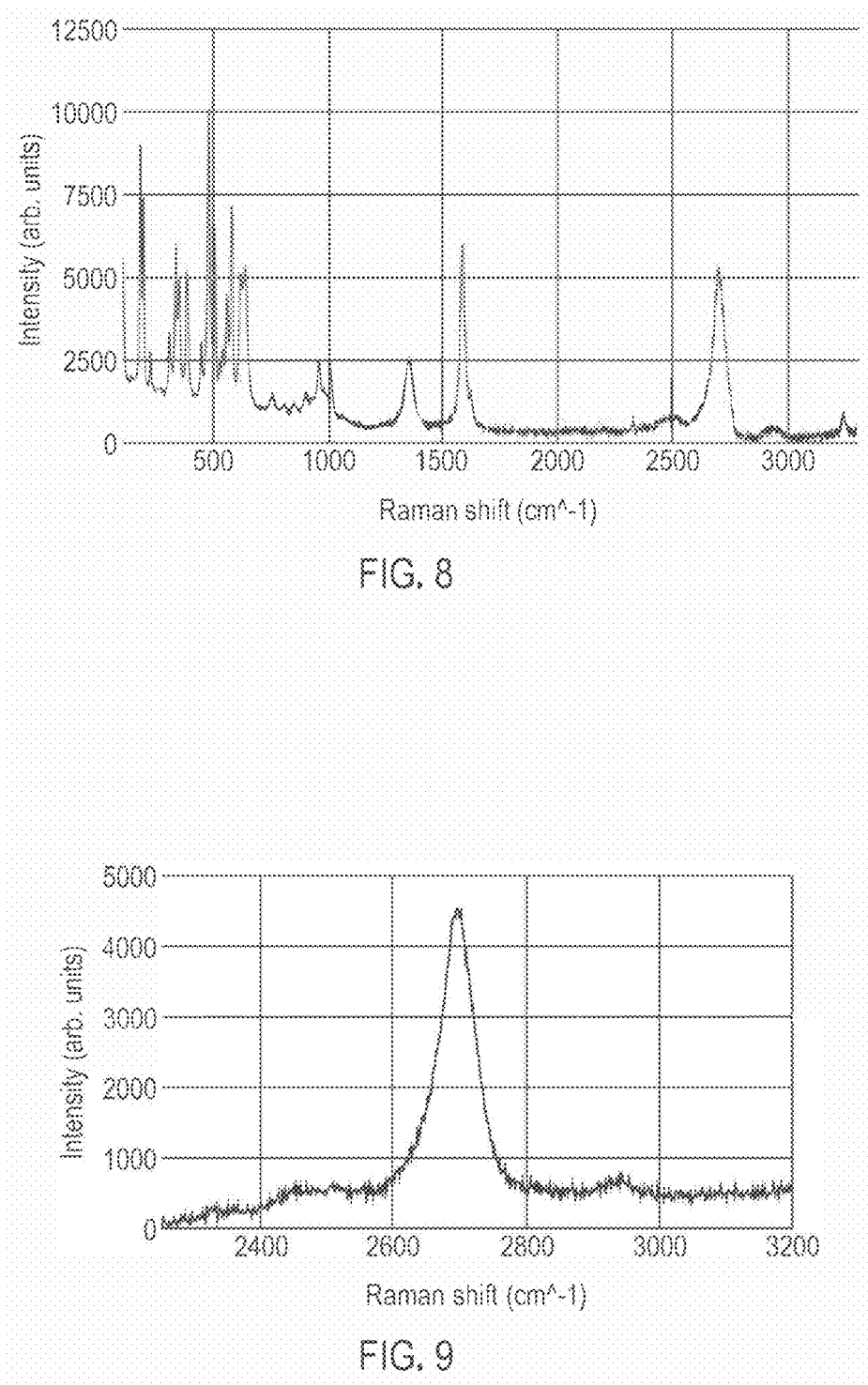

FIG. 8. Extended Raman spectrum of a zirconium oxide-graphene composite produced via the process described in method 4. Spectrum was collected using a Renishaw in Via Raman microscope with laser excitation wavelength=532 nm.

FIG. 9. Raman spectrum of a zirconium oxide-graphene composite produced via the process described in method 4, highlighting the 2D graphene peak. Spectrum was collected using a Renishaw inVia Raman microscope with laser excitation wavelength=532 nm.

Figures 10, 11:
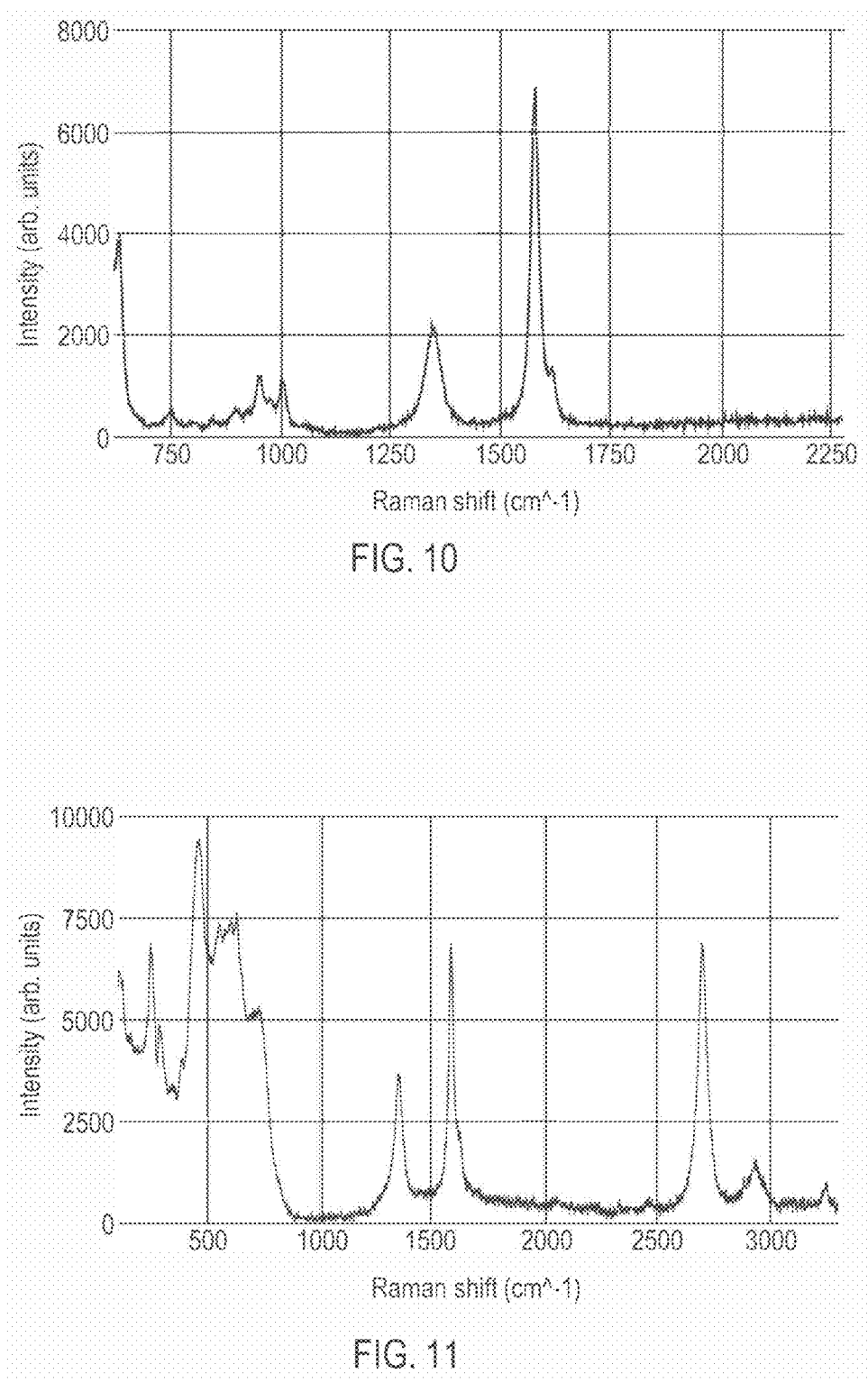

FIG. 10. Raman spectrum of a zirconium oxide-graphene composite produced via the process described in method 4, highlighting the D, G and D' graphene peaks. Spectrum was collected using a Renishaw inVia Raman microscope with laser excitation wavelength=532 nm.

FIG. 11. Extended Raman spectrum of an antimony tin oxide-graphene composite produced via the process described in method 4. Spectrum was collected using a Renishaw in Via Raman microscope with laser excitation wavelength=532 nm.

Figure 12:
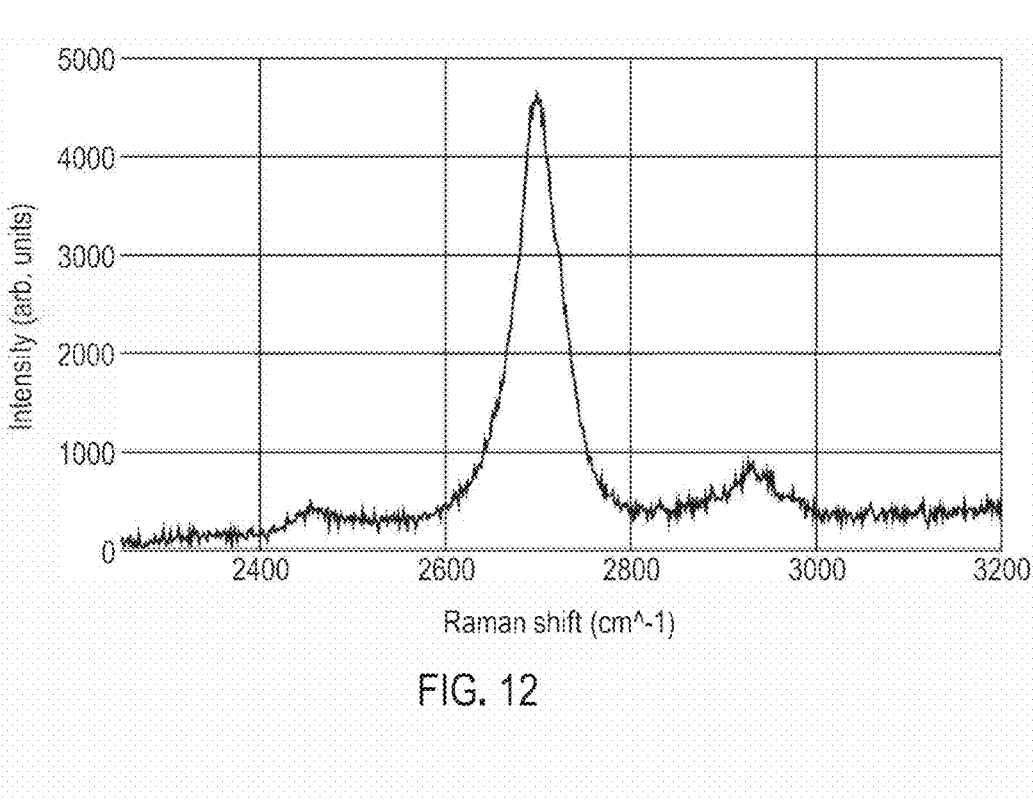

FIG. 12. Raman spectrum of an antimony tin oxide-graphene composite produced via the process described in method 4, highlighting the 2D graphene peak. Spectrum was collected using a Renishaw inVia Raman microscope with laser excitation wavelength=532 nm.

Figure 13:
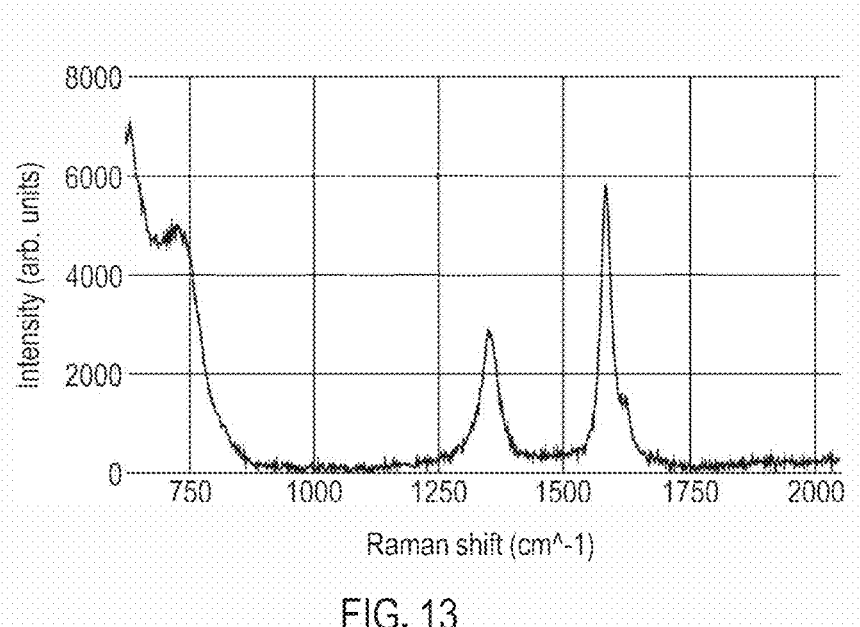

FIG. 13. Raman spectrum of an antimony tin oxide-graphene composite produced via the process described in method 4, highlighting the D, G and D' graphene peaks. Spectrum was collected using a Renishaw inVia Raman microscope with laser excitation wavelength=532 nm.

Figure 14:
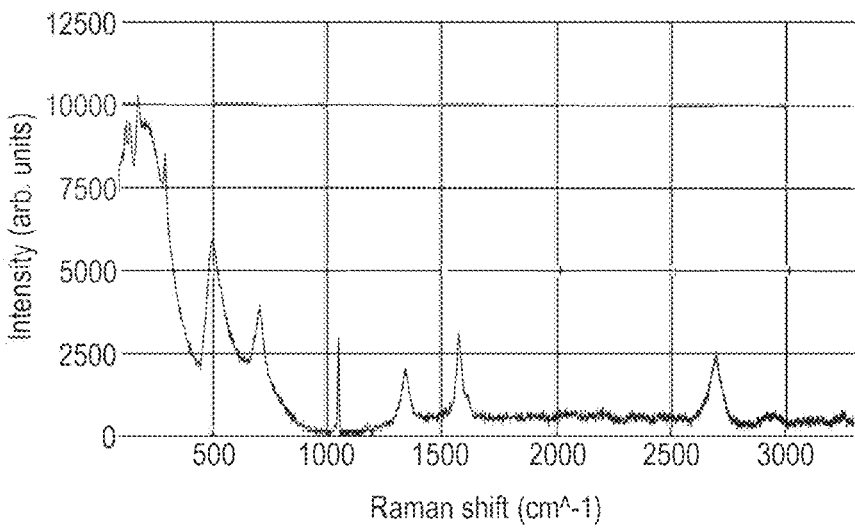

FIG. 14. Extended Raman spectrum of a barium titanate (cubic structure)-graphene composite produced via the process described in method 4. Spectrum was collected using a Renishaw in Via Raman microscope with laser excitation wavelength=532 nm.

Figure 15:
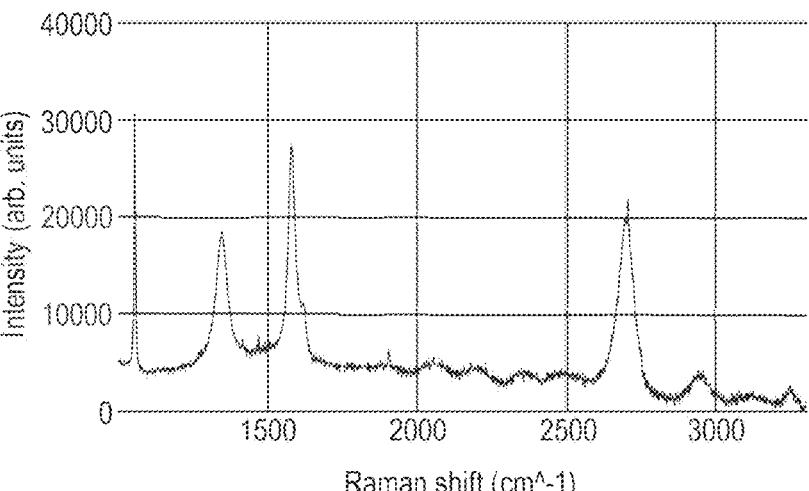

FIG. 15. Additional extended Raman spectrum of a barium titanate (cubic structure)-graphene composite produced via the process described in method 4. Spectrum was collected using a Renishaw inVia Raman microscope with laser excitation wavelength=532 nm.

Figure 16:
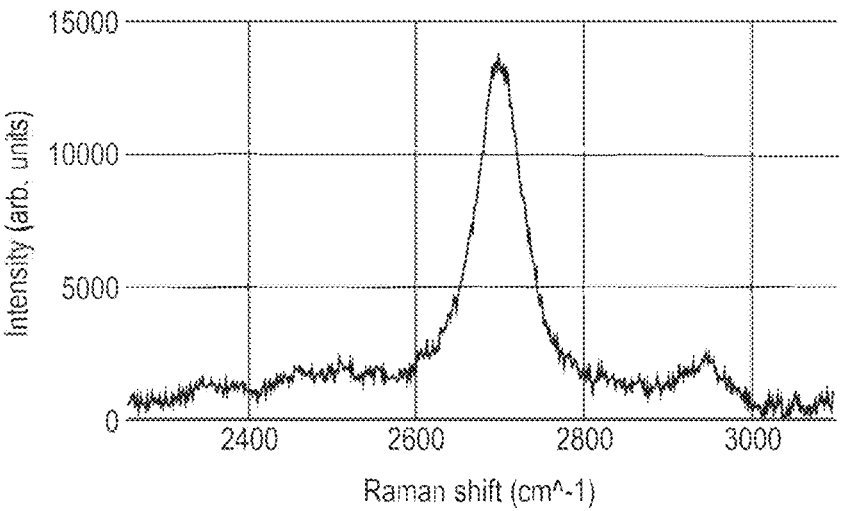

FIG. 16. Raman spectrum of a barium titanate (cubic structure)-graphene composite produced via the process described in method 4, highlighting the 2D graphene peak. Spectrum was collected using a Renishaw inVia Raman microscope with laser excitation wavelength=532 nm.

Figure 17:
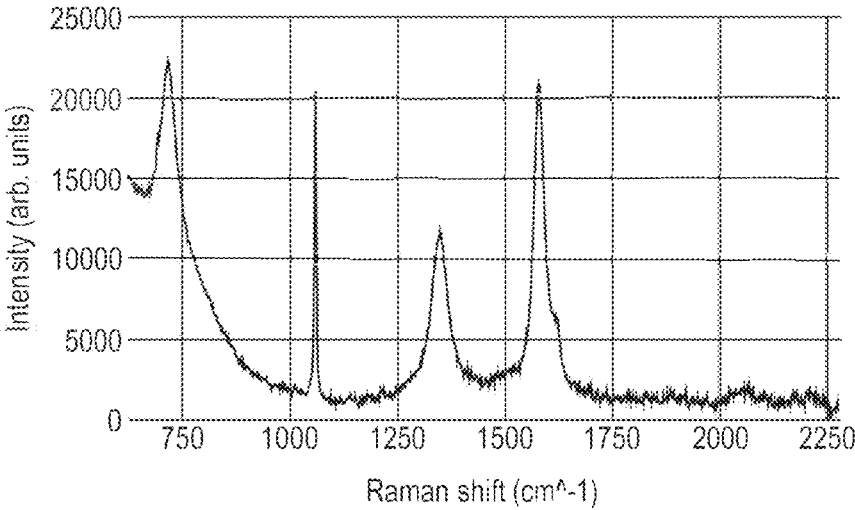

FIG. 17. Raman spectrum of a barium titanate (cubic structure)-graphene composite produced via the process described in method 4, highlighting the D, G and D' graphene peaks. Spectrum was collected using a Renishaw inVia Raman microscope with laser excitation wavelength=532 nm.

Figure 18:
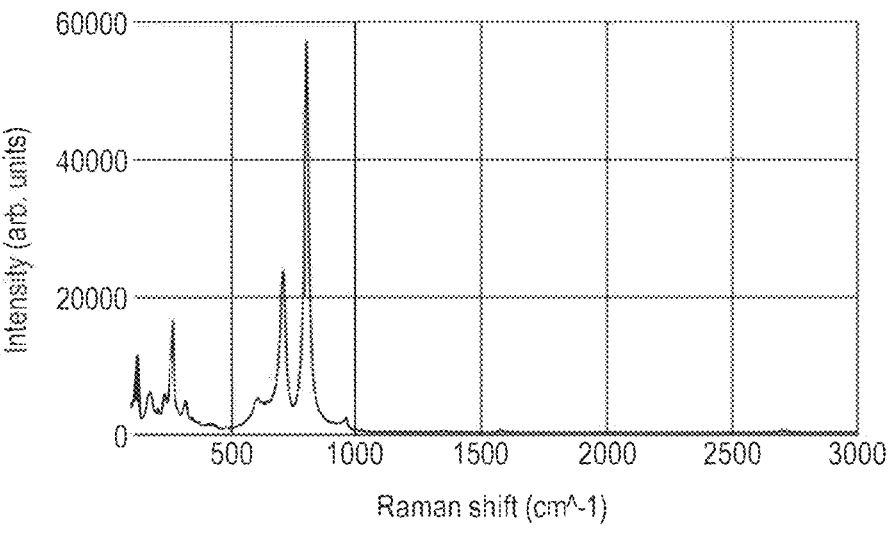

FIG. 18. Extended Raman spectrum of a tungsten trioxide-graphene composite produced via the process described in method 4. Spectrum was collected using a Renishaw in Via Raman microscope with laser excitation wavelength=532 nm.

Figure 19:
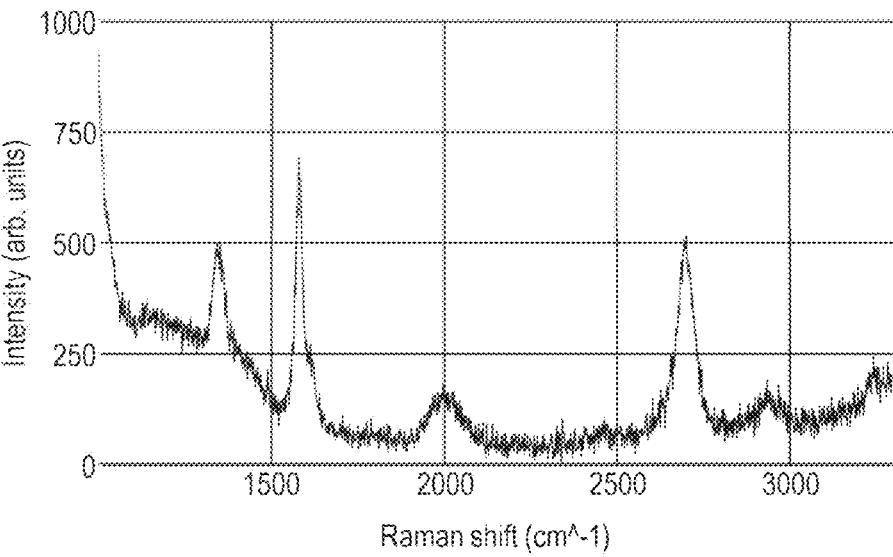

FIG. 19. Additional extended Raman spectrum of a tungsten trioxide-graphene composite produced via the process described in method 4. Spectrum was collected using a Renishaw in Via Raman microscope with laser excitation wavelength=532 nm.

Figures 20, 21:
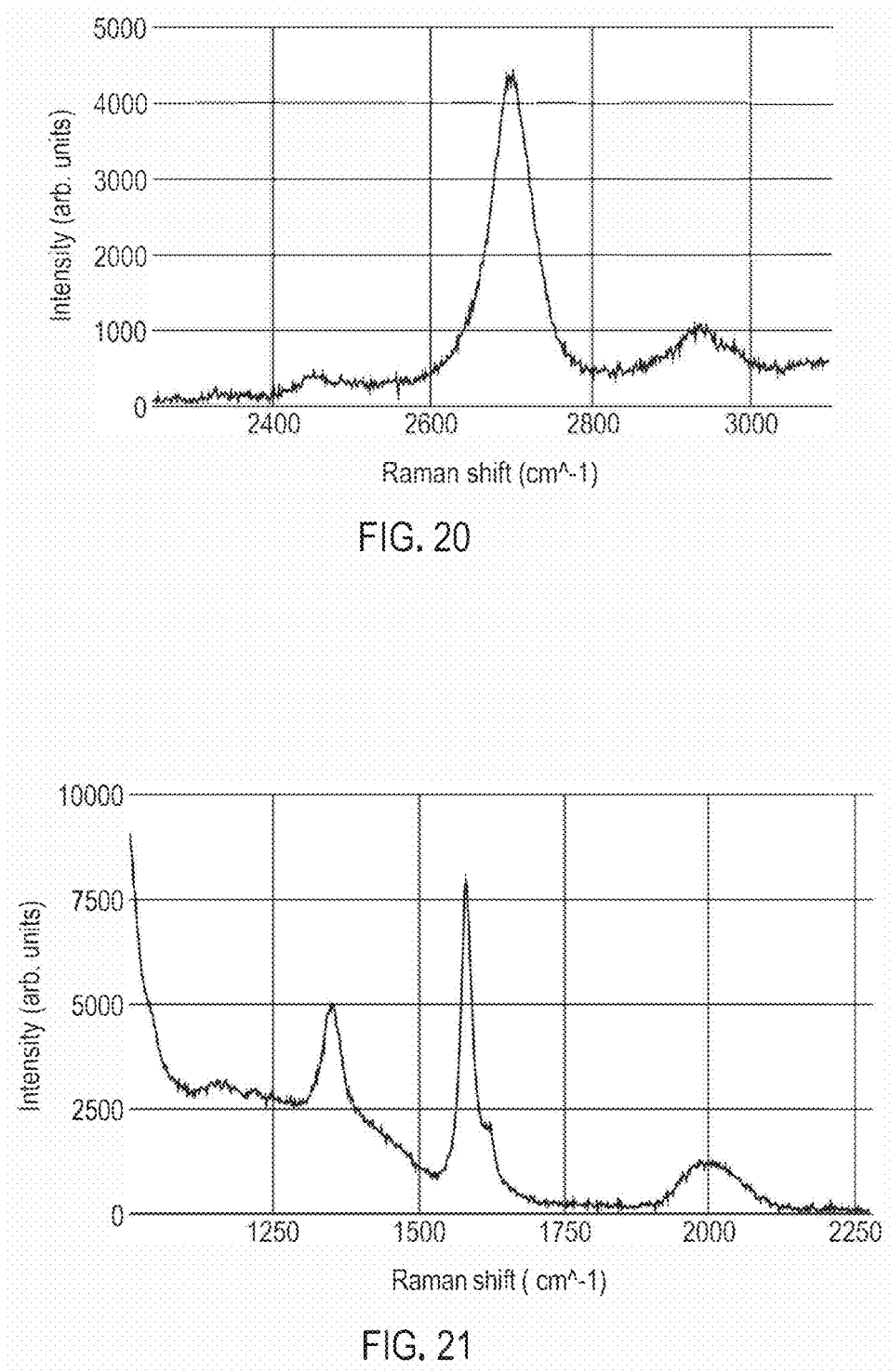

FIG. 20. Raman spectrum of a tungsten trioxide-graphene composite produced via the process described in method 4, highlighting the 2D graphene peak. Spectrum was collected using a Renishaw inVia Raman microscope with laser excitation wavelength=532 nm.

FIG. 21. Raman spectrum of a tungsten trioxide-graphene composite produced via the process described in method 4, highlighting the D, G and D' graphene peaks. Spectrum was collected using a Renishaw inVia Raman microscope with laser excitation wavelength=532 nm.

Figure 22:
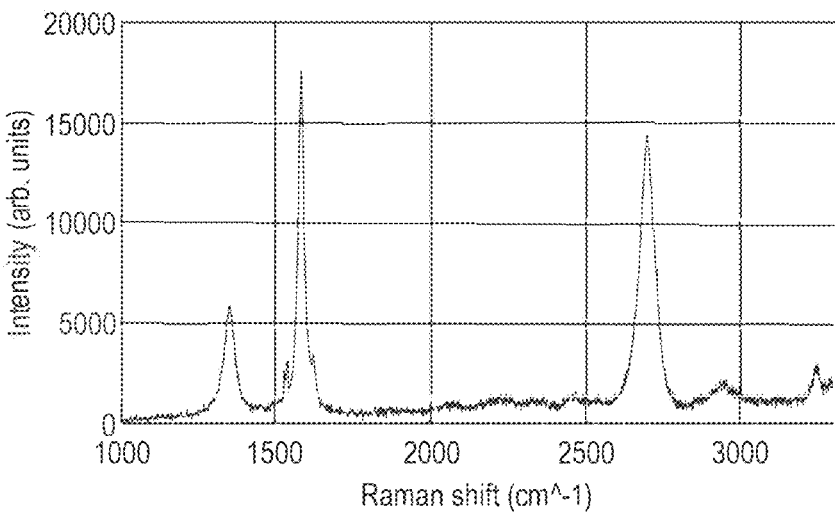

FIG. 22. Extended Raman spectrum of an aluminium oxide-graphene composite produced via the process described in method 4. Spectrum was collected using a Renishaw in Via Raman microscope with laser excitation wavelength=532 nm.

Figure 23:
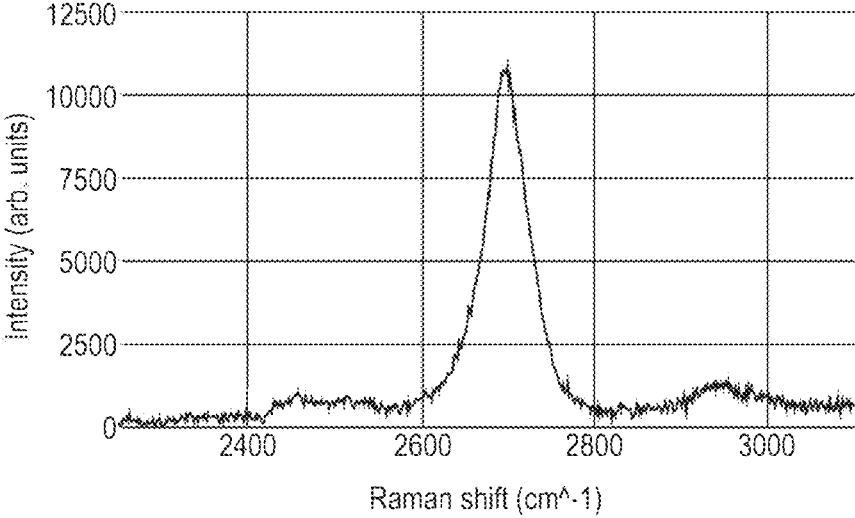

FIG. 23. Raman spectrum of an aluminium oxide-graphene composite produced via the process described in method 4, highlighting the 2D graphene peak. Spectrum was collected using a Renishaw inVia Raman microscope with laser excitation wavelength=532 nm.

Figures 24, 25:
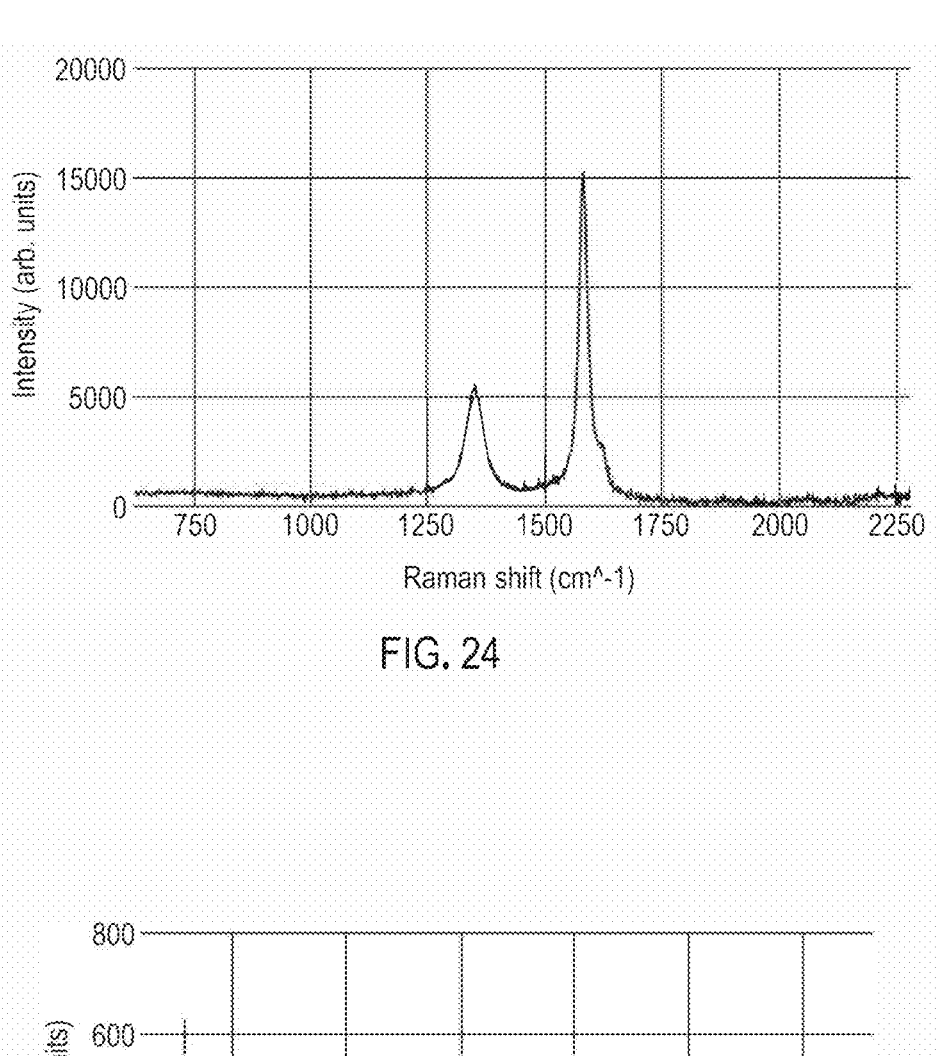

FIG. 24. Raman spectrum of an aluminium oxide-graphene composite produced via the process described in method 4, highlighting the D, G and D' graphene peaks. Spectrum was collected using a Renishaw inVia Raman microscope with laser excitation wavelength=532 nm.

FIG. 25. Extended Raman spectrum of a copper oxide-graphene composite produced via the process described in method 4. Spectrum was collected using a Renishaw in Via Raman microscope with laser excitation wavelength=532 nm.

Figure 26:
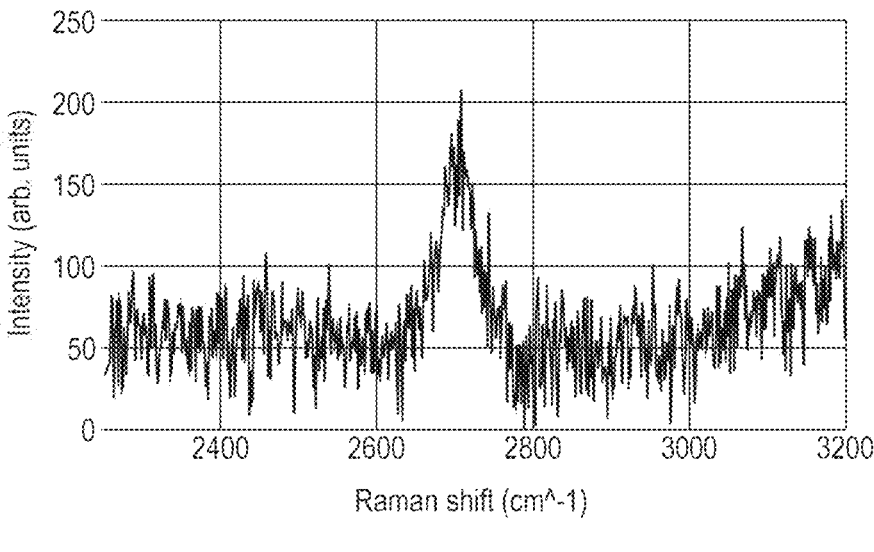

FIG. 26. Raman spectrum of a copper oxide-graphene composite produced via the process described in method 4, highlighting the 2D graphene peak. Spectrum was collected using a Renishaw inVia Raman microscope with laser excitation wavelength=532 nm.

Figure 27:
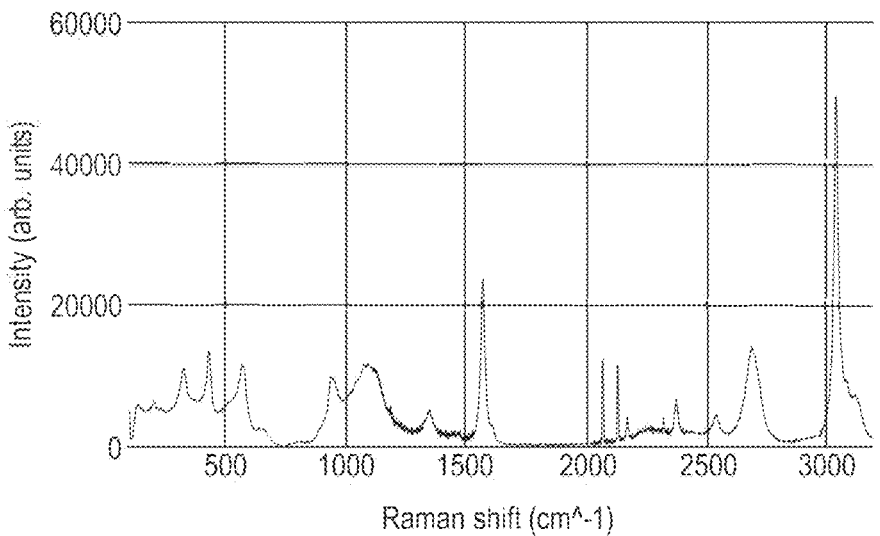

FIG. 27. Extended Raman spectrum of a zinc oxide-graphene composite produced via the process described in method 4. Spectrum was collected using a Renishaw in Via Raman microscope with laser excitation wavelength=532 nm.

Figures 28, 29:
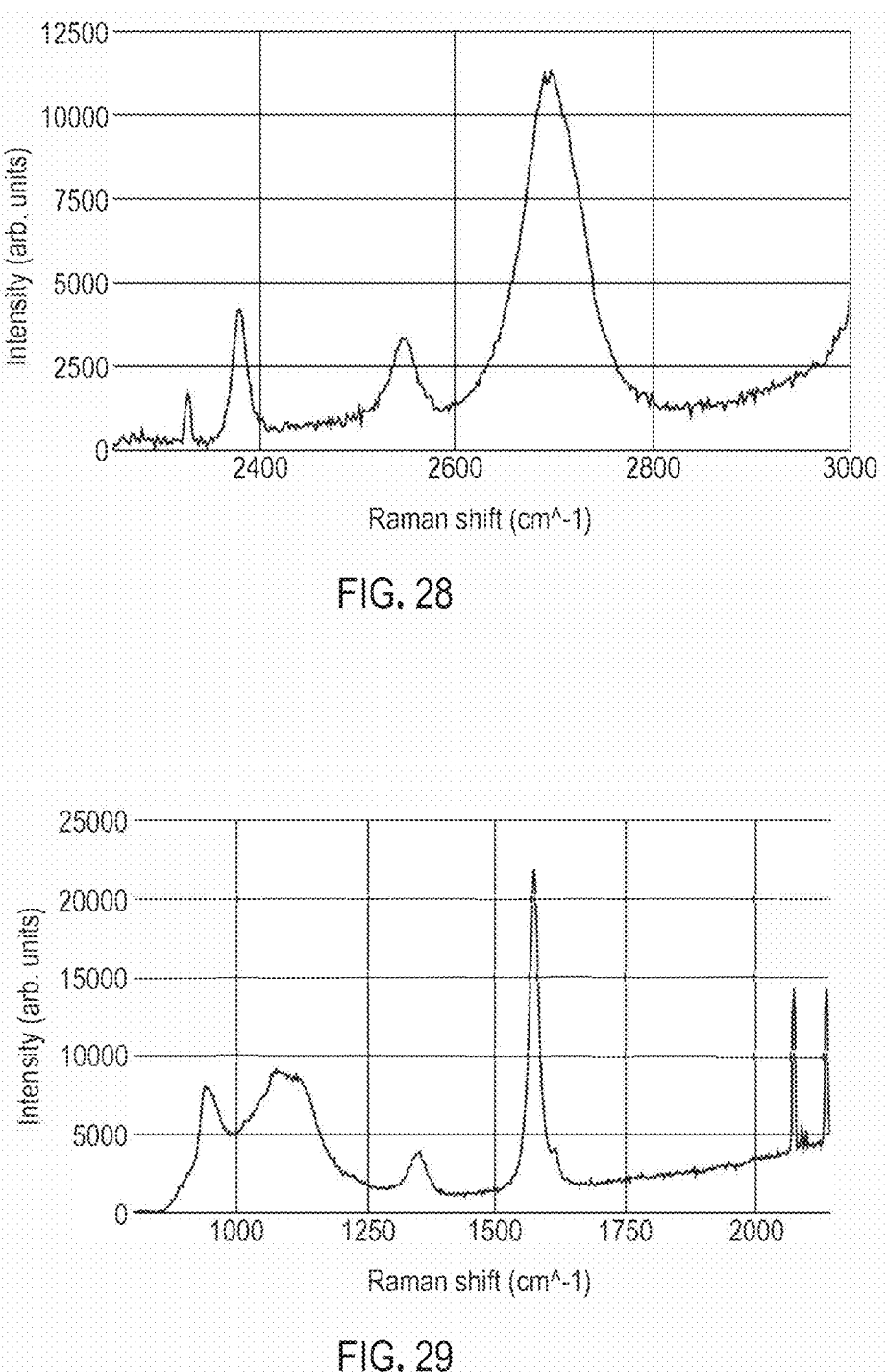

FIG. 28. Raman spectrum of a zinc oxide-graphene composite produced via the process described in method 4, highlighting the 2D graphene peak. Spectrum was collected using a Renishaw inVia Raman microscope with laser excitation wavelength=532 nm.

FIG. 29. Raman spectrum of a zinc oxide-graphene composite produced via the process described in method 4, highlighting the D, G and D' graphene peaks. Spectrum was collected using a Renishaw inVia Raman microscope with laser excitation wavelength=532 nm.

Figures 30, 31:
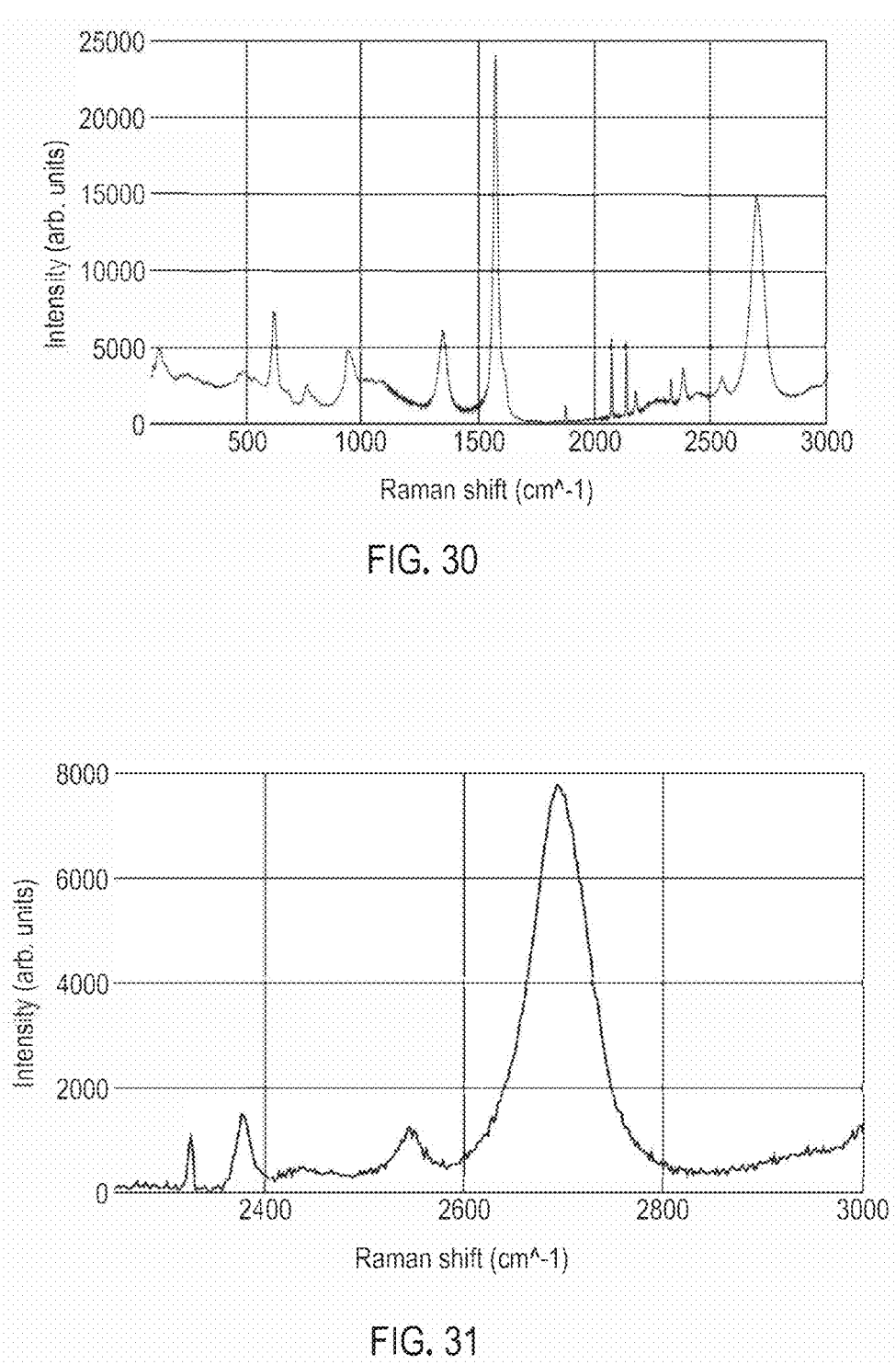

FIG. 30. Extended Raman spectrum of a tin oxide-graphene composite produced via the process described in method 4. Spectrum was collected using a Renishaw in Via Raman microscope with laser excitation wavelength=532 nm.

FIG. 31. Raman spectrum of a tin oxide-graphene composite produced via the process described in method 4, highlighting the 2D graphene peak. Spectrum was collected using a Renishaw in Via Raman microscope with laser excitation wavelength=532 nm.

Figures 32, 33:
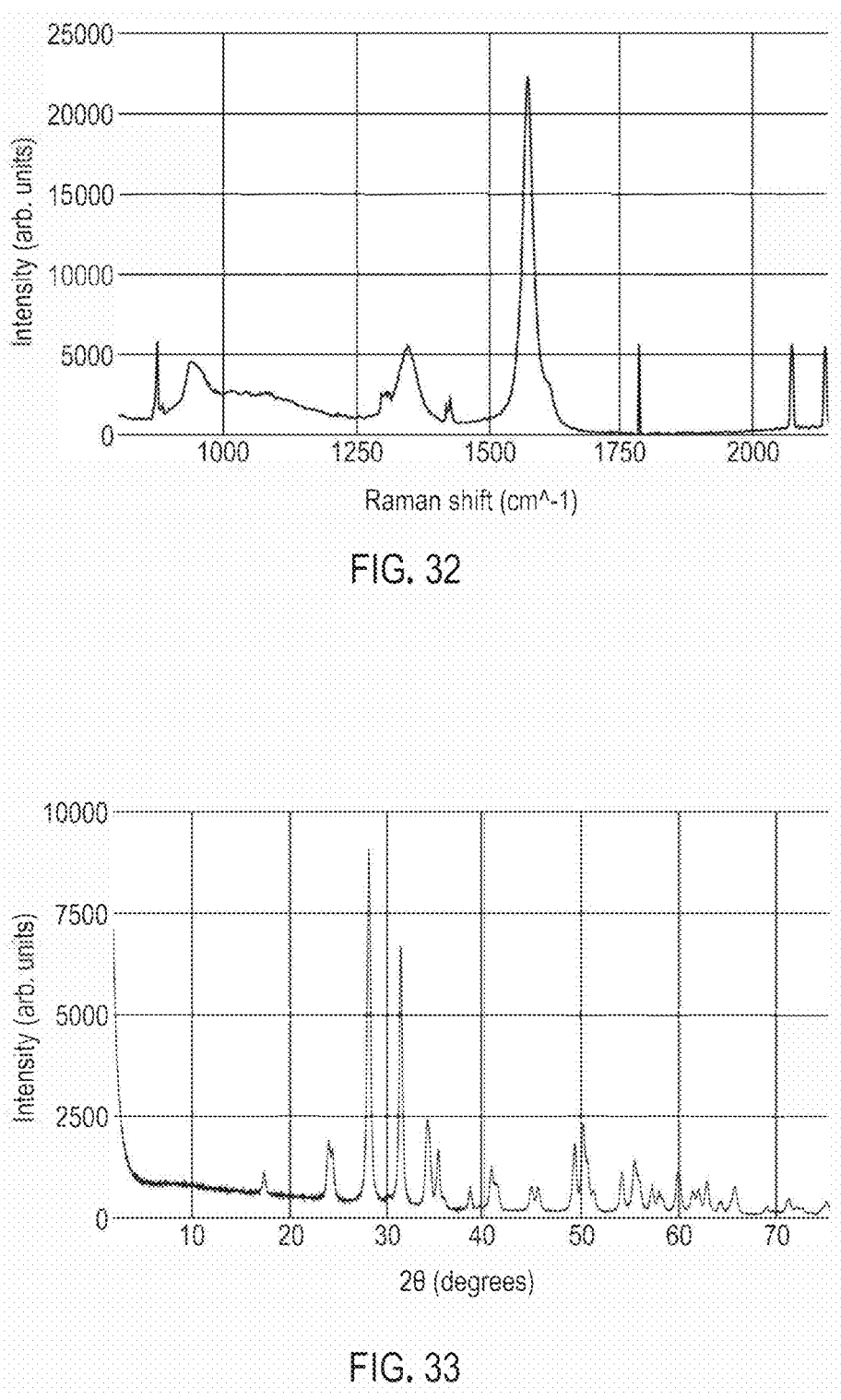

FIG. 32. Raman spectrum of a tin oxide-graphene composite produced via the process described in method 4, highlighting the D, G and D' graphene peaks. Spectrum was collected using a Renishaw inVia Raman microscope with laser excitation wavelength=532 nm.

FIG. 33. X-ray powder diffraction pattern of a zirconium oxide-graphene composite produced via the process described in method 4. Pattern was collected using a STOE diffractometer operated in transmission with a PSD detector and a germanium monochromator (Cu K-alpha1 radiation wavelength=1.540598 A°).

Figure 34:
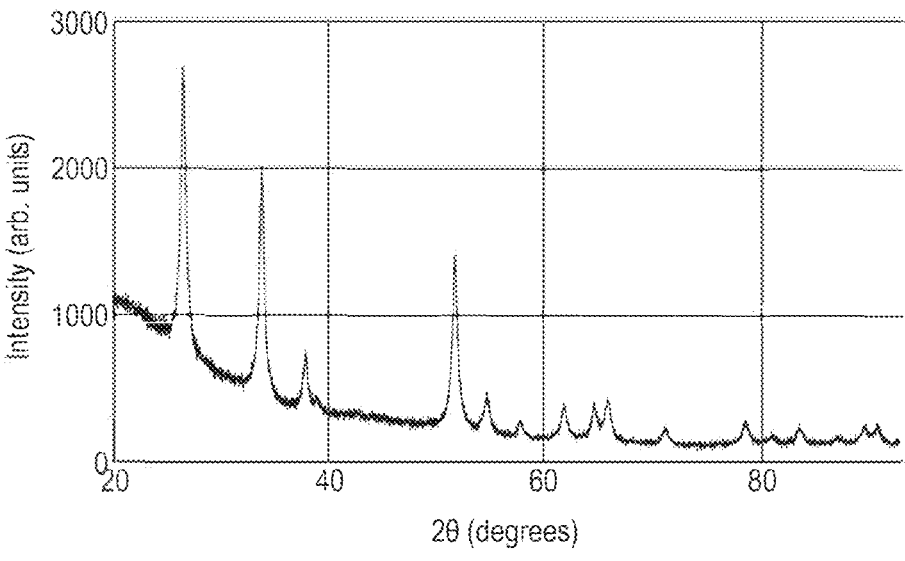

FIG. 34. X-ray powder diffraction pattern of an antimony tin oxide-graphene composite produced via the process described in method 4. Pattern was collected using a STOE diffractometer operated in transmission with a PSD detector and a germanium monochromator (Cu K-alpha1 radiation wavelength=1.540598 A°).

Figure 35:
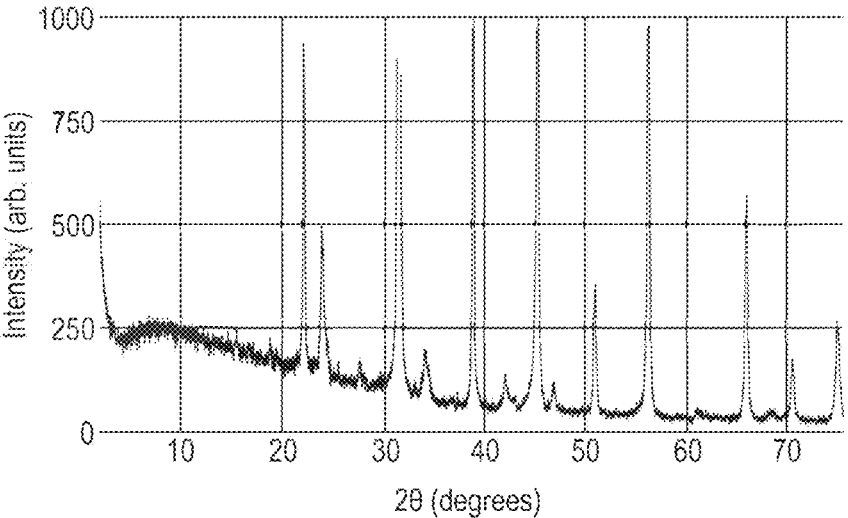

FIG. 35. X-ray powder diffraction pattern of a barium titanate (cubic structure)-graphene composite produced via the process described in method 4. Pattern was collected using a STOE diffractometer operated in transmission with a PSD detector and a germanium monochromator (Cu K-alpha1 radiation wavelength=1.540598 A°).

Figures 36, 37:
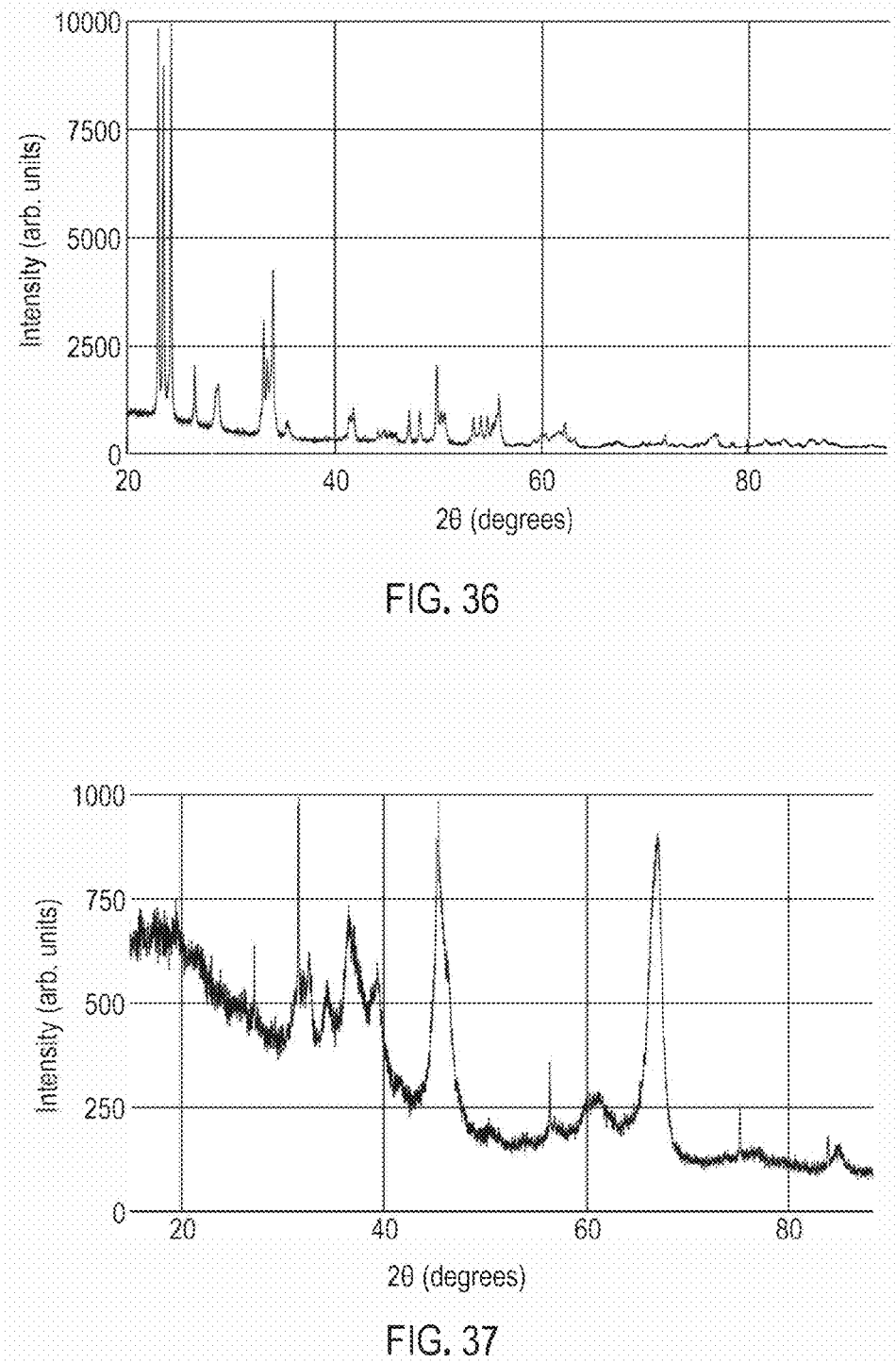

FIG. 36. X-ray powder diffraction pattern of a tungsten trioxide-graphene composite produced via the process described in method 4. Pattern was collected using a STOE diffractometer operated in transmission with a PSD detector and a germanium monochromator (Cu K-alpha1 radiation wavelength=1.540598 A°).

FIG. 37. X-ray powder diffraction pattern of an aluminium oxide-graphene composite produced via the process described in method 4. Pattern was collected using a STOE diffractometer operated in transmission with a PSD detector and a germanium monochromator (Cu K-alpha1 radiation wavelength=1.540598 A°).

Figure 38:
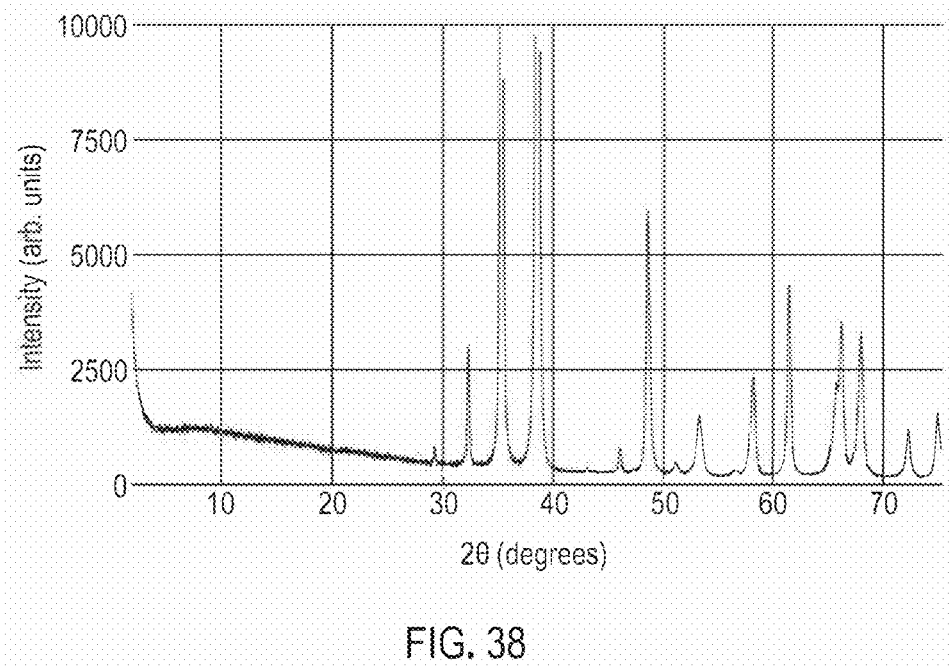

FIG. 38. X-ray powder diffraction pattern of a copper oxide-graphene composite produced via the process described in method 4. Pattern was collected using a STOE diffractometer operated in transmission with a PSD detector and a germanium monochromator (Cu K-alpha1 radiation wavelength=1.540598 A°).

Figure 39:
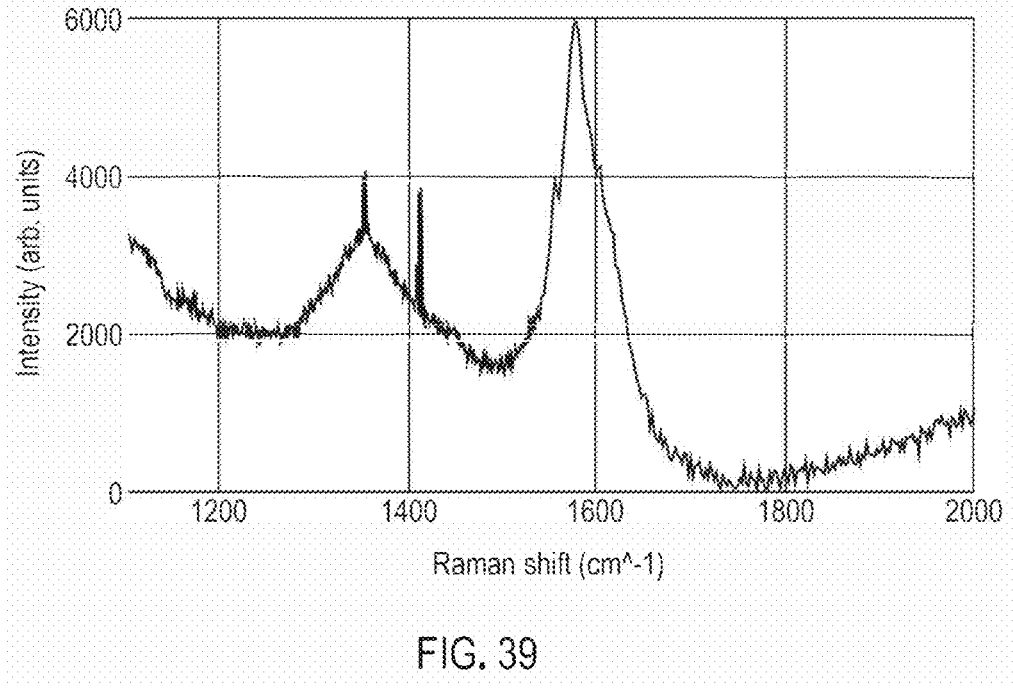

FIG. 39: Raman spectrum of an aluminium oxide-xGNP composite produced via the process described in method 8. Spectrum was collected using a Renishaw in Via Raman microscope with laser excitation wavelength=532 nm.

Figures 40A, 40B, 40C:
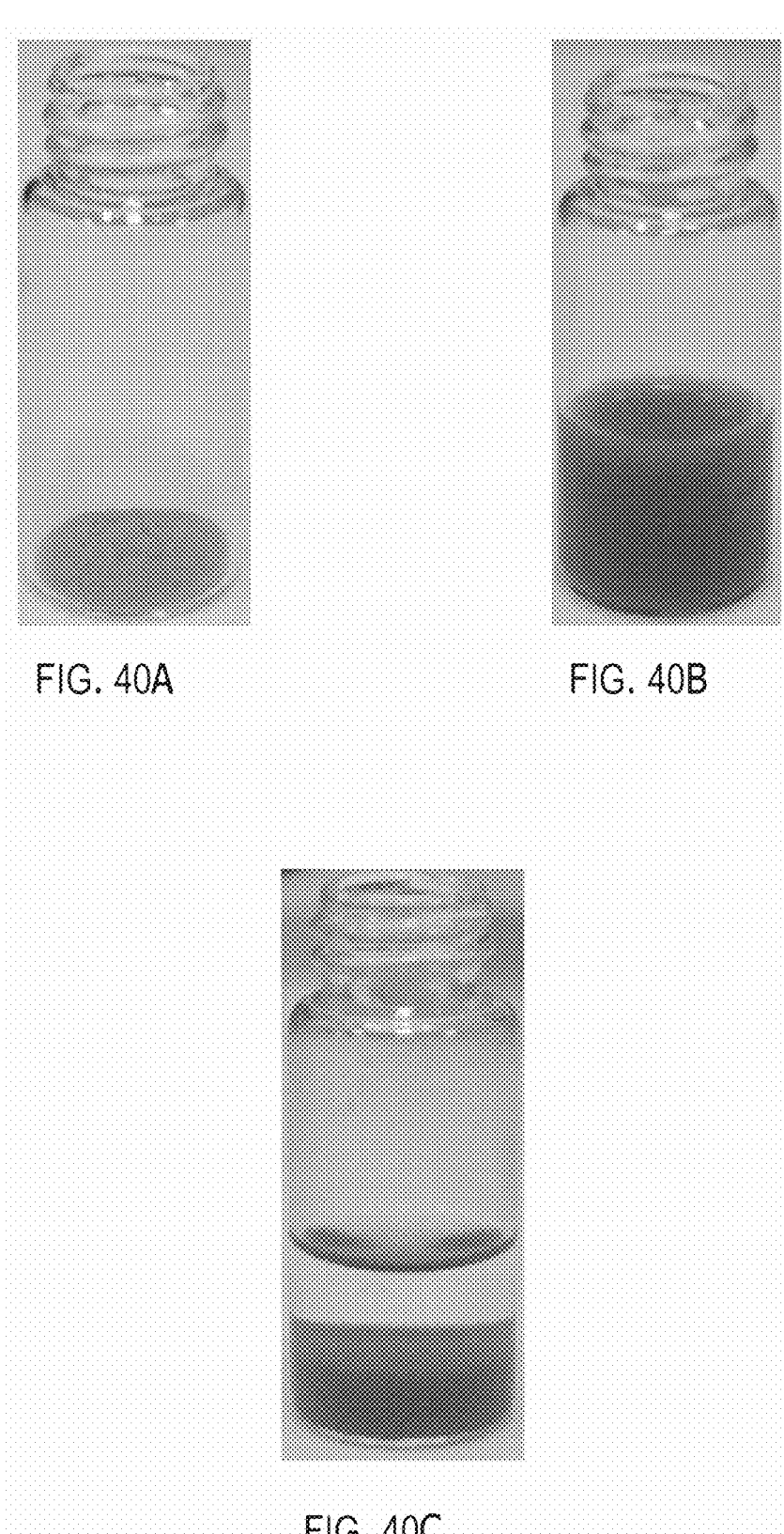

FIG. 40A shows a photo of 50 mg of the initial metal oxide powder produced during the graphene/metal oxide composite synthesis procedure detailed in method 4, with antimony-doped tin oxide as the model metal oxide. Similar behaviours are seen for different metal oxides—all tested with method 4 formed a flocculated product, which could be collected and characterised with Raman Spectroscopy.

FIG. 40B shows a photo of a mixture of metal oxide powder and the graphene dispersion (5 ml) produced during the graphene/metal oxide composite synthesis procedure detailed in method 4, with antimony-doped tin oxide as the model metal oxide. Similar behaviours are seen for different metal oxides—all tested with method 4 formed a flocculated product, which could be collected and characterised with Raman Spectroscopy.

FIG. 40C shows a photo of a composite produced during the graphene/metal oxide composite synthesis procedure detailed in method 4, with antimony-doped tin oxide as the model metal oxide. Similar behaviours are seen for different metal oxides—all tested with method 4 formed a flocculated product, which could be collected and characterised with Raman Spectroscopy. The photo shows the composite settling/flocculating out of dispersion once the base (50 microlitres of 1M NaOH) is added. The transparent nature of the supernatant indicates that the base has caused the previously dispersed graphene to interact with the metal oxide material, to form a flocculated product.

Figures 41A, 41B, 41C:
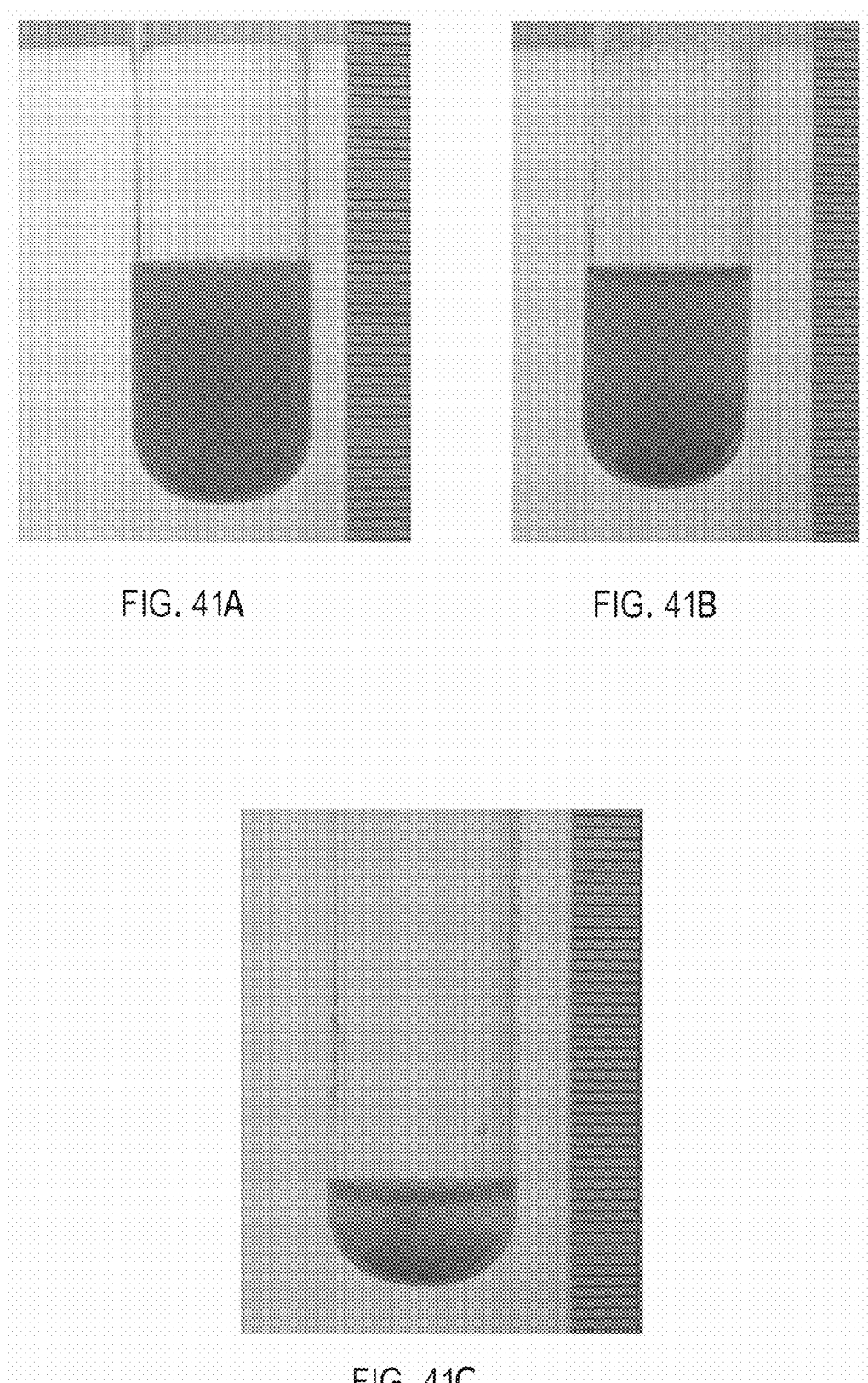

FIG. 41A shows a photo of a mixture of PLA and graphene dispersion after 2 minutes sonication, where the mixture is homogeneous and stable, produced during the graphene/polymer composite procedure detailed in example 9, with PVA-stabilised PLA as the model polymer.

FIG. 41B shows a photo of a mixture of PLA and graphene dispersion 3 minutes after adding base (~50 microlitres of saturated ammonium carbonate solution), where some precipitated composite is seen on the sides of the glass tube, likely deposited from the mixture solution during the sonication and agitation step. A darker mass is seen at the bottom of the tube, indicating the formation of a flocculated product.

FIG. 41C shows a photo of the flocculated product, taken 5 minutes after the addition of base. Some of the supernatant has been removed to allow easier identification of the flocculated product. Here, gelled/coagulated composite is seen on the tube walls, the solution has turned semitransparent, and a darker material is observed at the bottom of the tube. This indicates the formation of a homogeneous composite of graphene and PLA.

Figure 42:
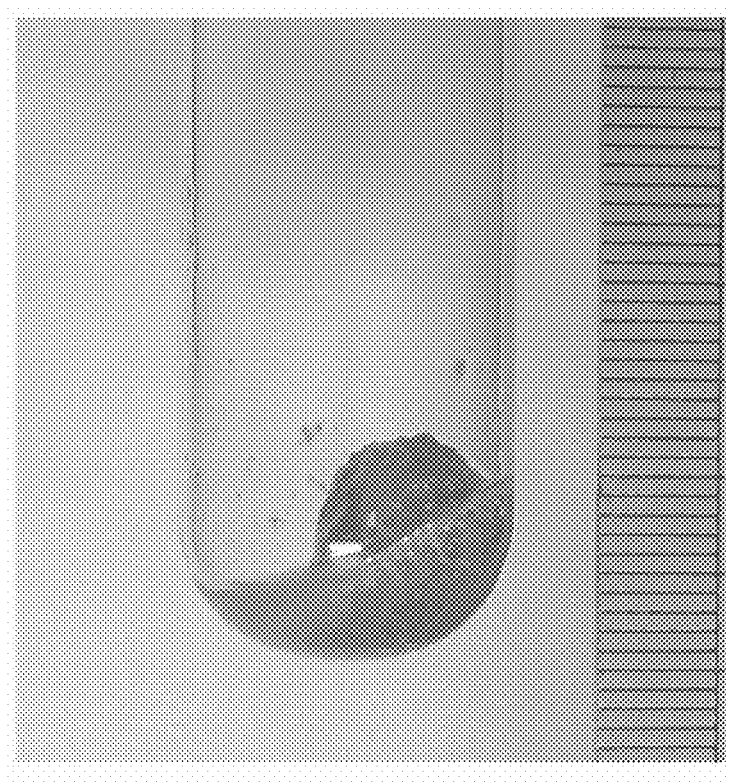

FIG. 42: the rubbery grey solid formed using the method described in example 5. Most of the supernatant has been removed to facilitate better viewing of the product formed.

Figures 43A, 43B, 43C:
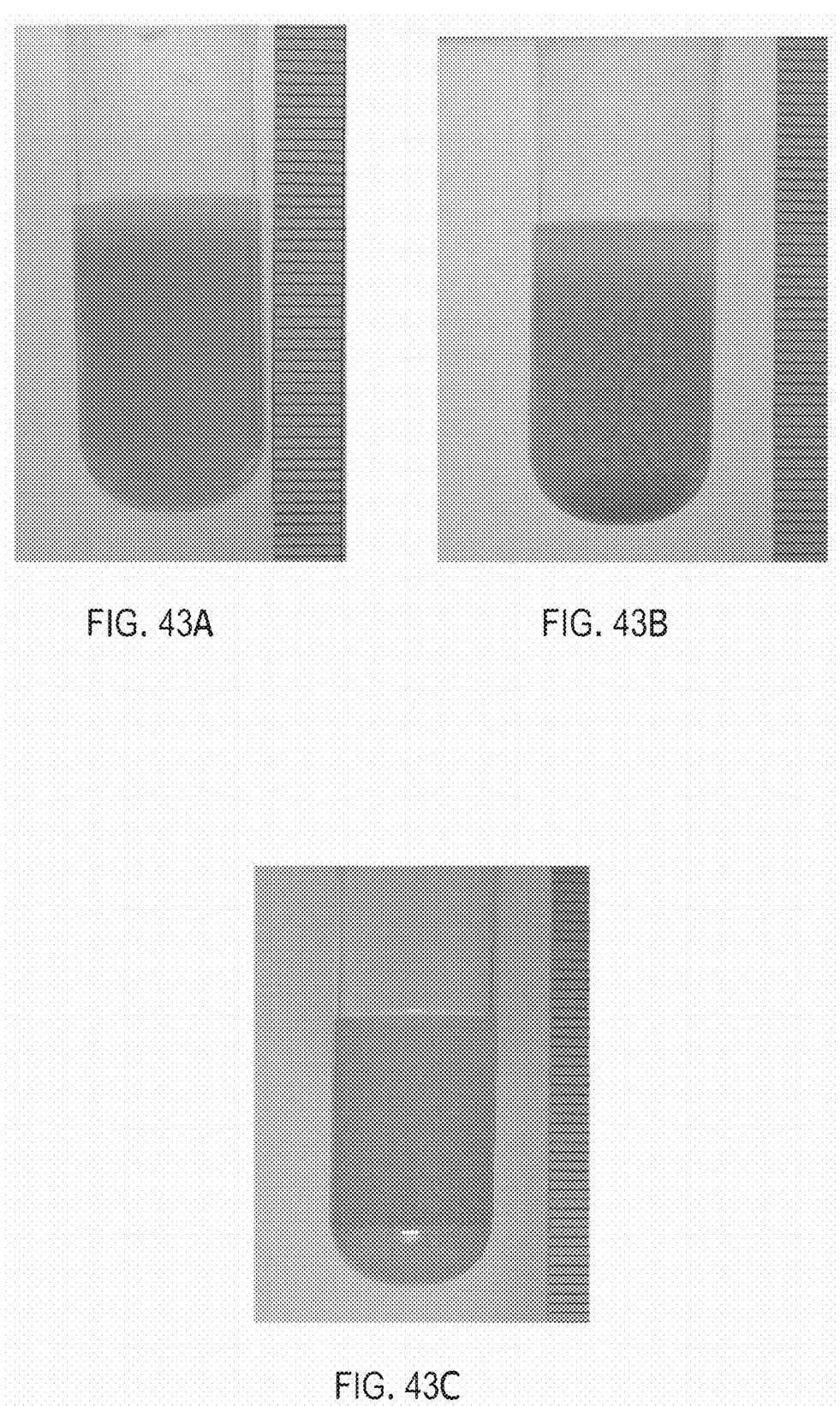

FIG. 43A shows a photo of a mixture of $TiO_2$ (50 mg) and graphene dispersion (5 ml) after 2 min sonication, produced in method 6—the formation of a graphene/metal oxide product using volatile ammonium salts.

FIG. 43B shows the mixture after adding the base (saturated ammonium carbonate solution, 50 microlitres). A floc forms rapidly, and in this case, the floc is grey due to the combination of graphene (black) and $TiO_2$ (white).

Figure 44:
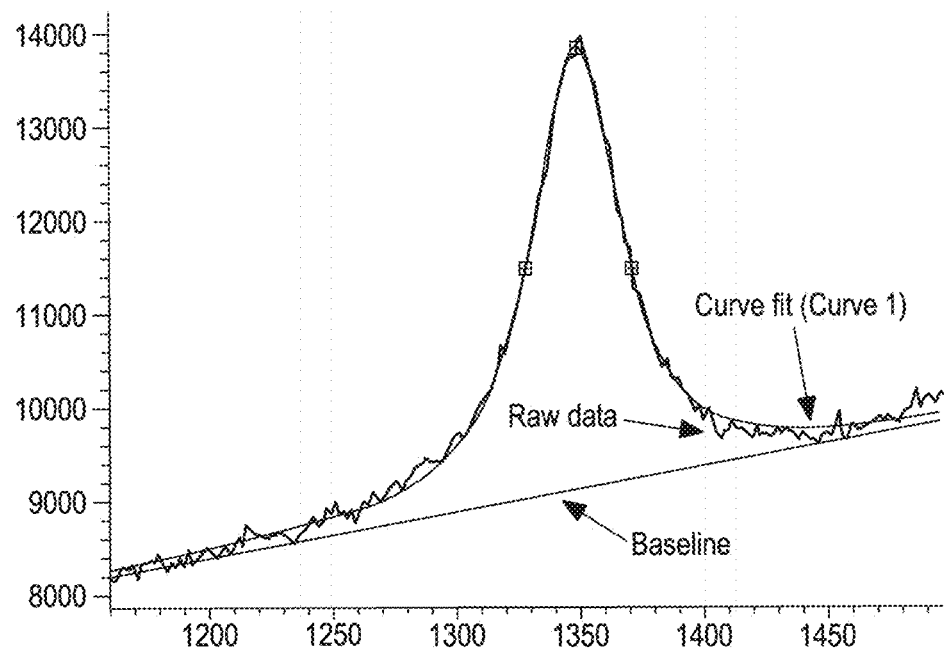

FIG. 43C shows an image of the flocculated product of Method 6 after the solution was left to stand for 2 minutes after addition of base and sonication. An additional source of light is used to illuminate the glass cylinder from below, to help view the flocculated product FIG. 44. Curve fitting of the measured Raman D peak (Curve 1) of an aluminium oxide-graphene composite produced via method 4. I(D) is taken to be the height of Curve 1 (=4738.26) for ratio calculations.

Figure 45:
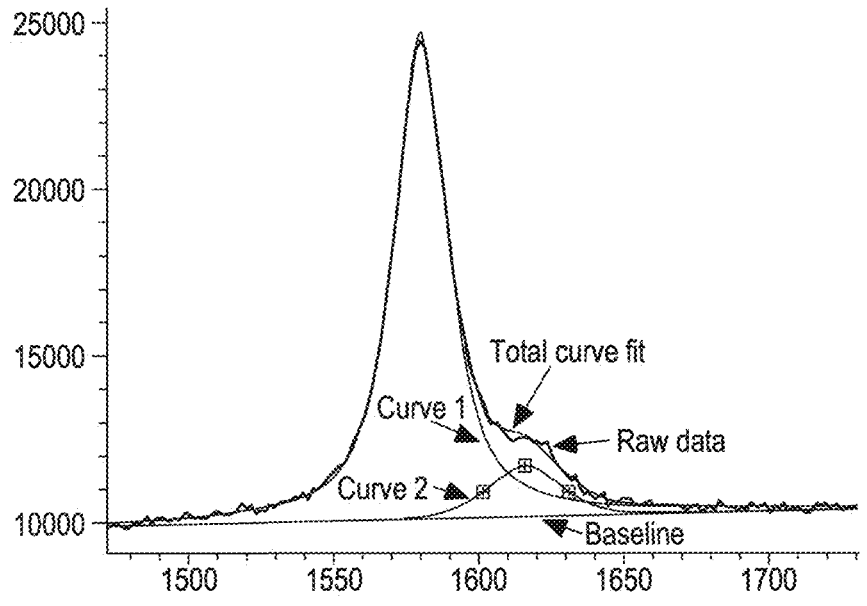

FIG. 45. Curve fitting and deconvolution of the measured Raman G peak (Curve 1) and D' peak (Curve 2) of an aluminium oxide-graphene composite produced via method 4. I(G) is taken to be the height of Curve 1 (=14324.2), and I(D') is taken to be the height of Curve 2 (=1470.11) for ratio calculations.

Figure 46:
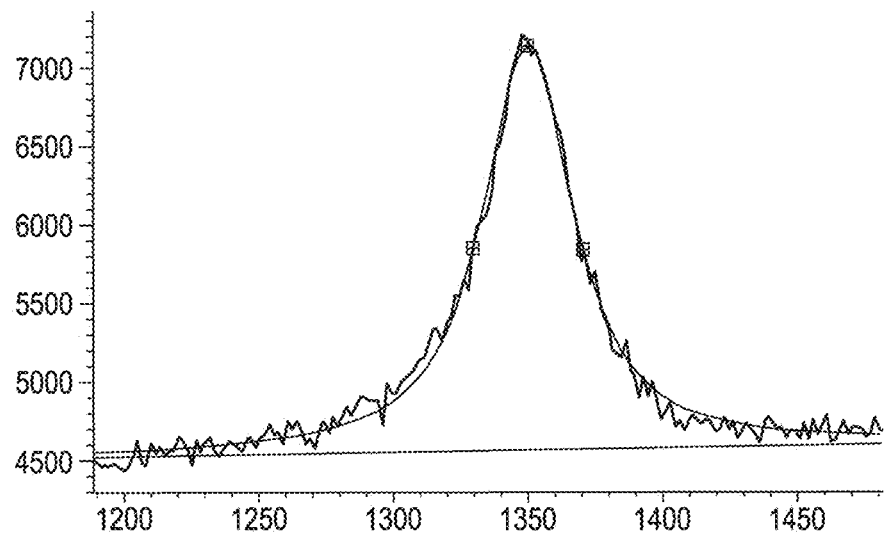

FIG. 46. Curve fitting of the measured Raman D peak (Curve 1) of an antimony tin oxide-graphene composite produced via method 4. I(D) is taken to be the height of Curve 1 (=2584.33) for ratio calculations.

Figure 47:
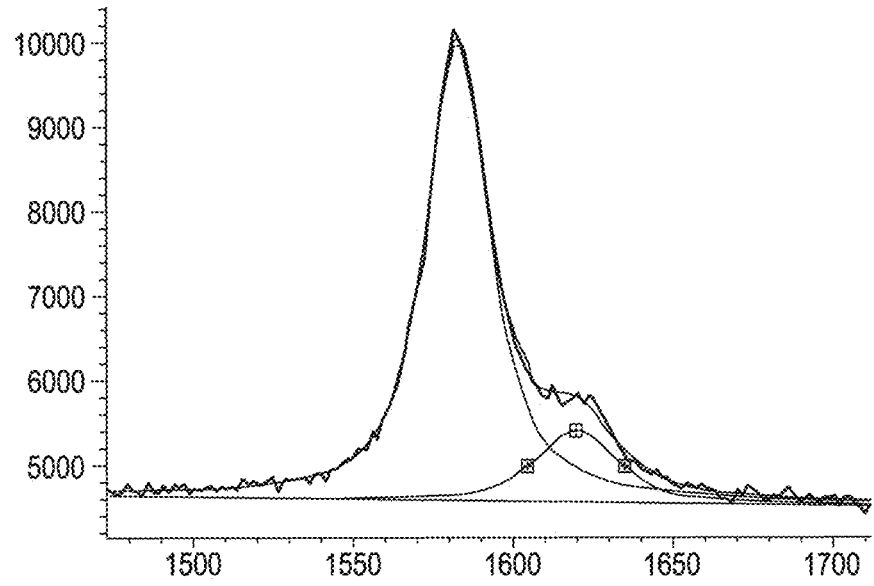

FIG. 47. Curve fitting and deconvolution of the measured Raman G peak (Curve 1) and D' peak (Curve 2) of an antimony tin oxide-graphene composite produced via method 4. I(G) is taken to be the height of Curve 1 (=5425.51), and I(D') is taken to be the height of Curve 2 (=841.649) for ratio calculations.

Figure 48:
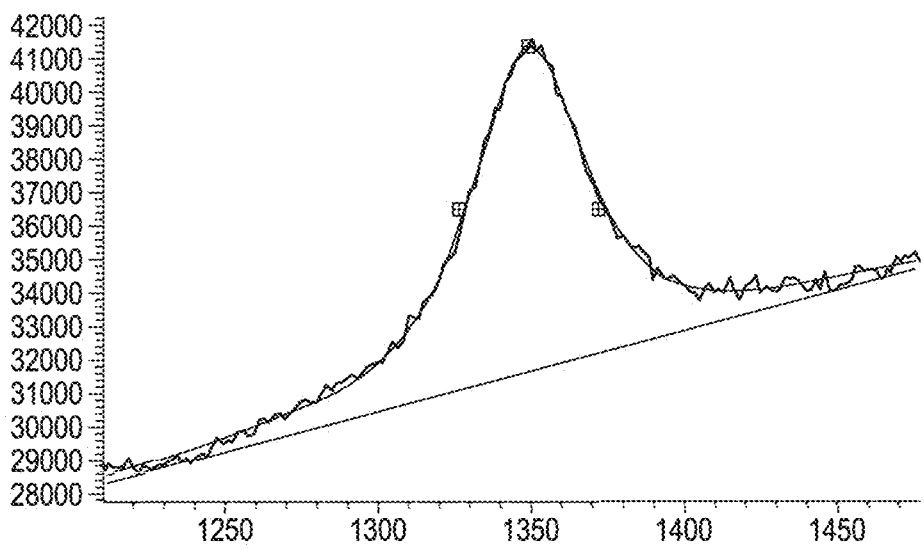

FIG. 48. Curve fitting of the measured Raman D peak (Curve 1) of a barium titanate (cubic structure)-graphene composite produced via the method 4. I(D) is taken to be the height of Curve 1 (=9677.43) for ratio calculations.

Figure 49:
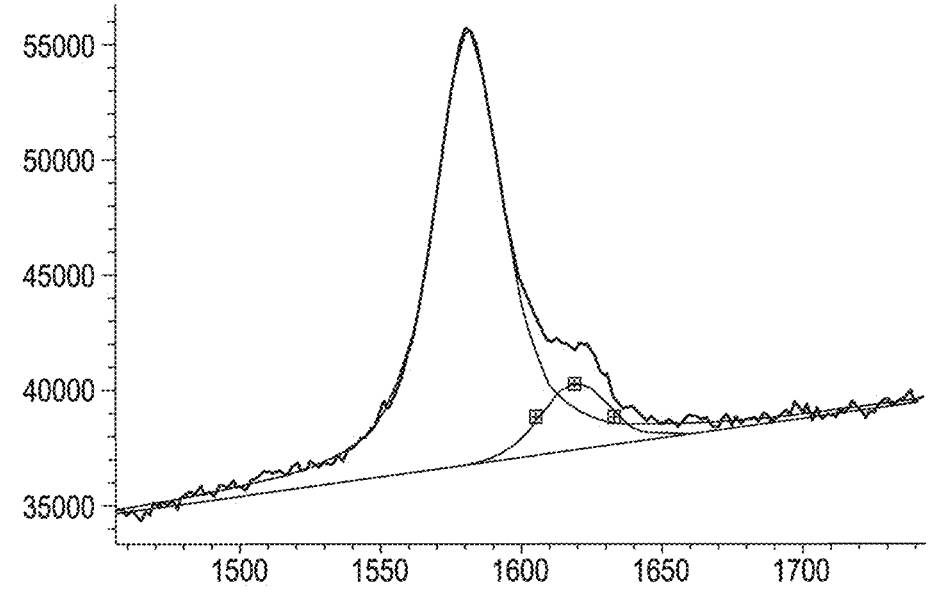

FIG. 49. Curve fitting and deconvolution of the measured Raman G peak (Curve 1) and D' peak (Curve 2) of a barium titanate (cubic structure)-graphene composite produced via method 4. I(G) is taken to be the height of Curve 1 (=18809.9), and I(D') is taken to be the height of Curve 2 (=2841.43) for ratio calculations.

Figure 50:
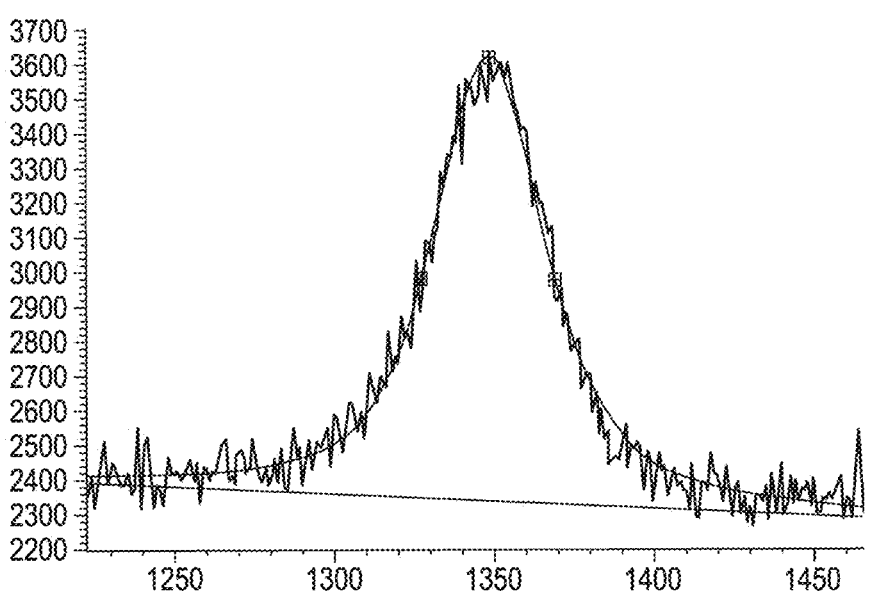

FIG. 50. Curve fitting of the measured Raman D peak (Curve 1) of a titanium dioxide-graphene composite produced via method 4. I(D) is taken to be the height of Curve 1 (=1285.44) for ratio calculations.

Figure 51:
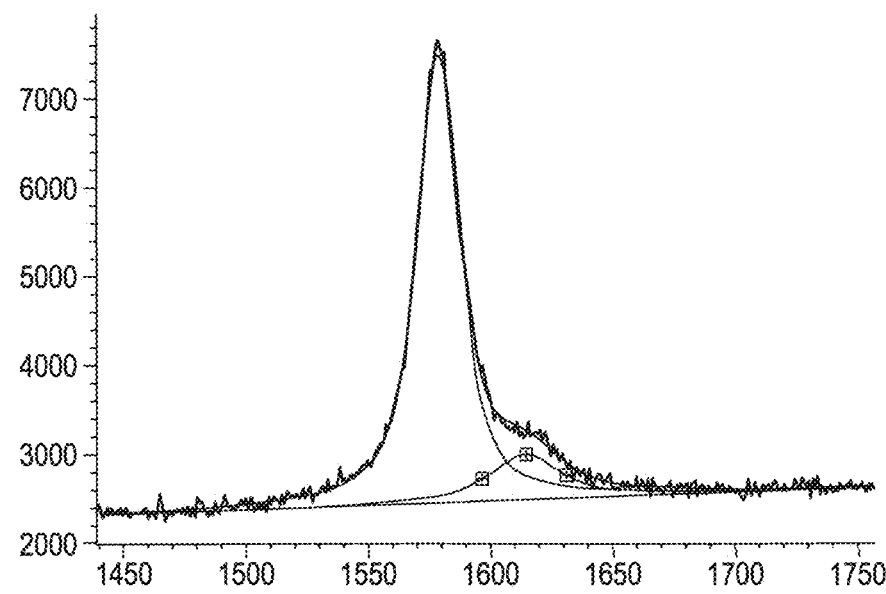

FIG. 51. Curve fitting and deconvolution of the measured Raman G peak (Curve 1) and D' peak (Curve 2) of a titanium dioxide-graphene composite produced via method 4. I(G) is taken to be the height of Curve 1 (=5067.33), and I(D') is taken to be the height of Curve 2 (=508.08) for ratio calculations.

Figures 52, 53:
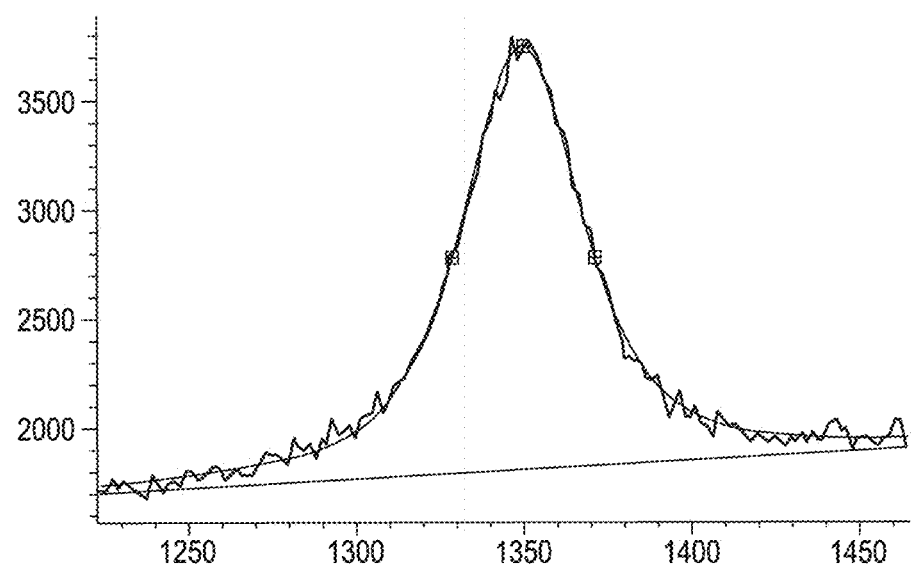

FIG. 52. Curve fitting of the measured Raman D peak (Curve 1) of a zirconium oxide-graphene composite produced via method 4. I(D) is taken to be the height of Curve 1 (=1934.54) for ratio calculations.

FIG. 53. Curve fitting and deconvolution of the measured Raman G peak (Curve 1) and D' peak (Curve 2) of a zirconium oxide-graphene composite produced via method 4. I(G) is taken to be the height of Curve 1 (=6466.57), and I(D') is taken to be the height of Curve 2 (=685.583) for ratio calculations.

Figure 54:
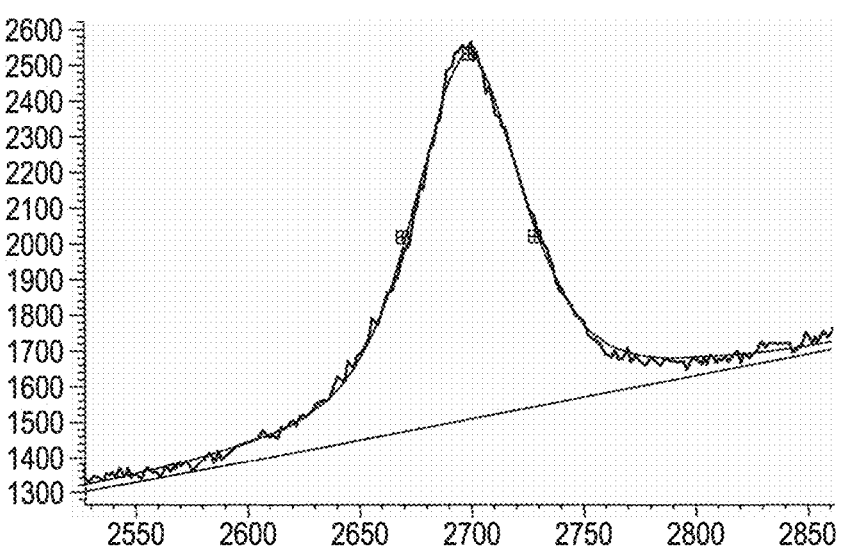

FIG. 54. Curve fitting of the measured Raman 2D peak (Curve 1) of an aluminium oxide-graphene composite produced via method 4. Peak centre=2698.62 cm$^{-1}$.

Figure 55:
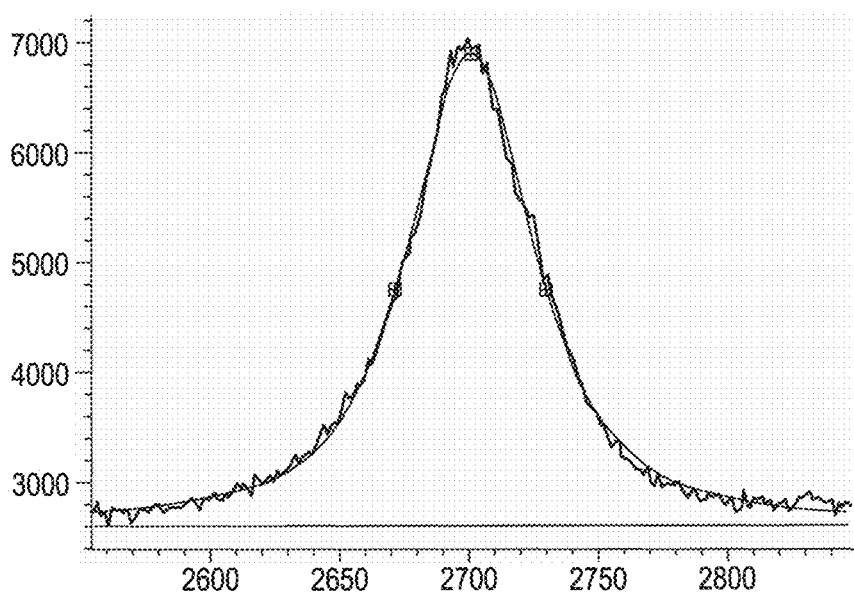

FIG. 55. Curve fitting of the measured Raman 2D peak (Curve 1) of an antimony tin oxide-graphene composite produced via method 4. Peak centre=2700.95 cm$^{-1}$.

Figure 56:
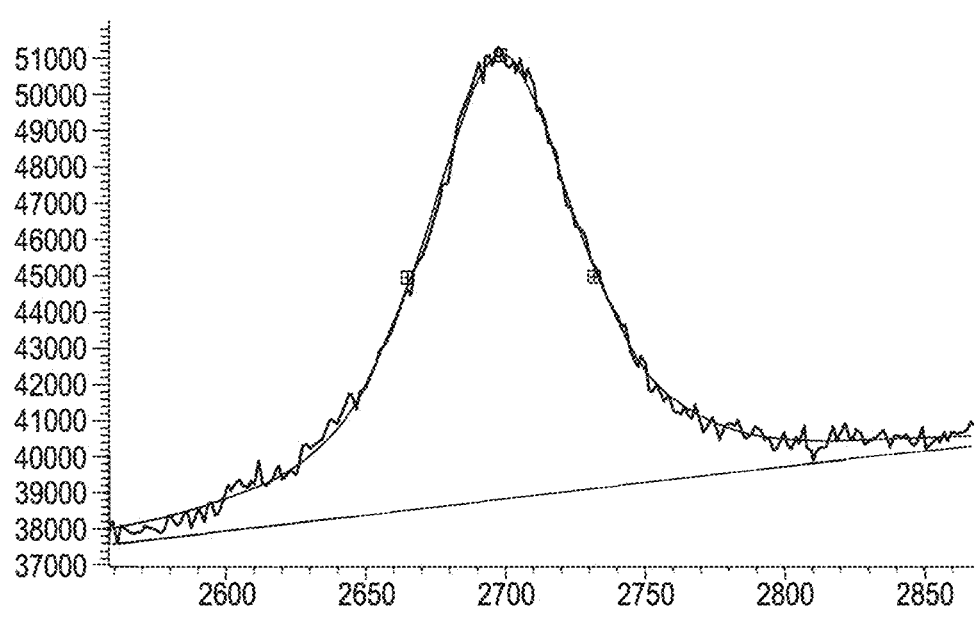

FIG. 56. Curve fitting of the measured Raman 2D peak (Curve 1) of a barium titanate (cubic structure)-graphene composite produced via method 4. Peak centre=2698.28 cm$^{-1}$.

Figure 57:
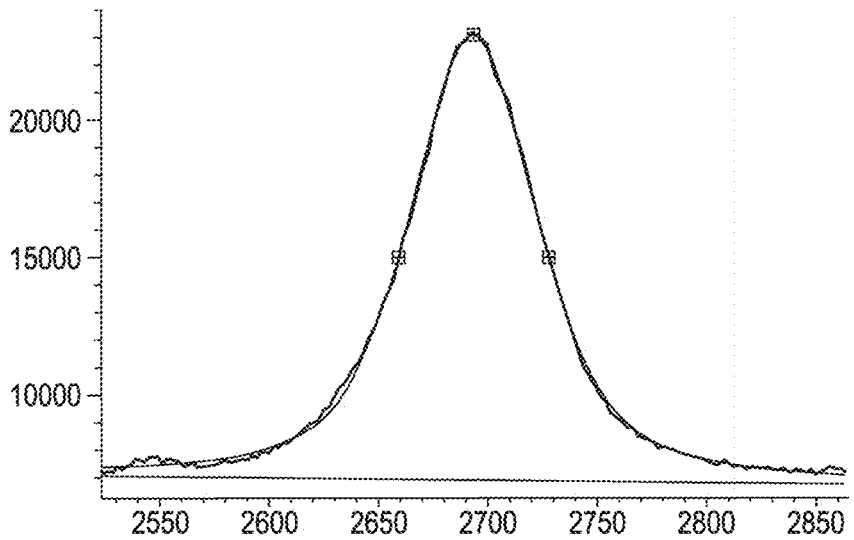

FIG. 57. Curve fitting of the measured Raman 2D peak (Curve 1) of a titanium dioxide-graphene composite produced via method 4. Peak centre=2693.87 cm$^{-1}$.

Figures 58, 59:
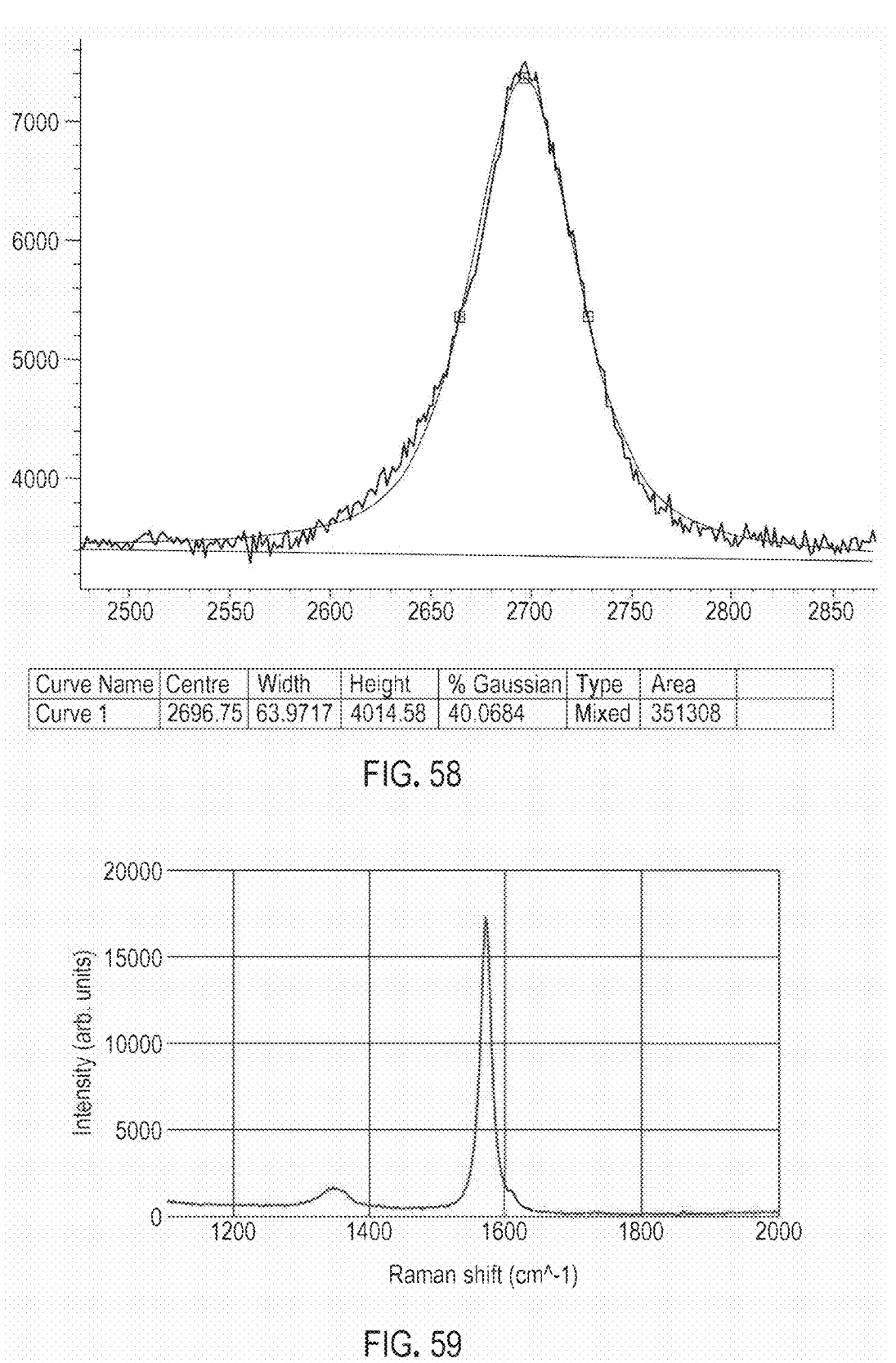

FIG. 58. Curve fitting of the measured Raman 2D peak (Curve 1) of a zirconium oxide-graphene composite produced via method 4. Peak centre=2696.75 cm$^{-1}$.

FIG. 59. Raman spectrum of a tin oxide-xGNP composite produced via method 8, highlighting the D, G and D' graphene peaks. Laser excitation wavelength=532 nm.

Figures 60, 61:
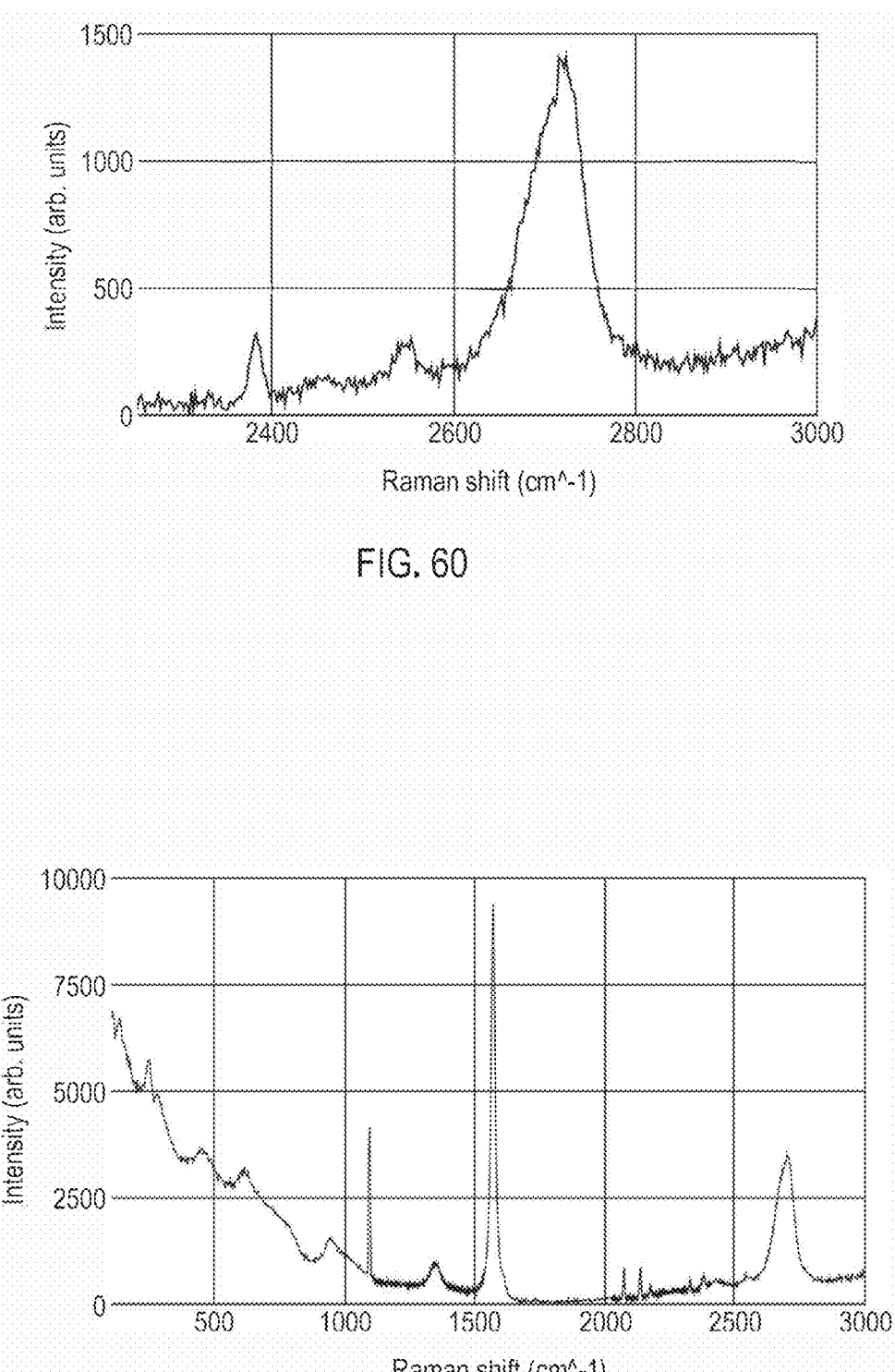

FIG. 60. Raman spectrum of a tin oxide-xGNP composite produced via method 8, highlighting the 2D graphene peak. Laser excitation wavelength=532 nm.

FIG. 61. Extended Raman spectrum of a tin oxide-xGNP composite produced via method 8. Laser excitation wavelength=532 nm.

Figures 62, 63:
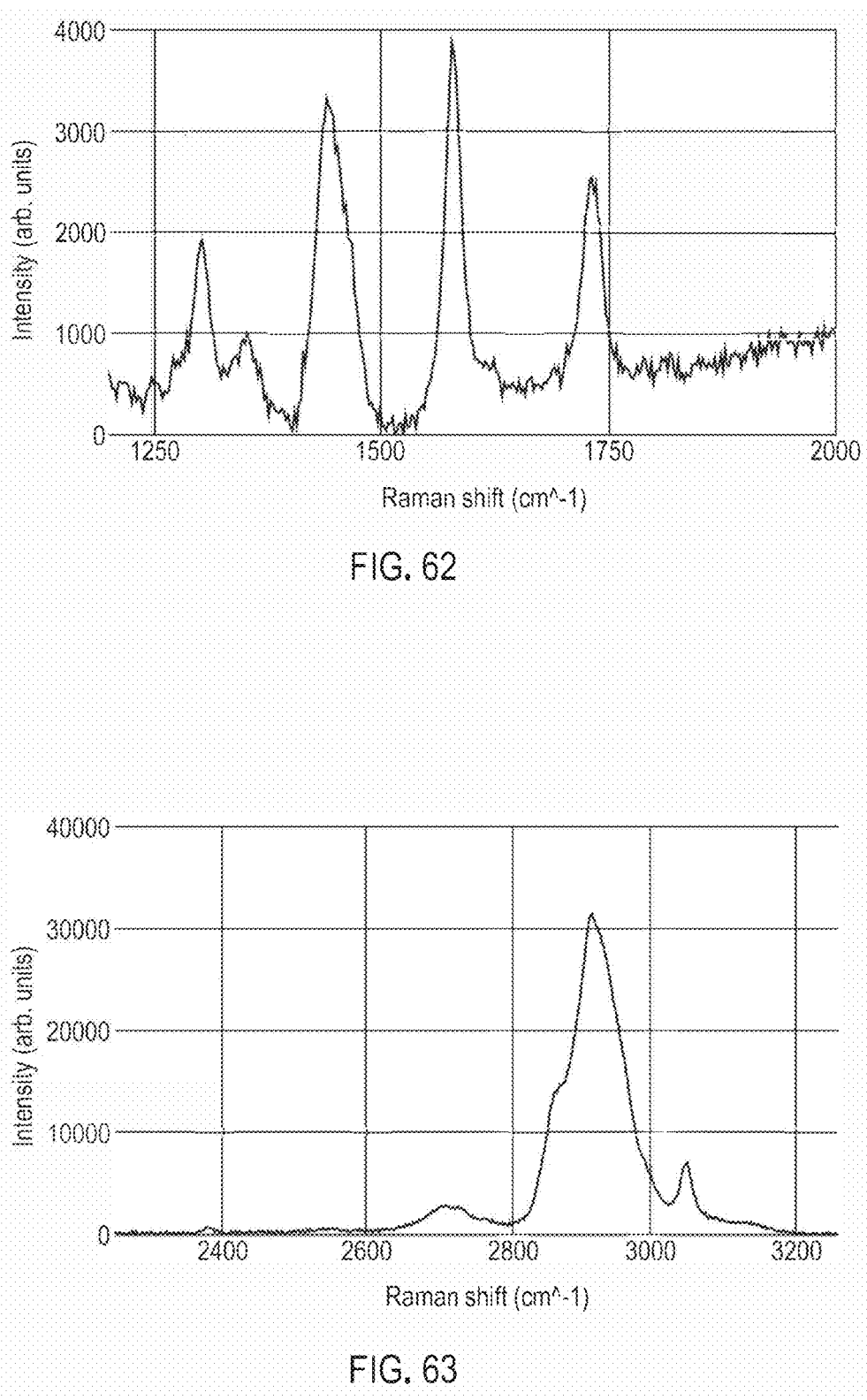

FIG. 62. Raman spectrum of a polyurethane-graphene composite produced via example 5. Laser excitation wavelength=532 nm.

FIG. 63. Raman spectrum of a polyurethane-graphene composite produced via example 5. Laser excitation wavelength=532 nm.

Figures 64, 65:
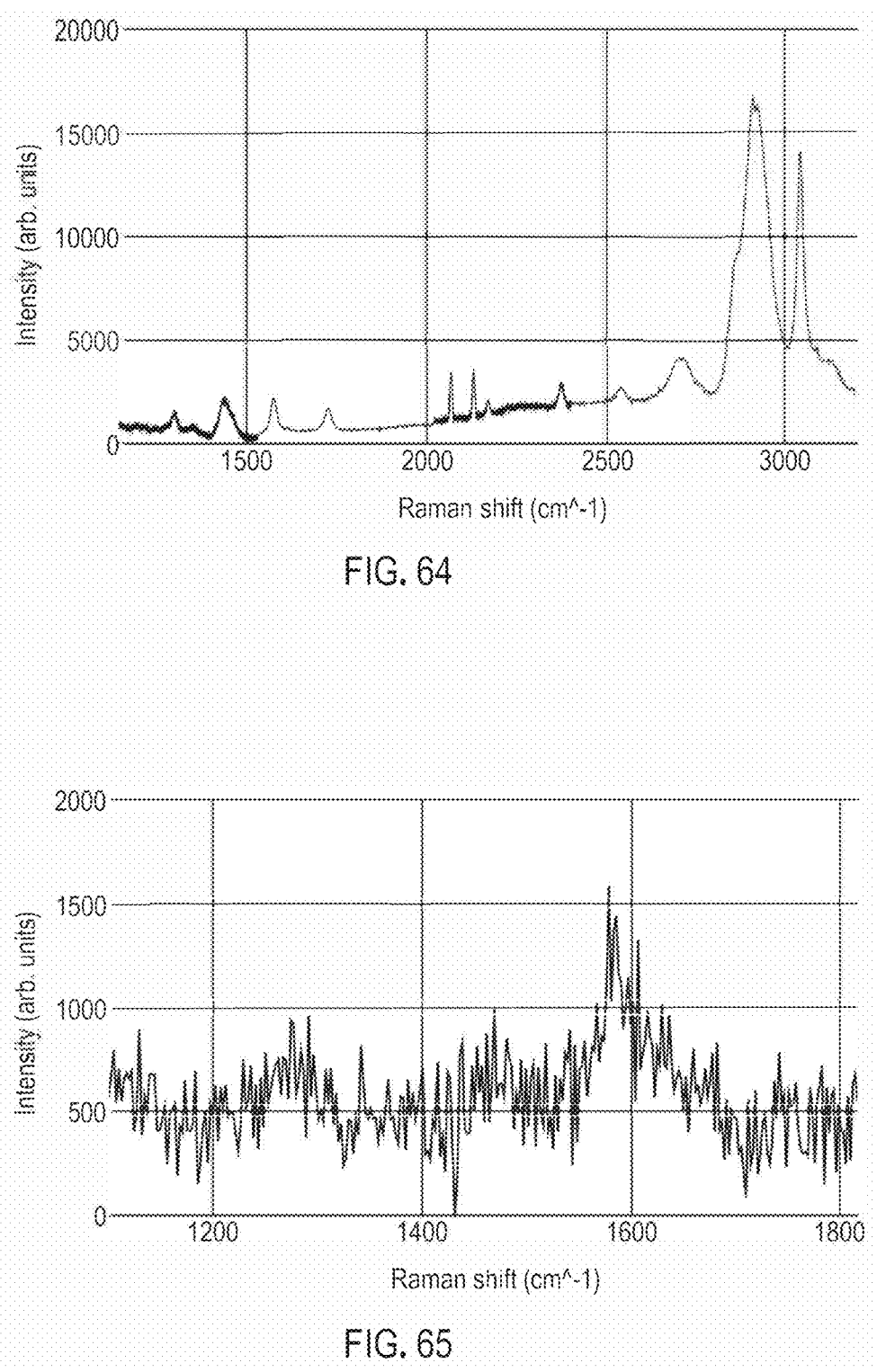

FIG. 64. Extended Raman spectrum of a polyurethane-graphene composite produced via example 5. Laser excitation wavelength=532 nm.

FIG. 65. Raman spectrum of a chitosan-graphene composite produced via example 4. Laser excitation wavelength=532 nm.

Figures 66, 67:
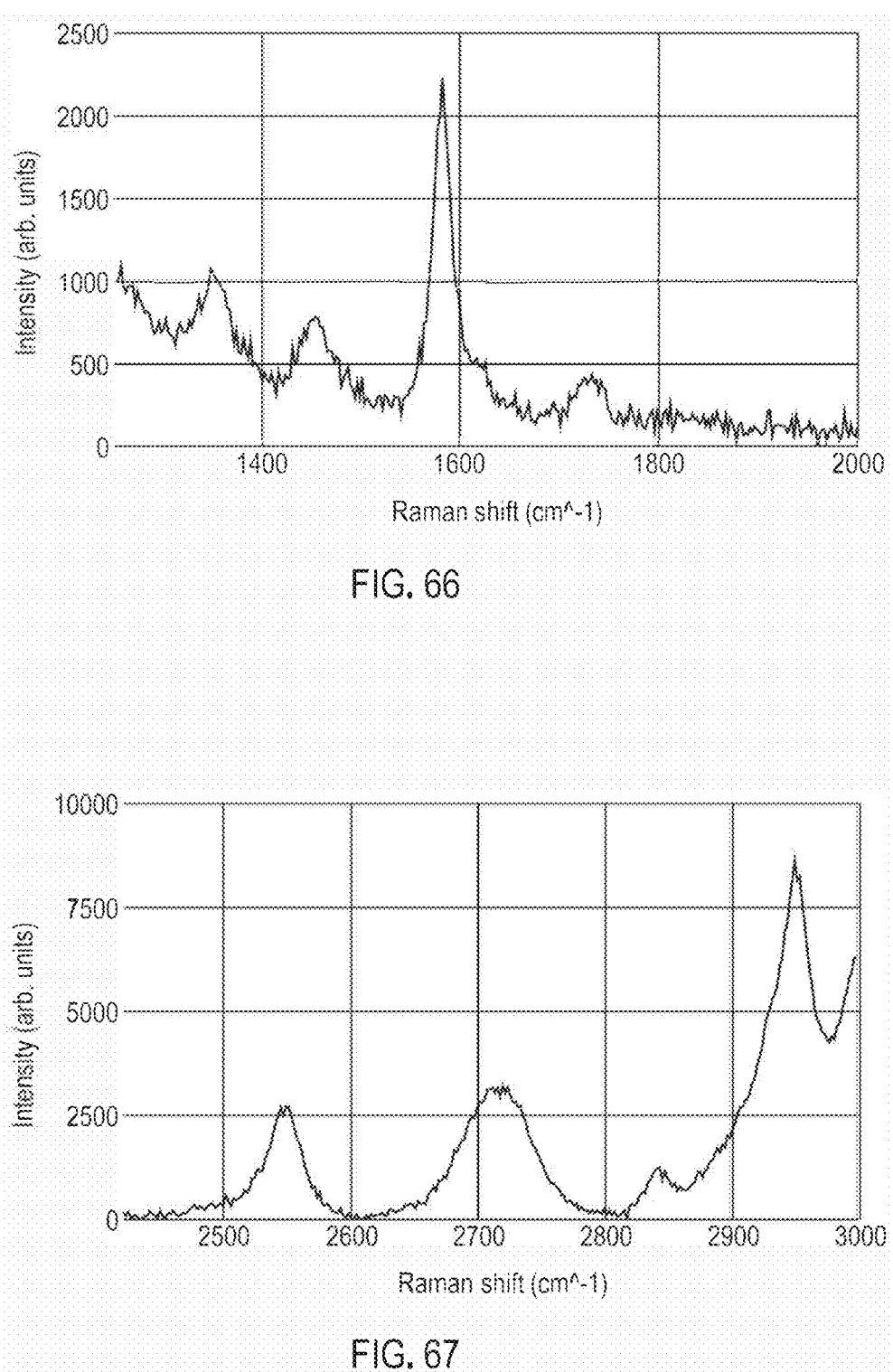

FIG. 66. Raman spectrum of a Poly(methyl methacrylate)-graphene composite produced via example 8. Laser excitation wavelength=532 nm.

FIG. 67. Raman spectrum of a Poly(methyl methacrylate)-graphene composite produced via example 8. Laser excitation wavelength=532 nm.

Figure 68:
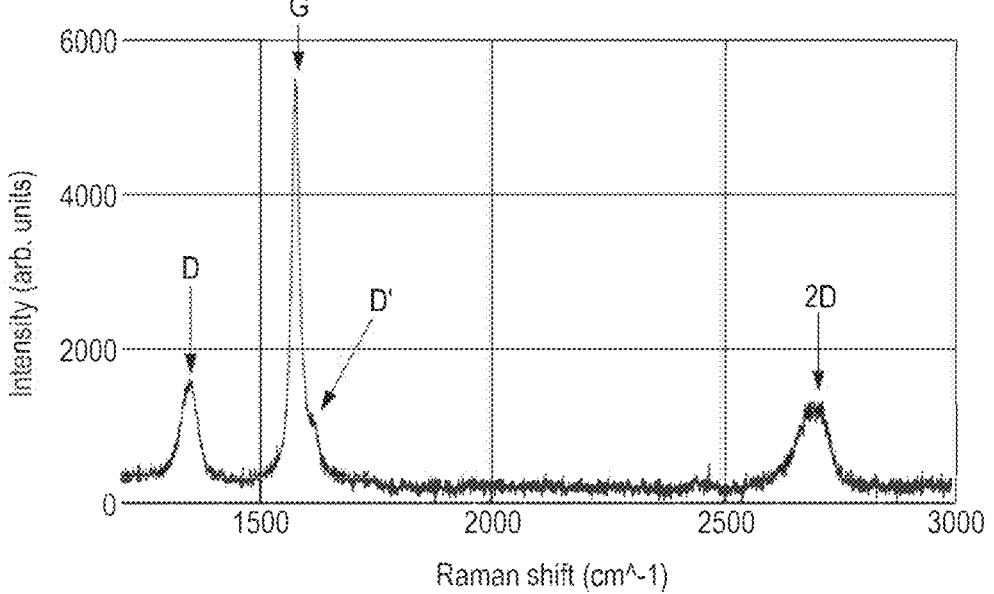

FIG. 68. A version of FIG. 6 with labelled Raman peaks of interest.

The present invention is further illustrated by the following examples.

EXAMPLES

Composites of graphene and other materials were produced using the following methods. Table 1, below indicates the amount of starting materials and method for each Example.
Method 1.

Graphite flakes (25 g) were dispersed in 500 ml DMSO via high-shear homogenisation (Silverson L5M, with 25 mm square-hole screen, used at 5000 RPM) for 20 min, followed by centrifugation at 420 g for 20 min. Anatase nanoparticles (25 nm, Sigma, 0.1 g) were added to the resulting supernatant (40 ml) to produce graphene/titanium dioxide dispersions. The dispersions were further dispersed for 10 minutes with sonication. Base (0.01-1 ml, NaOH, 1M in water) was added to the dispersions, yielding a precipitate. The precipitate was left to settle. The supernatant was then removed and the material separated and washed with water.
Method 2.

Graphite flakes (0.2 g) and titanium dioxide particles (10 g, Titanium dioxide, 25 nm, sigma) were added to a mixture of 500 ml DMSO and 0.1M NaOH in water (10 ml), and exfoliated with high-shear homogenization (Silverson L5M, with 25 mm square-hole screen, used at 5000 RPM) for 30 min. The precipitate was left to settle for a further 30 minutes, and collected.
Method 3.

Graphite flakes (0.5 g) and Chitosan (1 g, dispersion in 1% acetic acid in water) were added to a mixture of 500 ml DMSO, and the graphite exfoliated with high-shear homogenization (Silverson L5M-A, with 25 mm square-hole screen, used at 5000 RPM) for 30 min. 0.1M NaOH in water (10 ml) was added. The precipitate was left to settle for a further 30 minutes, and separated. The supernatant can, if desired, be neutralized with an appropriate amount of acid and re-used.
Method 4—Acetone/Water-Based Metal Oxide/Graphene Synthesis This method was used to prepare 6 metal oxide/graphene composites from graphene and: zirconium oxide, <100 nm, (sigma-aldrich); antimony tin oxide, <50 nm (sigma-aldrich); barium titanate, cubic crystalline phase, <100 nm, (sigma-aldrich); tungsten (VI) trioxide, <100 nm, (sigma-aldrich); aluminium oxide, <13 nm, (sigma-aldrich); copper (II) oxide, <50 nm, (sigma-aldrich); zinc oxide, <50 nm, (sigma-aldrich); tin oxide, <100 nm, (sigma-aldrich).

Graphene dispersion was prepared using the following procedure adapted from Paton et al.

50 g distilled water and 150 g acetone were mixed to form a dispersion fluid. A dispersion of graphite and graphene flakes were prepared by homogenising a mixture of 10 g graphite in 200 ml dispersion fluid, with a Silverson L4R high-shear mixer equipped with a ¾" tubular head and a 'square hole high shear screen' attachment. Homogenising was performed at maximum homogenising power for 20 minutes in a water bath at 21 degrees centigrade. This homogenised mixture was then centrifuged for 20 minutes at 3,500 RPM to remove unexfoliated graphite flakes. This method typically yields a graphene concentration of 0.01-0.05 mg/ml.

50 mg of a metal oxide and 5 ml graphene dispersion were mixed, and sonicated for 30 seconds. Some metal oxides are not easily dispersed in the acetone/water mixture, and settled out rapidly without forming a composite with the graphene. 50 microlitres of 1M sodium hydroxide solution was then added to the mixture, which was then sonicated for a further 30 seconds to yield a homogeneous mixture. A homogenous precipitate was observed within a few minutes, which was collected and analysed with pXRD and Raman spectroscopy—FIGS. 8-38.

The general appearance of solutions for preparing metal oxide/graphene composites with this method can be followed in FIG. 40—Antimony oxide/Tin oxide is used as a model metal oxide.
Method 5—Synthesis with Barium Hydroxide Cubic barium titanate was contacted with graphene dispersion in the same manner as example 1, but 600 microlitres of 0.1M barium hydroxide aqueous solution was used instead of 1M sodium hydroxide aqueous solution. This yielded a product free of sodium ion contamination.

Method 6—Synthesis to Yield Product Using Volatile Salts

A metal oxide/graphene composite was prepared with titanium dioxide as the metal oxide, contacted with graphene dispersion in the same manner as method 4, but using 50 microlitres of saturated ammonium carbonate aqueous solution instead of 1M sodium hydroxide aqueous solution. The process can be followed in FIG. 43.

Method 7—Synthesis with Organic Base

A metal oxide/graphene composite was prepared with titanium dioxide as the metal oxide, contacted with 5 ml graphene dispersion in the same manner as method 4, but using 1000 microlitres of 1M sodium citrate aqueous solution instead of 1M sodium hydroxide aqueous solution.

Method 8—Synthesis to Yield Product with xGNP Nanoplatlets

This method was used to prepare composites of xGNP with aluminium oxide and tin oxide, characterised with raman spectroscopy in FIGS. 39 (Aluminium oxide) and 59 (tin oxide).

xGNP dispersion was prepared using the following procedure:

50 g distilled water and 150 g acetone were mixed to form a dispersion fluid. A dispersion of xGNP flakes were prepared by sonicating a mixture of 0.02 g xGNP in 200 ml dispersion fluid, with a Cole-Parmer 100 W ultrasonic cleaner. Sonicating was performed for 20 minutes in a water bath at 21 degrees centigrade. This sonicated mixture was used directly as an xGNP dispersion.

10 ml xGNP dispersion was contacted with 0.01 g metal oxide (tin oxide or aluminium oxide) and sonicated for 2 minutes. To this mixture, 50 microlitres of 1M NaOH aqueous solution was added, and the resulting mixture sonicated for 2 minutes. The product was left to settle for 30 minutes, collected, and dried.

Example 1

Example 1 was produced using method 1.

Example 2

Example 2 was produced using method 1 and then heat treated at 300° C. for 3 hours under vacuum.

Photocatalytic Activity

The photocatalytic activity of the composites of graphene with titanium dioxide was determined as follows.

Figure 1:
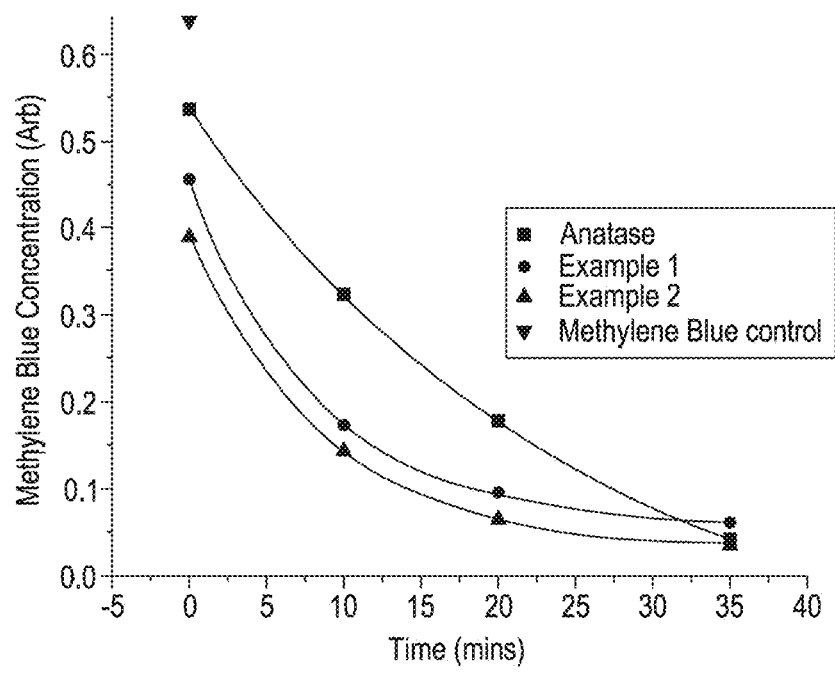
FIG. 1 shows a graph of reduction of methylene blue concentration against UV irradiation time for Example 1, Example 2 and a control (particulate anatase, 25 nm particle size)

0.7 mg/ml material was dispersed by sonication in 100 ml aqueous solution of 2.15 mg/dm$^3$ methylene blue, and left to equilibriate overnight. Material dispersions were added to a Pyrex UV batch photoreactor (120 ml capacity) equipped with a 125 W medium-pressure mercury lamp. Material dispersions were exposed to UV light for 35 minutes. 2 ml aliquots were removed from the reactor at 0, 10, 20, and 35 minutes. A Shimadzu UV2700 UV-Vis spectrometer was used to record the transmittance of the aliquots at 665 nm. Graph fitting done with Origin software. The results for two composite materials (Examples 1 and 2) according to the invention and controls (anatase 25 nm particle size and methylene blue) are shown in FIG. 1. A measure of the effectiveness of photocatalytic activity was determined from the reduction in the measured concentration of methylene blue and is as indicated in Table 1, below with the values being a time constant.

TABLE 1

| Material | Value (min) |
|---|---|
| Anatase 25 nm particle size (Control) | 25.4 |
| Example 1 | 8.2 |
| Example 2 | 8.8 |

Figure 2A:
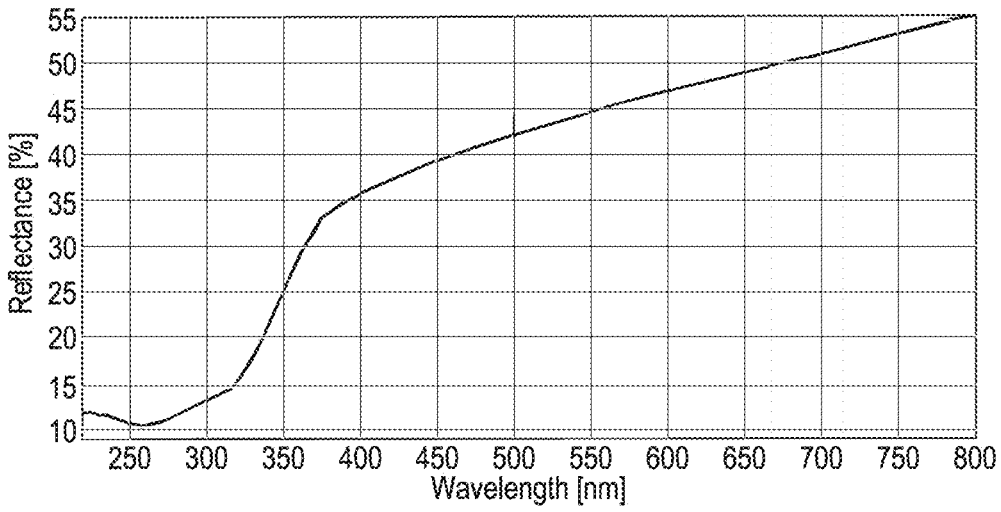
FIG. 2A shows a graph of UV visible reflectance for Example 1.
Figure 2B:
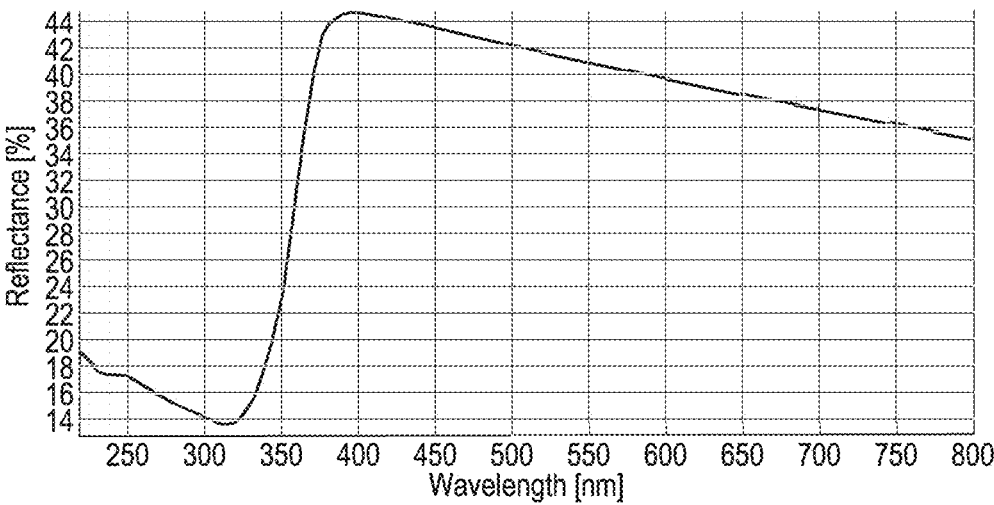
FIG. 2B shows a graph of UV visible reflectance for Example 2.

Reflectance spectra of Examples 1 and 2 are shown in FIGS. 2(*a*) and (*b*) respectively.

Figure 3A:
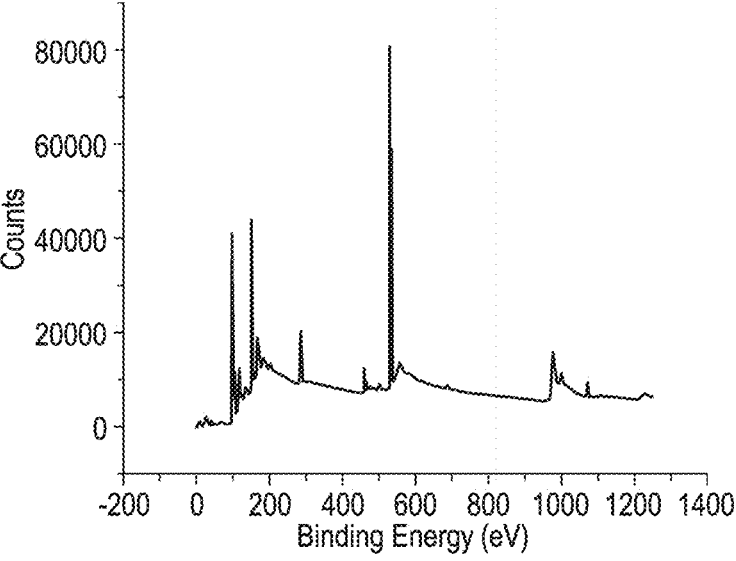
FIG. 3A shows an XPS survey of Example 1.
Figure 3B:
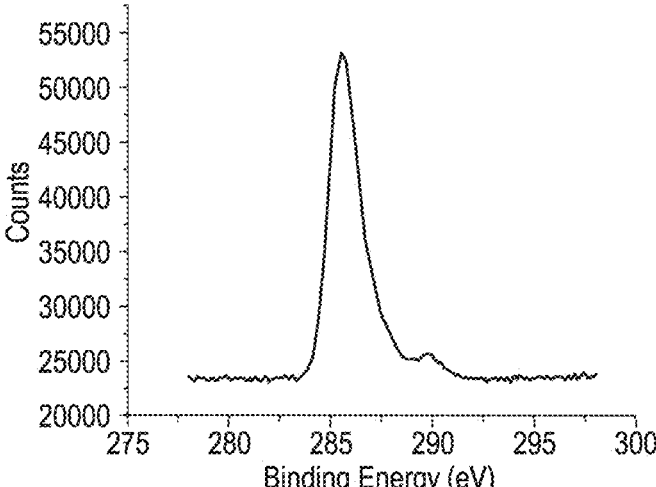
FIG. 3B shows detail of the XPS results for Example 1.

XPS spectra of Example 1 is shown in FIG. 3 showing an XPS survey scan in FIG. 3(*a*) and in detail (FIG. 3(*b*)— indicating very few impurities within the material. XPS was obtained by KE Energy Step in eV 0.5, Number of Sweeps 2, Dwell Time per Sweep in s 0.25, Excitation Source Al Kα; Excitation Energy in eV 1486.7; Exit Slit 5×11 mm.

Figure 4:
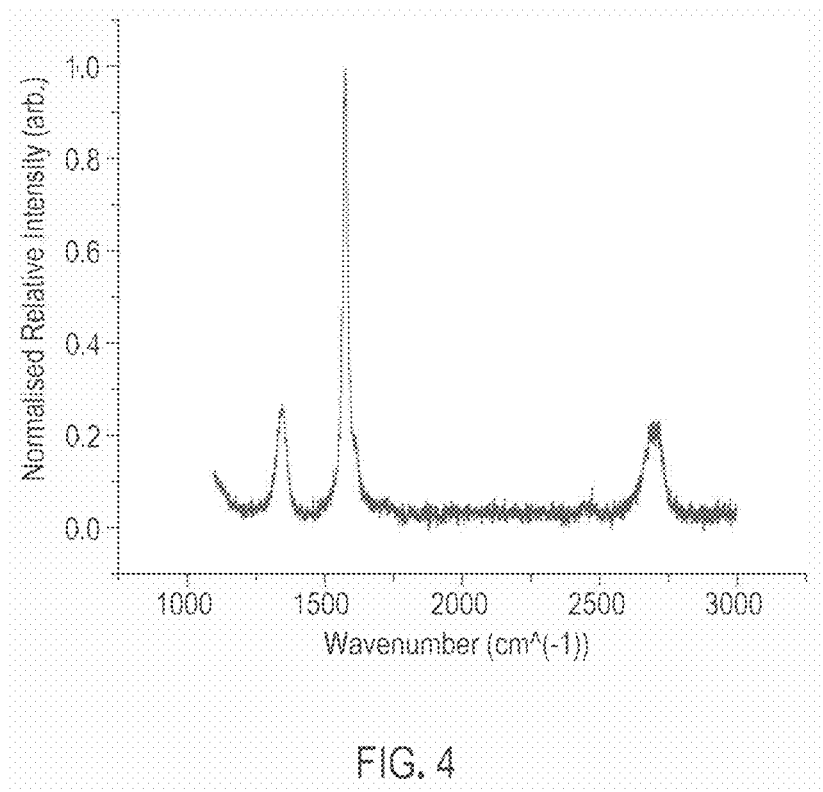
FIG. 4 shows a normalised Raman spectrum of Example 1.

A typical normalised Raman spectrum of Example 1 is shown in FIG. 4 with (left-right) the D peak, the G peak, and the 2D peak of graphene (or few-layer graphene). The sharpness of 2D peak indicates the number of layers, showing at least few-layer graphene. Raman was obtained with a Renishaw InVia Confocal Raman Microscope.

Figure 5:
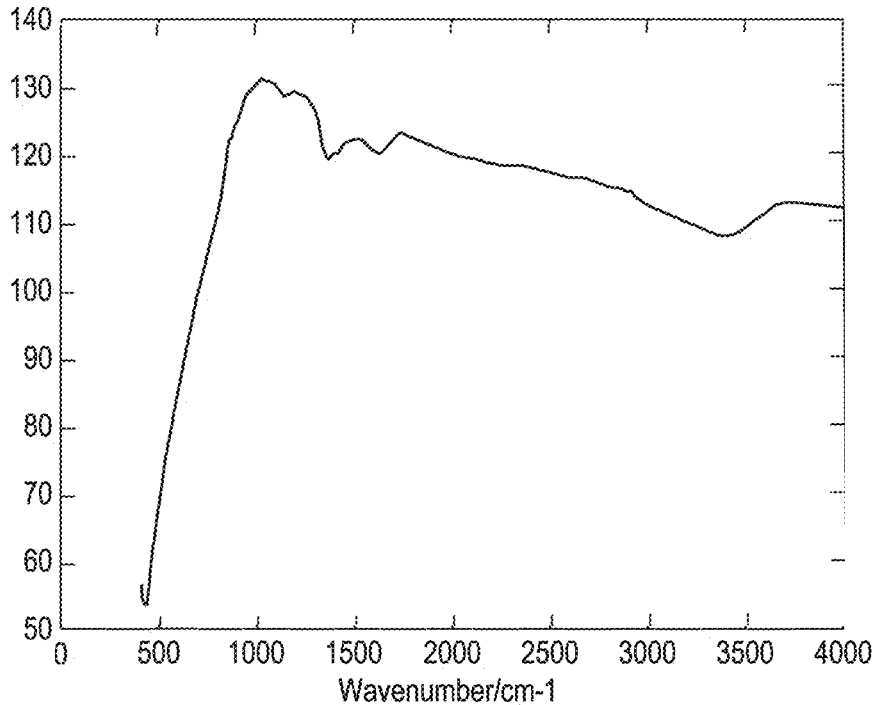
FIG. 5 shows an IR spectrum of Example 2.

FIG. 5 shows an IR spectrum of Example 2 (obtained with a Perkin Elmer Spectrum Two FT-IR Spectrometer). The two peaks either side of 1500 cm$^{-1}$ may be C=C peaks (contributions from graphene and titania), the large broad peak to the left is from titanium dioxide (anatase). The absence of strong carbonyl peaks indicates the high quality of the graphene.

Example 3—Chitosan with DMSO and NaOH

Graphene dispersion was prepared using the following procedure adapted from Paton et al (Nature Materials volume 13, pages 624-630 (2014), or WO2014140324A1):

A dispersion of graphite and graphene flakes were prepared by homogenising a mixture of 10 g graphite in 200 ml DMSO, with a Silverson L4R high-shear mixer equipped with a ¾" tubular head and a 'square hole high shear screen' attachment. Homogenising was performed at max homogenising power for 20 minutes in a water bath at 21 degrees centigrade. This homogenised mixture was then centrifuged for 20 minutes at 3,500 RPM to remove unexfoliated graphite flakes. This yielded ~160 ml graphene dispersion. This method typically yields a graphene concentration of 0.01-0.05 mg/ml.

1% Chitosan in 1% acetic acid solution was prepared by adding 0.5 g chitosan and 0.5 ml acetic acid into 49.5 ml distilled water. 1 ml of this chitosan solution was then added to 1 ml graphene dispersion and sonicated for 2 minutes to form a mixture. To this mixture, 50 microlitres of 1M sodium hydroxide solution was added, under vigorous agitation. This resulted in the formation of a flocculated composite product.

Example 4—Chitosan with Acetone/Water Cosolvent Mixture and Sodium Citrate

Graphene dispersion was prepared using the following procedure adapted from Paton et al (Nature Materials volume 13, pages 624-630 (2014), or WO2014140324A1):

50 g distilled water and 150 g acetone were mixed to form a dispersion fluid. A dispersion of graphite and graphene flakes were prepared by homogenising a mixture of 10 g graphite in 200 ml dispersion fluid, with a Silverson L4R high-shear mixer equipped with a ¾" tubular head and a 'square hole high shear screen' attachment. Homogenising was performed for 20 minutes in a water bath at 21 degrees centigrade. This homogenised mixture was then centrifuged for 20 minutes at 3,500 RPM to remove unexfoliated graphite flakes. This yielded ~160 ml graphene dispersion. This method typically yields a graphene concentration of 0.01-0.05 mg/ml.

1% Chitosan in 1% acetic acid solution was prepared by adding 0.5 g chitosan and 0.5 ml acetic acid into 49.5 ml distilled water. 1 ml of this chitosan solution was then added to 3 ml graphene dispersion and sonicated for 2 minutes to form a mixture. To this mixture, 50 microlitres of 1M sodium citrate aqueous solution was added, under vigorous agitation. This resulted in the formation of a flocculated composite product characterised by Raman spectroscopy in FIG. 65.

Example 5—Polyurethane (PU), DMSO, and Ammonium Carbonate

Graphene dispersion was prepared using the following procedure adapted from Paton et al or WO2014140324A1):

A dispersion of graphite and graphene flakes were prepared by homogenising a mixture of 10 g graphite in 200 ml DMSO, with a Silverson L4R high-shear mixer equipped with a ¾" tubular head and a 'square hole high shear screen' attachment. Homogenising was performed for 20 minutes in a water bath at 21 degrees centigrade. This homogenised mixture was then centrifuged for 20 minutes at 3,500 RPM to remove unexfoliated graphite flakes. This yielded ~160 ml graphene dispersion. This method typically yields a graphene concentration of 0.01-0.05 mg/ml.

A water-based biodegradable polyurethane nanoparticle emulsion was synthesised following the protocol described by Chen et al (2014).

Under inert atmosphere, 10.24 g of Poly-e-caprolactone diol (5 mmol) and 3.99 ml IPDI (19 mmol) were reacted for 3 hours (180 rpm) at 75 C. Approximately 0.8 ml of 2-Butanol and 0.71 g of DMPA (5 mmol) were then added against high nitrogen flow. The reaction was cooled down to 45 C, 0.696 ml triethylamine (TEA, 5 mmol) was syringed into the reaction flask and the mixture was stirred for 30 minutes. 36 ml DI water was quickly added against vigorous sitting (1200 rpm) for 2 minutes, after which the stirring was brought back to 180 rpm. 0.51 ml ethylenediamine (EDA, 8 mmol) was added and the reaction was stirred for further 30 minutes. The milky colloidal dispersion was collected, centrifuged and washed twice with DI water (3000 rpm, for 15 and 30 minutes) to yield a 15 w % emulsion.

Adapted from Chen, Y.-P., & Hsu, S. (2014). 'Preparation and characterization of novel water-based biodegradable polyurethane nanoparticles encapsulating superparamagnetic iron oxide and hydrophobic drugs.' J. Mater. Chem. B, 2(21), 3391-3401. Doi:10.1039/c4tb00069b 1 ml PU emulsion and 3 ml graphene dispersion were added into a test tube and mixed together. The mixture was sonicated for 2 minutes. 1 ml saturated ammonium bicarbonate solution in DI water was added to the mixture, which was sonicated for a further 2 minutes. A grey/black floc was observed (FIG. 42), which was collected and characterised with raman spectroscopy (FIG. 64).

Example 6—xGNP with Chitosan and Sodium Citrate xGNP dispersion was prepared using the following procedure:

50 g distilled water and 150 g acetone were mixed to form a dispersion fluid. A dispersion of xGNP flakes were prepared by sonicating a mixture of 0.02 g xGNP in 200 ml dispersion fluid, with a Cole-Parmer 100 W ultrasonic cleaner. Sonicating was performed for 20 minutes in a water bath at 21 degrees centigrade. This sonicated mixture was used directly as an xGNP dispersion.

1% Chitosan in 1% acetic acid solution was prepared by adding 0.5 g chitosan and 0.5 ml acetic acid into 49.5 ml distilled water. 1 ml of this chitosan solution was then added to 10 ml xGNP dispersion and sonicated for 2 minutes to form a mixture. To this mixture, 50 microlitres of 1M sodium citrate aqueous solution was added, under vigorous agitation. This resulted in the formation of a black flocculated composite product.

Example 7—xGNP with PU, NaOH, and Limewater xGNP dispersion was prepared using the following procedure:

50 g distilled water and 150 g acetone were mixed to form a dispersion fluid. A dispersion of xGNP flakes were prepared by sonicating a mixture of 0.02 g xGNP in 200 ml dispersion fluid, with a Cole-Parmer 100 W ultrasonic cleaner. Sonicating was performed for 20 minutes in a water bath at 21 degrees centigrade. This sonicated mixture was used directly as an xGNP dispersion.

A water-based biodegradable polyurethane nanoparticle emulsion was synthesised following the protocol described by Chen et al (Chen, Y.-P., & Hsu, S. (2014). *Preparation and characterization of novel water-based biodegradable polyurethane nanoparticles encapsulating superparamagnetic iron oxide and hydrophobic drugs. J. Mater. Chem. B*, 2(21), 3391-3401. Doi: 10.1039/c4tb00069b). Under inert atmosphere, 10.24 g of Poly-e-caprolactone diol (5 mmol) and 3.99 ml IPDI (19 mmol) were reacted for 3 hours (180 rpm) at 75 C. Approximately 0.8 ml of 2-Butanol and 0.71 g of DMPA (5 mmol) were then added against high nitrogen flow. The reaction was cooled down to 45 C, 0.696 ml triethylamine (TEA, 5 mmol) was syringed into the reaction flask and the mixture was stirred for 30 minutes. 36 ml DI water was quickly added against vigorous sitting (1200 rpm) for 2 minutes, after which the stirring was brought back to 180 rpm. 0.51 ml ethylenediamine (EDA, 8 mmol) was added and the reaction was stirred for further 30 minutes. The milky colloidal dispersion was collected, centrifuged and washed twice with DI water (3000 rpm, for 15 and 30 minutes) to yield a 15 w % emulsion of PU particles in water.

200 microlitres of 1M NaOH aqueous solution was contacted with 30 ml graphene dispersion and 200 microlitres of PU emulsion. This mixture was sonicated for 30 seconds. 10 ml saturated Ca(OH)2 solution (limewater) was then added under vigorous agitation. A grey-black flocculated product was observed.

Example 8—PMMA with Acetone/Water Graphene Dispersion Fluid and Saturated Ammonium Carbonate Solution Graphene dispersion was prepared using the following procedure adapted from Paton et al (Nature Materials volume 13, pages 624-630 (2014), or WO2014140324A1):

50 g distilled water and 150 g acetone were mixed to form a dispersion fluid. A dispersion of graphite and graphene flakes were prepared by homogenising a mixture of 10 g graphite in 200 ml dispersion fluid, with a Silverson L4R high-shear mixer equipped with a ¾" tubular head and a 'square hole high shear screen' attachment. Homogenising was performed for 20 minutes in a water bath at 21 degrees centigrade. This homogenised mixture was then centrifuged for 20 minutes at 3,500 RPM to remove unexfoliated graphite flakes. This yielded ~160 ml graphene dispersion.

PMMA nanoparticles were synthesised by surfactant-free emulsion, as described by Tahrin et al (2017). In a 250 ml round-bottomed flask equipped with a condenser, 65 ml DI water was heated to 90° C. under inert atmosphere. 15 ml MMA monomer was added against high nitrogen flow, followed by 2.85 g of potassium persulfate, The reaction mixture was refluxed for 45 minutes with stirring (300 rpm). The mixture was then let to cool at room temperature and the white colloidal liquid was collected, centrifuged (3000 rpm) and washed with DI water until an opal hue could be observed in the translucent liquid phase of the centrifuge vial. This method typically yielded a 0.2-1 w % solution.

Tahrin, R. A. A., Azma, N. S., Kassim, S., & Harun, N. A. (2017). *Preparation and properties of PMMA nanoparticles as 3 dimensional photonic crystals and its thin film via surfactant-free emulsion polymerization*. Doi: 10.1063/1.5002286

3 ml of PMMA suspension was added to 3 ml graphene dispersion and sonicated for 2 minutes. To this mixture, 200 microlitres of saturated ammonium carbonate solution was added, and the mixture agitated and sonicated for 2 further minutes. After a few minutes, a black floc was observed. This was collected, dried, and characterised by Raman spectroscopy (FIG. 66-67).

Example 9—Polylactic Acid with Acetone/Water Mixture and Ammonium Carbonate

Graphene dispersion was prepared using the following procedure adapted from Paton et al (Nature Materials volume 13, pages 624-630 (2014), or WO2014140324A1):

50 g distilled water and 150 g acetone were mixed to form a dispersion fluid. A dispersion of graphite and graphene flakes were prepared by homogenising a mixture of 10 g graphite in 200 ml dispersion fluid, with a Silverson L4R high-shear mixer equipped with a ¾" tubular head and a 'square hole high shear screen' attachment. Homogenising was performed for 20 minutes in a water bath at 21 degrees centigrade. This homogenised mixture was then centrifuged for 20 minutes at 3,500 RPM to remove unexfoliated graphite flakes. This yielded ~160 ml graphene dispersion. This method typically yields a graphene concentration of 0.01-0.05 mg/ml.

PVA-stabilised polylactic acid nanopoarticles were synthesized via O/W emulsion and solvent extraction evaporation technique, as reported by Sathyamoorthy et al. (2017). In a beaker, 0.1 g of the selected polymer was dissolved in 5 ml of methylene chloride. The polymer solution was added in a dropwise manner to 25 ml of 1 wt % PVA solution in water and sonicated in an ice bath for 10 intervals of 5 seconds. The emulsion was then added to 50 ml of 0.5 wt % aqueous PVA in a rate of 2 ml/min. The resulting dispersion was homogenized for 10 minutes, forming a white foam. The reaction mixture was stirred overnight to allow the evaporation of the organic solvent, and was washed with DI water and centrifuged twice at 4500 rpm for 30 minutes. This method typically yields a concentration of 0.8-1.5 w %, most often 1.1 w %.

Sathyamoorthy, N., Magharla, D., Chintamaneni, P., & Vankayalu, S. (2017). *Optimization of paclitaxel loaded poly*

(ε-*caprolactone*) *nanoparticles using Box Behnken design. Beni-Suef University Journal of Basic and Applied Sciences*, 6(4), 362-373. Doi:10.1016/j.bjbas.2017.06.002

1 ml of PLA suspension was added to 3 ml graphene dispersion and sonicated for 2 minutes. To this mixture, 200 microlitres of saturated ammonium carbonate solution was added, and the mixture agitated and sonicated for 2 further minutes. After a few minutes, a black floc was observed. The general process steps can be observed in FIG. 41.

Regarding the experimental methods disclosed herein:

WIRE™ (a dedicated software package for Raman spectroscopy) was used for curve fitting in order to determine Raman peak intensities, widths, positions and areas as shown in FIGS. 44 to 57.

Raman spectra were collected using a Renishaw inVia Raman microscope with laser excitation wavelength=532 nm. XRD patterns were collected using a STOE diffractometer operated in transmission with a PSD detector and a germanium monochromator (Cu K-alpha1 radiation wavelength=1.540598 Å).

TABLE 2 calculated I(D)/I(G) and I(D)/I(D') ratios for 5 different composites produced via method 4 using I(D), I(G) and I(D') values from FIGS. 44 to 53.

| Composite | I(D)/I(G) | I(D)/I(D') | Calculated from FIGS. |
|---|---|---|---|
| Titanium dioxide-graphene | 0.25 | 2.53 | 50 and 51 |
| Antimony tin oxide-graphene | 0.48 | 3.07 | 46 and 47 |
| Zirconium oxide-graphene | 0.30 | 2.82 | 52 and 53 |
| Barium titanate (cubic structure)-graphene | 0.51 | 3.41 | 48 and 49 |
| Aluminium oxide-graphene | 0.33 | 3.22 | 44 and 45 |

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

For the avoidance of doubt, it is hereby stated that the information disclosed earlier in this specification under the heading "Background" is relevant to the invention and is to be read as part of the disclosure of the invention.

Where a composition/item is said to comprise a plurality of stipulated ingredients (optionally in stipulated amounts of concentrations), said composition/item may optionally include additional ingredients other than those stipulated. However, in certain embodiments, a composition/item said to comprise a plurality of stipulated ingredients may in fact consist essentially of or consist of all the stipulated ingredients.

Herein, where a composition is said to "consists essentially of" a particular component, said composition suitably comprises at least 70 wt % of said component, suitably at least 90 wt % thereof, suitably at least 95 wt % thereof, most suitably at least 99 wt % thereof. Suitably, a composition said to "consist essentially of" a particular component consists of said component save for one or more trace impurities.

Where the quantity or concentration of a particular component of a given composition is specified as a weight percentage (% weight, wt % or % w/w), said weight percentage refers to the percentage of said component by weight relative to the total weight of the composition as a whole. It will be understood by those skilled in the art that the sum of weight percentages of all components of a composition will total 100 wt %. However, where not all components are listed (e.g. where compositions are said to "comprise" one or more particular components), the weight percentage balance may optionally be made up to 100 wt % by unspecified ingredients (e.g. a diluent, such as water, or other non-essentially but suitable additives).

Herein, unless stated otherwise, the term "parts" (e.g. parts by weight, pbw) when used in relation to multiple ingredients/components, refers to relative ratios between said multiple ingredients/components. Expressing molar or weight ratios of two, three or more components gives rise to the same effect (e.g. a molar ratio of x, y, and z is x1:y1:z1 respectively, or a range x1-x2:y1-y2:z1-z2). Though in many embodiments the amounts of individual components within a composition may be given as a "wt %" value, in alternative embodiments any or all such wt % values may be converted to parts by weight (or relative ratios) to define a multi-component composition. This is so because the relative ratios between components is often more important than the absolute concentrations thereof in the compositions (i.e., solid dosage forms such as the extruded items/embedded items and/or mixtures used to prepare said solid dosage forms such as the extrudable composition/embeddable substance/solidifiable body substance) of the invention. Where a composition comprises multiple ingredients is described in terms of parts by weight alone (i.e. to indicate only relative ratios of ingredients), it is not necessary to stipulate the absolute amounts or concentrations of said ingredients (whether in total or individually) because the advantages of the invention can stem from the relative ratios of the respective ingredients rather than their absolute quantities or concentrations. However, in certain embodiments, such compositions consists essentially of or consist of the stipulated ingredients and a diluents (e.g. water).

The term "mole percent" (i.e. mol %) is well understood by those skilled in the art, and the mol % of a particular constituent means the amount of the particular constituent (expressed in moles) divided by the total amount of all constituents (including the particular constituent) converted into a percentage (i.e. by multiplying by 100). The concept of mol % is directly related to mole fraction.

The term "substantially free", when used in relation to a given component of a composition (e.g. "a liquid pharmaceutical composition substantially free of compound X"), refers to a composition to which essentially none of said component is present. When a composition is "substantially free" of a given component, said composition suitably comprises no more than 0.001 wt % of said component, suitably no more than 0.0001 wt % of said component, suitably no more than 0.00001 wt %, suitably no more than 0.000001 wt %, suitably no more than 0.0000001 wt % thereof, most suitably no more than 0.0001 parts per billion (by weight).

The term "entirely free", when used in relation to a given component of a composition (e.g. "a liquid pharmaceutical composition entirely free of compound X"), refers to a composition containing none of said component.

Suitably, unless stated otherwise, where reference is made to a parameter (e.g. pH, pKa, etc.) or state of a material (e.g. liquid, gas, etc.) which may depend on pressure and/or temperature, suitably in the absence of further clarification such a reference refers to said parameter at standard ambient temperature and pressure (SATP). SATP is a temperature of 298.15 K (25° C., 77° F.) and an absolute pressure of 100 kPa (14.504 psi, 0.987 atm).

Suitably, unless stated otherwise, where reference is made to a boiling point, a melting point, or a glass transition (softening) temperature of a component, such reference refers to said parameter being measured at standard ambient pressure. Standard ambient pressure is an absolute pressure of 100 kPa (14.504 psi, 0.978 atm).

The following numbered clauses 1-21 are not claims, but instead serve to define particular aspects and embodiments of the invention.

1. A process for producing a composite, the process comprising:
  a) providing a source of graphene,
  b) providing a particulate material,
  c) dispersing a mixture of the source of graphene and the particulate material in a first dispersion fluid to form a dispersion mixture, and
  d) providing a source of a base in the first dispersion fluid, thereby causing the source of graphene and particulate material in the dispersion mixture to interact forming a composite.

2. A process of clause 1, wherein the particulate material is a metal oxide.

3. A process of either clause 1 or clause 2, wherein the particulate material is a photocatalytic metal oxide.

4. A process of clause 3, wherein the photocatalytic metal oxide comprises titanium dioxide, preferably titanium dioxide comprising anatase and/or rutile, even more preferably titanium dioxide comprising a mixture of anatase and rutile.

5. A process of any one of the preceding clauses, wherein the particulate material comprises a polysaccharide, preferably chitosan.

6. A process of any one of the preceding clauses, further comprising homogenising the dispersion mixture, preferably with a high shear mixer.

7. A process of any one of the preceding clauses, further comprising homogenising the source of graphene in a graphene dispersion fluid, preferably with a high shear mixer.

8. A process of any one of the preceding clauses, further comprising homogenising the particulate material in a material dispersion fluid, preferably with a high shear mixer.

9. A process of any one of the preceding clauses, further comprising sonicating the dispersion mixture.

10. A process of any one of the preceding clauses, further comprising sonicating the source of graphene in the graphene dispersion fluid.

11. A process of any one of the preceding clauses, further comprising sonicating the particulate material in the material dispersion fluid.

12. A process of any one of the preceding clauses, further comprising forming the mixture of the source of graphene and the particulate material in an amount of 0.01 to 10000 parts by weight particulate material to 1 part by weight source of graphene (calculated as graphene).

13. A process of any one of the preceding clauses, wherein the source of base comprises a source of a Brønsted base and/or a source of a Lewis base.

14. A process of clause 13, wherein the source of base comprises a source of hydroxide ions.

15. A process of clause 14, wherein the source of hydroxide ions comprises an ion exchange resin, ammonia solution or an alkali solution.

16. A process of clause 14 or clause 15, wherein the source of hydroxide is provided at an amount of 0.5 millimoles to 20 millimoles per 10 g of metal oxide, preferably per 10 g titanium dioxide.

17. A process of any one of clauses 13 to 15, wherein the source of base comprises a ketone, preferably acetone.

18. A process of clause 17, wherein the first dispersion fluid dispersion fluid comprises acetone.

19. A process of clause 18, wherein the first dispersion fluid comprises a mixture of acetone and water with a weight ratio of acetone to water of 0.5:1 to 6:1, preferably 1:1 to 5:1, more preferably 2:1 to 4:1 and most preferably about 3:1.

20. A process of any one of the preceding clauses, further comprising providing a surfactant in the first dispersion fluid.

21. A process of any one of the preceding clauses, wherein the graphene dispersing liquid, the particulate material dispersing liquid and/or the first dispersing liquid comprise one or more of DMSO, acetone, water, THF, Chloroform, NMP, DMF, DMA, GBL, DMEU, Benzyl Benzoate, NVP, N12P, n-propanol, isopropanol, and/or N8P.

22. A process of any one of the preceding clauses, wherein the source of graphene comprises one or more of graphite, graphene, graphene oxide, reduced graphene oxide, and functionalised graphene.

23. A process of clause 22, wherein the source of graphene comprises graphite flakes and the process further comprises providing a graphite dispersion of graphite flakes in a graphene dispersion fluid and homogenising the graphite dispersion, preferably under high shear, thereby forming a dispersion comprising graphene.

24. A process of any one of the preceding clauses, wherein the particulate material has a particle size in the range 5 nm to 1 μm, preferably 10 nm to 500 nm, more preferably 15 nm to 250 nm.

25. A process of any one of the preceding clauses, further comprising recovering the composite, and optionally recovering the dispersion fluid, preferably for re-use.

26. A process of any one of the preceding clauses, wherein the process is conducted at a temperature in the range 0° C. to 260° C., preferably 0° ° C. to 110° ° C., more preferably 0° C. to 50° C.

27. A process for producing a photocatalytically active composite, the process comprising:
 a) providing a source of graphene,
 b) providing titanium dioxide in particulate form,
 c) dispersing a mixture of the source of graphene and titanium dioxide in a first dispersion fluid to form a dispersion mixture, and
 d) providing a source of a base in the first dispersion fluid, thereby causing the source of graphene and titanium dioxide in the dispersion mixture to interact forming a photocatalytically active composite.

28. A photocatalytically active composite obtainable by a process of any one of the preceding clauses.

29. Apparatus to remove pollutants from fluids, the apparatus comprising a fluid inlet, a fluid conduit to supply fluid from the fluid inlet to a photocatalytically active composite of clause 27 and a fluid outlet.

30. Apparatus of clause 29, wherein the fluid comprises air or water.

The invention claimed is:

1. A process for producing a flocculated composite product, the process comprising:
 a) providing a source of graphene, wherein the source of graphene is selected from pristine graphene and partially oxidised graphene;
 b) providing a particulate material, wherein the particulate material is a metal oxide,
 c) dispersing a mixture of the source of graphene and the particulate material in a first dispersion fluid to form a dispersion mixture, and
 d) providing a source of a base which comprises a source of hydroxide ions in the first dispersion fluid, wherein the source of hydroxide ions is provided at an amount of 0.5 millimoles to 20 millimoles per 10 g of the metal oxide;
wherein the addition of the source of a base causes the source of graphene and particulate material in the dispersion mixture to interact forming a flocculated composite product; and wherein the process is performed in the absence of a surfactant.

2. The process as claimed in claim 1, wherein the particulate material is a photocatalytic metal oxide.

3. The process as claimed in claim 2, wherein the photocatalytic metal oxide comprises titanium dioxide.

4. The process as claimed in claim 1, further comprising homogenising the dispersion mixture.

5. The process as claimed in claim 1, further comprising homogenising the source of graphene in a graphene dispersion fluid.

6. The process as claimed in claim 1, further comprising homogenising the particulate material in a material dispersion fluid.

7. The process as claimed in claim 1, wherein the source of graphene and the particulate material are mixed in a ratio of 3 to 500 parts by weight of the particulate material to 1 part by weight of the source of graphene.

8. The process as claimed in claim 1, wherein the composite has an I (D)/I (G) ratio at a laser excitation wavelength of 532 nm at 2.33 eV of less than 0.75.

9. The process as claimed in claim 1, wherein the first dispersion fluid comprises one or more of dimethyl sulfoxide, acetone, water, tetrahydrofuran, Chloroform, N-methyl-2-pyrrolidone, dimethylformamide, dimethylacetamide, gamma-butyrolactone, 1,3-dimethyl-2-imidazolidinone, Benzyl Benzoate, N-vinylpyrrolidone, N-dodecyl-2-pyrrolidone, n-propanol, isopropanol, and N-octyl-2-pyrrolidone.

10. The process as claimed in claim 1, wherein the particulate material has a particle size in the range of 5 nm to 1 μm.

11. The process as claimed in claim 1, further comprising recovering the flocculated composite product, and optionally recovering the dispersion fluid.

12. The process as claimed in claim 1, wherein the process is conducted at a temperature in the range of 0° C. to 260° C.

13. The process as claimed in claim 1, further comprising homogenising the dispersion mixture with a high shear mixer.

\* \* \* \* \*